(12) United States Patent
Kelly et al.

(10) Patent No.: US 10,324,598 B2
(45) Date of Patent: Jun. 18, 2019

(54) SYSTEM AND METHOD FOR A SEARCH ENGINE CONTENT FILTER

(71) Applicant: Graphika, Inc., New York, NY (US)

(72) Inventors: John W. Kelly, New York, NY (US);
Vladimir D. Barash, Somerville, MA (US); Adam Fields, New York, NY (US)

( * ) Notice: Subject to any disclaimer, the term of this patent is extended or adjusted under 35 U.S.C. 154(b) by 781 days.

(21) Appl. No.: 14/832,106

(22) Filed: Aug. 21, 2015

(65) Prior Publication Data

US 2016/0048556 A1    Feb. 18, 2016

Related U.S. Application Data

(63) Continuation-in-part of application No. 13/859,396, filed on Apr. 9, 2013, now abandoned, which is a
(Continued)

(51) Int. Cl.
| | |
|---|---|
| *G06F 16/00* | (2019.01) |
| *G06F 3/0484* | (2013.01) |
| *G06F 16/9535* | (2019.01) |
| *G06Q 10/10* | (2012.01) |
| *G06Q 30/02* | (2012.01) |
| *G06F 16/28* | (2019.01) |

(Continued)

(52) U.S. Cl.
CPC ........ *G06F 3/04842* (2013.01); *G06F 16/212* (2019.01); *G06F 16/278* (2019.01); *G06F 16/285* (2019.01); *G06F 16/9535* (2019.01); *G06Q 10/10* (2013.01); *G06Q 30/02* (2013.01)

(58) Field of Classification Search
None
See application file for complete search history.

(56) References Cited

U.S. PATENT DOCUMENTS

| | | |
|---|---|---|
| 5,893,095 A | 4/1999 | Jain et al. |
| 6,430,312 B1 | 8/2002 | Huang |

(Continued)

FOREIGN PATENT DOCUMENTS

| | | |
|---|---|---|
| JP | 201216168 A | 11/2012 |
| KR | 1020120137541 A | 12/2012 |

(Continued)

OTHER PUBLICATIONS

PCT/US2014/014731, International Application Serial No. PCT/US2014/014731, International Search Report and Written Opinion dated May 28, 2014, 11 pages.
(Continued)

*Primary Examiner* — Son T Hoang

(57) ABSTRACT

Computerized search methods and systems generally include presenting, to a user, a computer interface for specifying one or more search terms for a search query and presenting at least one selectable item corresponding to at least one of art M score and a cluster focus index (CFI) score filter for the search query. The methods and systems include generating an amended search query based on a selected item; and performing a search using the amended search query. The M score is calculated using the formula M score=count (alpha)+CFI (1-alpha), where the count is the overall number of members on a cluster focus map that has engaged with a target.

22 Claims, 37 Drawing Sheets

Related U.S. Application Data continuation-in-part of application No. 12/973,296, filed on Dec. 20, 2010, now Pat. No. 8,635,281.

(60) Provisional application No. 62/040,075, filed on Aug. 21, 2014, provisional application No. 61/760,652, filed on Feb. 5, 2013, provisional application No. 61/621,845, filed on Apr. 9, 2012, provisional application No. 61/287,766, filed on Dec. 18, 2009.

(51) Int. Cl.
*G06F 16/21* (2019.01)
*G06F 16/27* (2019.01)

(56) References Cited

U.S. PATENT DOCUMENTS

| | | | |
|---|---|---|---|
| 6,470,383 | B1 | 10/2002 | Leshem et al. |
| 7,503,070 | B1 | 3/2009 | Alstyne et al. |
| 7,809,714 | B1 * | 10/2010 | Smith ............... G06F 17/30395 707/705 |
| 8,094,872 | B1 | 1/2012 | Yagnik |
| 8,312,056 | B1 | 11/2012 | Peng et al. |
| 8,370,313 | B2 | 2/2013 | Snow et al. |
| 8,385,662 | B1 | 2/2013 | Yoon et al. |
| 8,635,281 | B2 | 1/2014 | Kelly |
| 8,949,164 | B1 | 2/2015 | Mohler |
| 2003/0074369 | A1 | 4/2003 | Schuetze |
| 2003/0158855 | A1 * | 8/2003 | Farnham ............... G06F 3/0481 |
| 2004/0098280 | A1 | 5/2004 | Hubert |
| 2004/0249774 | A1 | 12/2004 | Caid |
| 2005/0159996 | A1 | 7/2005 | Lazarus |
| 2005/0256949 | A1 | 11/2005 | Gruhl et al. |
| 2007/0217676 | A1 | 9/2007 | Grauman |
| 2008/0215607 | A1 | 9/2008 | Kaushansky et al. |
| 2008/0222295 | A1 | 9/2008 | Robinson et al. |
| 2008/0306830 | A1 | 12/2008 | Lasa et al. |
| 2010/0070485 | A1 | 3/2010 | Parsons et al. |
| 2010/0121849 | A1 | 5/2010 | Goeldi et al. |
| 2010/0161592 | A1 | 6/2010 | Zhao et al. |
| 2010/0325107 | A1 | 12/2010 | Kenton et al. |
| 2011/0028827 | A1 | 2/2011 | Sitaram |
| 2011/0173264 | A1 | 7/2011 | Kelly |
| 2011/0208709 | A1 | 8/2011 | Holthausen |
| 2011/0282860 | A1 | 11/2011 | Baarman et al. |
| 2012/0102021 | A1 | 4/2012 | Hill et al. |
| 2012/0226678 | A1 | 9/2012 | Park et al. |
| 2013/0232263 | A1 | 9/2013 | Kelly et al. |
| 2013/0262465 | A1 | 10/2013 | Galle |
| 2014/0062696 | A1 | 3/2014 | Packard |
| 2014/0101557 | A1 | 4/2014 | Kelly |
| 2014/0274246 | A1 | 9/2014 | Tsai et al. |
| 2014/0330757 | A1 | 11/2014 | Chen et al. |
| 2015/0120753 | A1 | 4/2015 | Wang et al. |
| 2016/0076908 | A1 | 3/2016 | Pang |

FOREIGN PATENT DOCUMENTS

| | | |
|---|---|---|
| WO | 2011075729 A2 | 6/2011 |
| WO | 2014123929 A1 | 8/2014 |

OTHER PUBLICATIONS

Hanneman et al. "Introduction to Social Network Methods", book published in 2005, chapter 7, pp. 69-78.

Sun et al., "Gesundheit! Modeling Contagion through Facebook News Feed", article published in 2009 for Association for Advancement of Artificial Intelligence.

Leskovec et al. "Meme-tracking and the Dynamics of the News Cycle", article published in 2009 for KDD'09, pp. 497-505.

Tsiatas, "Diffusion and Clustering on Large Graphs", presentation dated Dec. 8, 2011, 56 pages.

Coupechoux et al. "How Clustering Affects Epidemics in Random Networks", Published Feb. 23, 2012.

Nadler et al. "Diffusion Maps, Spectral Clustering and Eigenfunctions of Fokker-Planck Operators", Published in 2006.

Moody, "Network Structure and Diffusion", PWP-Duke-2009-004.

Goyal et al., "Competitive Contagion in Networks", Published in STOC'12 in 2012.

Argawal, "Identifying the Influential Bloggers in a Community", Published in WSDM'08 in 2008.

Farnsworth et al., "Identifying Spatio-Temporal Patterns of Transboundary Disease Spread: Examples Using Avian Influenza H5N1 Outbreaks", 2009.

Ghosh et al., "Classifications of Spatiotemporal Patterns with Applications to Recognition of Sonar Sequences", 1995.

Mohammed et al., "Training Spiking Neural Networks to Associate Spatio-Temporal Input-Output Spike Patterns" 2012.

Kwon et al., "Prominent Features of Rumor Propagation in Online Social Media" 2013.

Ardon et al., "Spatio-Temporal Analysis of Topic Popularity in Twitter" 2011.

* cited by examiner

1300

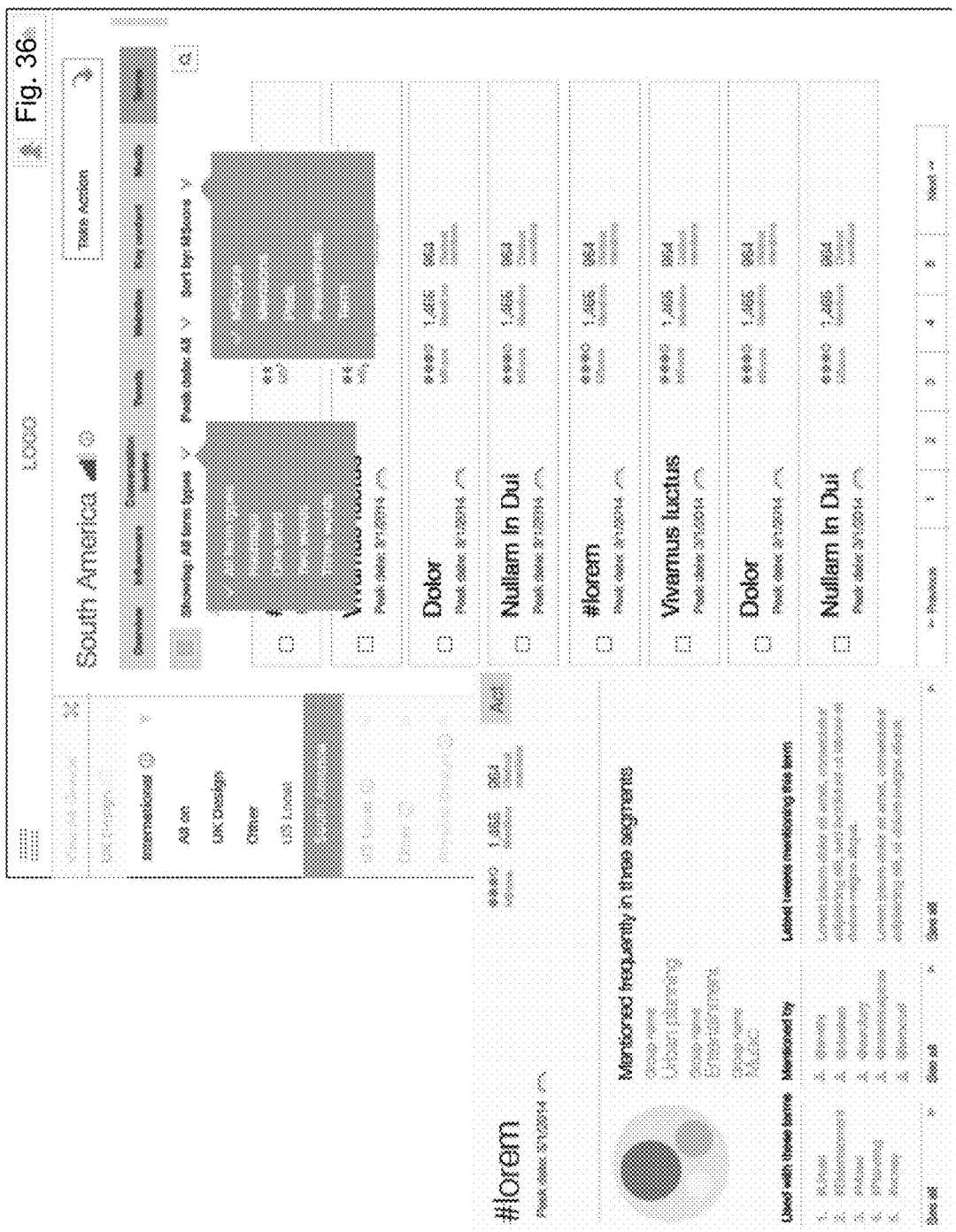

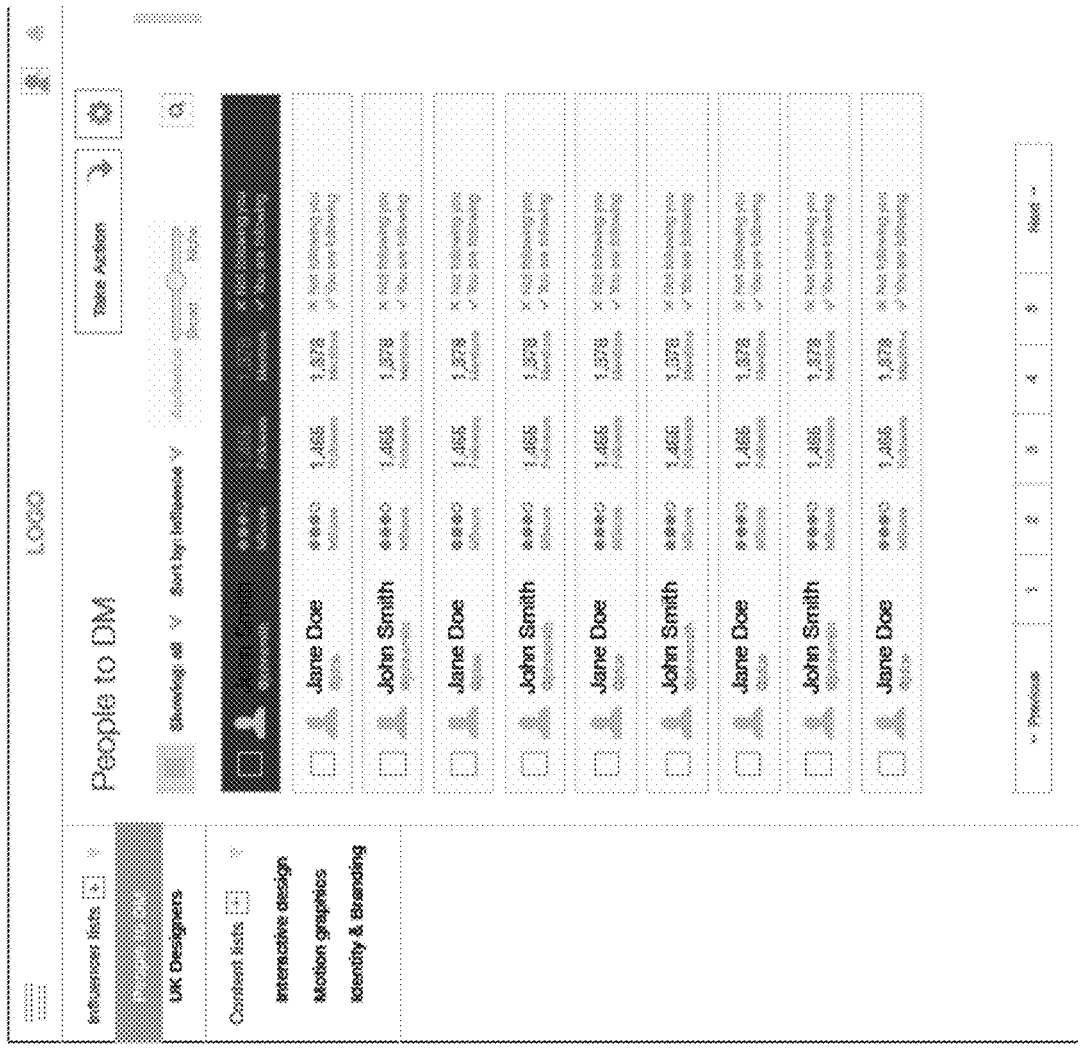

SYSTEM AND METHOD FOR A SEARCH ENGINE CONTENT FILTER

CROSS-REFERENCE TO RELATED APPLICATIONS

This application claims the benefit of the following provisional application, which is hereby incorporated by reference in its entirety: U.S. Patent Application No. 62/040,075, filed Aug. 21, 2014.

This application is a continuation-in-part of the following U.S. patent application, which is incorporated by reference in its entirety: U.S. patent application Ser. No. 13/859,396, filed Apr. 9, 2013. U.S. patent application Ser. No. 13/859,396 claims the benefit of the following provisional applications, each of which is hereby incorporated by reference in its entirety: U.S. Provisional Patent Application No. 61/621,845, filed Apr. 9, 2012 and U.S. Provisional Patent Application No. 61/760,652, filed Feb. 5, 2013.

U.S. patent application Ser. No. 13/859,396 is a continuation-in-part of the following U.S. patent application, which is incorporated by reference in its entirety: U.S. patent application Ser. No. 12/973,296, filed Dec. 20, 2010, which claims priority to U.S. Provisional Patent Application No. 61/287,766, filed Dec. 18, 2009, the entirety of which is hereby incorporated by reference.

BACKGROUND

Field

The present disclosure relates to methods for classifying at least one contagious phenomenon propagating on a network.

Description of the Related Art

Internet-based technologies, and the manifold genres of interaction they afford, are re-architecting public and private communications alike and thus altering the relationships between all manner of social actors, from individuals, to organizations, to mass media institutions. Internet technologies have enabled shifts in methods and practices of interpersonal communication. Many-to-many and social scale-spanning Internet communications technologies are eliminating the channel-segregation that previously reinforced the independence of classes of actors at these levels of scale, enabling (or more accurately in many cases, forcing) them to represent themselves to one another via a common medium, and increasingly in ways that are universally visible, searchable and persistent.

Online readers typically navigate hyperlinked chains of related stories, bouncing between numerous websites in a hypertext network, returning periodically to favored starting points to pick up new trails. Hyperlinks result from a combination of choices, from those made by individual, autonomous authors to those made programmatically by designed systems, such as permalinks, site navigation, embedded advertising, tracking services, and the like. Human authors practice the same kind of information selectivity online that they do offline, i.e., what authors (including those representing organizations) write about and link to reflects somewhat stable interests, attitudes, and social/organizational relationships. The structure of the network formed by these hyperlinks is a product of these choices, and thus large-scale regularities in choices will be evident in macro-level structure. This structure will thus bear the mark of individual preferences and characteristics of designed systems and allows a kind of "flow map" of how the Internet channels attention to online resources. Discriminating among types of links, and the ability to select categories of those which represent author choices, allows structural analytics to discover similarities among authors. Errors, randomness, or noise in linking at the individual level has local, independent causes, and does not bias large-scale macro patterns.

Thus, in order to understand and leverage the online information ecosystem, there remains a need for systems and methods for structural analytics aimed at identifying clusters of online readers and influential authors, discovering how they drive traffic to particular online resources, and leveraging that knowledge across various applications ranging from targeted advertising and communication to expert identification, and the like. This need includes a need for understanding the role of structures and similarities among authors and readers in situations involving phenomena that follow a pattern of contagion, i.e., where an item of interest, such as a news story, a political topic, a product, an item of entertainment content, or the like, initiates with a single point or a small group, then spreads and grows through the network. Predicting the pattern of spread or contagion, the parties who will take interest in, be involved with, or be influenced by a particular item, and the like may have great value in a range of applications; accordingly, a need exists for methods and systems that assist in or enable such prediction of the behavior of contagious phenomena.

SUMMARY

In an aspect of the disclosure, methods and systems are provided that allow characterization of structures and features of networks, such as online networks of creators and consumers of items of content, in turn enabling prediction course of action of actors in such networks and the flow of items, such as items of content, through such networks, including the growth and spreading of contagious phenomena.

In an aspect of the disclosure, a computer-readable storage medium with an executable program stored thereon, wherein the program instructs a processor to perform the steps of attentive clustering and analysis, may include constructing an online author network, wherein constructing the online author network includes selecting a set of source nodes (S), a set of outlink targets (T) from at least one selected type of hyperlink, and a set of edges (E) between S and T defined by the at least one selected type of hyperlink from S to T during a specified time period; deriving a set of nodes, T', by any one of or combination of a.) normalizing nodes in T, optionally to a selected level of abstraction, b.) using lists of target nodes for exclusion ("blacklists"), and c.) using lists of target nodes for inclusion ("whitelists"); transforming the online author network into a matrix of source nodes in S linked to targets in T'; partitioning the online author network into at least one set of source nodes with a similar linking history to form an attentive cluster and/or at least one set of outlink targets with a similar citation profile to form an outlink bundle; and optionally, generating a graphical representation of attentive clusters and/or outlink bundles in the network to enable interpretation of network features and behavior and calculation of comparative statistical measures across the attentive clusters and outlink bundles; wherein at least one element of the graphical representation depicts a measure of an extent of a type of activity within the network; and measuring frequencies of links between attentive clusters and outlink bundles enabling identification and measurement of large-scale regularities in the distribution of attention by online authors across sources of information. The element of the graphical representation may use at least one of size, thickness, color and pattern to depict a type of activity. Attentive clusters and their constituent nodes may be differentiated in the graphical representation by at least one of a color (including hue, intensity and saturation), a shape (including 2D or 3D representations), a geometric arrangement, a shading, a transparency and a size. The size of the object representing the clustered nodes in the graphical representation may correlate with a metric. The nodes, targets, and edges may be collected from public and private sources of information. Constructing the matrix may include applying at least one threshold parameter from the group consisting of: max-nodes, targetmax, nodemin, targetmin, maxlinks, and link-min. Constructing the matrix may include applying a minimum threshold for the number of included nodes that must link to a target to qualify it for inclusion in the matrix. Constructing the matrix may include applying a minimum threshold for the number of included targets that must link to a node to qualify it for inclusion in the matrix. The matrix may be a graph matrix. The method may further include applying any lists specifying inclusion or exclusion of particular nodes.

It should be understood that, except where context prevents, the term "author," as used herein, should be understood to encompass human and non-human creators and editors of content (including, without limitation, text, images, video, tweets, animations, multimedia and any combinations or other types of content and including, without limitation, original content, derivative works, commentary, analysis, and other genres of content) that can be consumed (e.g., read or viewed) by others, such as readers or viewers in a network.

In an aspect of the disclosure, a method of using attentive clustering to steer a further data collection process may include partitioning an online author network into at least one set of source nodes with a similar linking history to form an attentive cluster and at least one set of outlink targets with a similar citation profile to form an outlink bundle, and collecting clickstream data for the source nodes of the attentive cluster.

In an aspect of the disclosure, a method of using attentive clustering to steer a further data collection process may include partitioning an online author network into at least one set of source nodes with a similar linking history to form an attentive cluster and at least one set of outlink targets with a similar citation profile to form an outlink bundle, and collecting clickstream data for the target nodes of the outlink bundle.

In an aspect of the disclosure, a method of using attentive clustering to steer a further data collection process may include partitioning an online author network into at least one set of source nodes with a similar linking history to form an attentive cluster and at least one set of outlink targets with a similar citation profile to form an outlink bundle, and collecting survey data for the source nodes of the attentive cluster.

In an aspect of the disclosure, a method of using attentive clustering to steer a further data collection process may include partitioning an online author network into at least one set of source nodes with a similar linking history to form an attentive cluster and at least one set of outlink targets with a similar citation profile to form an outlink bundle, and collecting survey data for the target nodes of the outlink bundle.

In an aspect of the disclosure, a method of using attentive clustering to steer a further data collection process may include partitioning an online author network into at least one set of source nodes with a similar linking history to form an attentive cluster and at least one set of outlink targets with a similar citation profile to form an outlink bundle, and collecting geo-location data for the source nodes of the attentive cluster.

In an aspect of the disclosure, a method of using attentive clustering to steer a further data collection process may include partitioning an online author network into at least one set of source nodes with a similar linking history to form an attentive cluster and at least one set of outlink targets with a similar citation profile to form an outlink bundle, and collecting geo-location data for the target nodes of the outlink bundle.

In an aspect of the disclosure, a method of metadata tag analysis to facilitate interpretation of an attentive cluster may include partitioning an online author network into at least one set of source nodes with a similar linking history to form an attentive cluster and at least one set of outlink targets with a similar citation profile to form an outlink bundle, collecting a metadata tag associated with the source nodes in the attentive cluster, and performing a differential frequency analysis on the metadata tags that are associated with the attentive cluster. The method may further include sorting cluster focus scores on a plurality of the metadata tags.

In an aspect of the disclosure, a method of metadata tag analysis to facilitate interpretation of an attentive cluster may include partitioning an online author network into at least one set of source nodes with a similar linking history to form an attentive cluster and at least one set of outlink targets with a similar citation profile to form an outlink bundle, collecting a metadata tag associated with the source nodes in the attentive cluster, and performing a differential frequency analysis on the metadata tags that are associated with the outlink bundle. The method may further include sorting cluster focus scores on a plurality of the metadata tags.

In an aspect of the disclosure, a method may include partitioning an online author network into at least one set of source nodes with a similar linking history to form an attentive cluster and at least one set of outlink targets with a similar citation profile to form an outlink bundle, forming a density matrix of the attentive cluster and the outlink bundle, determining where there is a higher density in the density matrix than chance would predict, and identifying patterns of influence of a block of web sites on a block of authors by analyzing the higher density area of the density matrix.

In an aspect of the disclosure, a method of macro measurement of link density may include constructing an online author network, wherein constructing the online author network comprises selecting a set of source nodes (S), a set of outlink targets (T), and a set of edges (E) between S and T defined by the at least one selected type of hyperlink from S to T during a specified time period, deriving a set of nodes, T', by normalizing nodes in T, transforming the online author network into a matrix of source nodes in S linked to targets in T', and collapsing the matrix to aggregate link measures among clusters of sources and clusters of targets. The aggregated link measure may be at least one of a count of the number of nodes in source cluster s linking to any member of target set t, a density calculated by dividing counts by the product of the number of members in s and the number of members in t; and a standard score that is a standardized measure of the deviation from random chance for counts across each source node-outlink target crossing in the density matrix.

In an aspect of the disclosure, a method may include partitioning an online author network into at least one set of source nodes with a similar linking history to form an attentive cluster and at least one set of outlink targets with a similar citation profile to form an outlink bundle, and associating the attentive cluster with a real world group of people.

In an aspect of the disclosure, a method of multi-layer attentive clustering may include partitioning a multi-layered social segmentation into at least one set of source nodes with a similar linking history to form an attentive cluster and at least one set of outlink targets with a similar citation profile to form an outlink bundle, and monitoring at least one of the attentive cluster and the outlink bundle on at least one layer of the social segmentation. The social segmentation may be an online social media author network. Monitoring may be tracking the growth of an attentive cluster over time. The method may further include examining a source node associated with a specific player in the attentive cluster in order to determine a characteristic. The monitoring may be used to identify a group of people who are susceptible to a message and track downstream activities in response to the message.

In an aspect of the disclosure, a method may include partitioning an online author network into at least one set of source nodes with a similar linking history to form an attentive cluster and at least one set of outlink targets with a similar citation profile to form an outlink bundle, and analyzing the attentive cluster over time to depict changes in a linking pattern of the attentive cluster over a time period. The outlink bundle may be a list of semantic markers. The semantic marker may be at least one of a text element, a post, a tweet, an online content, and a metadata tag. Analyzing may involve tracking a semantic marker or set of semantic markers across one or more attentive clusters within the online author network.

In an aspect of the disclosure, a method may include partitioning an online author network into at least one set of source nodes with a similar linking history to form an attentive cluster and at least one set of outlink targets with a similar citation profile to form an outlink bundle, and calculating a set of cluster focus index (CFI) scores for the attentive cluster, wherein the CFI represents the degree to which a particular outlink target is disproportionately cited by members of a particular attentive cluster as compared to the average citation frequency for all nodes in S. At least one source node may be a high attention source node. The method may further include automatically placing an advertisement at the particular outlink target.

In an aspect of the disclosure, a method may include partitioning an online author network into at least one set of source nodes with a similar linking history to form an attentive cluster and at least one set of outlink targets with a similar citation profile to form an outlink bundle, and generating a graphical representation of attentive clusters and/or outlink bundles in the network to enable interpretation of network features and behavior and calculation of comparative statistical measures across the attentive clusters and outlink bundles, wherein at least one element of the graphical representation depicts a measure of an extent of a type of activity within the network. The method may further include further segmenting the network using at least one of a text, an item of online content, a link, and an object. The source node in the graphical representation may be represented by an individual dot. The size of the dot may be determined based on the number of other source nodes that link to it.

In an aspect of the disclosure, a method may include partitioning an online author network into at least one set of source nodes with a similar linking history to form an attentive cluster and at least one set of outlink targets with a similar citation profile to form an outlink bundle, calculating a set of cluster focus index (CFI) scores (CFI) for the attentive cluster, wherein the CFI represents the degree to which a particular outlink target is disproportionately cited by at least one source node of a particular attentive cluster, and generating a graphical representation of attentive clusters and/or outlink bundles in the network, wherein at least one element of the graphical representation depicts a measure of an extent of a type of activity within the network, wherein the higher the CFI score, the higher the outlink target appears along at least one axis of the graphical representation, In an aspect of the disclosure, a method of attentive clustering may include defining a semantic bundle, searching a plurality of candidate nodes for items in the bundle in order to generate a relevance metric for use in selecting high-relevance online authors, partitioning the online author network into at least one set of source nodes with a similar linking history to form an attentive cluster and at least one set of outlink targets with a similar citation profile to form an outlink bundle, and calculating metrics with across clusters for items in the semantic bundle.

In an aspect of the disclosure, a method may include partitioning an online author network into at least one set of source nodes with a similar linking history to form an attentive cluster and at least one set of outlink targets with a similar citation profile to form an outlink bundle, and generating a graphical representation of link targets, semantic events, and node-associated metadata scattered in an x-y coordinate space, wherein the dimensions of the graph are custom-defined using sets of attentive clusters grouped to represent substantive dimensions of interest for a particular analysis.

In an aspect, a computerized search method may include presenting, to a user, a computer interface for specifying one or more search terms for a search query, presenting at least one selectable item corresponding to at least one of an M score and a CFI score filter for the search query, generating an amended search query based on a selected item, and performing a search using the amended search query. The search may be of the Internet. The search may be of a document-corpus. The search may be of a CFI-filtered set of clusters within an online network. The search may be of a set of nodes having an M score greater than a threshold.

CFI may represent the degree to which an event, characteristic or behavior disproportionately occurs in a particular cluster, or a particular cluster, relative to a network, preferentially manifests an event, characteristic or behavior. Mscore may be calculated using the formula M score=count (alpha)+CFI (1-alpha) [normalized 1 to 10], where count is the overall number of members on a cluster focus map that have engaged with a target.

In an aspect, a computerized search method may include presenting, to a user, a computer interface for specifying one or more search terms for a search query, presenting, to the user, a computer interface for selecting content to search with the search terms, wherein the content is taken from an online creator network partitioned into at least one set of source nodes with a similar linking history to form an attentive cluster and at least one set of outlink targets with a similar citation profile to form an outlink bundle, and performing a search of the selected content using the search query.

In an aspect, a method to iteratively reduce the scale of a network to its most influential core communities and obtain a sub-graph of maximally connected sub-actors may include assigning a variable, $K_{corr}$, to each individual member of the network, where $K_{corr}$ relates to a minimum connectedness based on the number of other nodes in the network to which the individual is connected, removing inactive individuals and individuals with few followers from the network, temporarily removing certain individuals with a large number of followers for later re-joining, restricting the remaining individuals iteratively by removing individuals with the lowest $K_{corr}$ values first, then removing individuals with the next highest $K_{corr}$ values until a threshold is reached, wherein the threshold is at least one of a number of individuals removed, a number of individuals remaining, and a $K_{corr}$ value, and re-joining the temporarily removed individuals.

In an aspect, a self-service tool to construct a social media map may include an automated process (e.g. bot) that harvests data (e.g. nodes) and maps the data to one or more clusters/segments, a processor that provides cluster/segment labels and CFI scores for the clusters/segments, and an interface that enables user browsing of clusters/segments and the map, tagging nodes, and re-grouping/re-labeling of clusters/segments. The automated process may also be capable of: automatically refreshing the social media map based on using a relevance score for nodes in the map, positively or negatively weighting at least one cluster based on a CFI score calculation to include positively weighted nodes and exclude negatively weighted nodes from the map, filtering out unwanted nodes, obligatorily including nodes that were not clustered in a first version of the social media map, crowd-sourced information regarding nodes and/or links that drives nodes to bundles, processing social media map usage data for trends/indicators, wherein the usage data relates to one or more of what is ignored, what is further explored, what is used, how are clusters grouped, what name/label is assigned to a cluster, what color is used for a cluster, what order/position is the cluster placed in a report and wherein nodes preferentially interacted with are weighted more heavily, and user-contributed data as metadata for the social media map.

In an aspect, a method of strategic messaging may include generating a list of targets in a network/cluster/segment, filtering the list by a criteria to limit whom to message in the network/cluster/segment in order to maximize the impact of the message on the cluster/segment, wherein the filter is at least one of CFI score, M score, number of followers, following status, follower status, number of mentions/re-tweets, number of distinct mentions, status of exposure to content, status of exposure to content that has already peaked, footprint, and number of tweets/publication frequency, and ranking the list by the filtered criteria.

In an aspect, a method of strategic network building may include generating a list of targets in a network/cluster/segment, wherein the list is generated using at least one of CFI, M score, # of followers, mentions/re-tweets, distinct mentions, and number of tweets, and following the targets.

In an aspect, a method of calculating M score may include calculating a cluster focus index score based on a degree to which a target disproportionately occurs in a particular cluster, or a particular cluster, relative to a network, preferentially engages with a target, determining an overall number of members of the cluster or network that have engaged with that target, and calculating an M score based on the formula: count plus CFI, wherein count is the overall number of members of the cluster that have engaged with that target.

In an aspect, an M score filter for a list of targets may include taking a cluster focus index (CFI) score based on a degree to which a target disproportionately occurs in a particular cluster, or a particular cluster, relative to a network, preferentially engages with a target, and providing a slider to indicate an M score, wherein the M score is based on the formula: count (alpha)+CFI (1-alpha), wherein count is the overall number of members of the cluster or network that have engaged with that target, and wherein the slider is used to indicate the value of alpha between 0 and 1.

In an aspect, a method of strategic ad placement may include generating a list of targets in a network/cluster/segment representing linkages in a social media environment, filtering the list by a criteria to limit the targets in order to maximize the impact of the ad on the network/cluster/segment, wherein the filter is at least one of CFI score and M score, ranking the list by the filtered criteria, and providing an interface to launch an ad campaign to place ads directly from the environment representing the linkages to the target/website. Ad placement may be done via integration with various products, such as Twitter sponsored tweets, Facebook ad exchange, Google Adsense/Adwords, and third party online ad networks. The method may further include tracking interaction with the ad across social networks.

In an aspect, a method for using cosine similarity to determine the relationship between one or more clusters may include for each cluster, building a vector based on the CFI scores calculated for a number of items, plotting the vectors in a 3D vector space, determine the cosine of the angle between the vectors as an indication of the relationship between the clusters, and when a relationship is identified between clusters based on the cosine, automatically labeling the clusters with the same label. If the cosine is small, the confidence that there is a high degree of similarity is high.

In an aspect, a method may include publishing a map of content as a widget, and tracking interaction with the content in the widget to obtain behavioral data about a user of the map.

In an aspect, a method may include publishing a map of content as a widget, tracking interactions with the content in the widget to obtain behavioral data about a user of the published map; and analyzing the behavioral data in order to at least one of suggest content, track network evolution, modify the network in strategically valuable ways, and measure the success of an ad campaign.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The structures, methods, systems, inventions and the following detailed description of certain embodiments thereof may be understood by reference to the following figures:

FIG. 36 depicts a terms page for a social media map platform.

FIG. 37 depicts a lists page for a social media map platform.

DETAILED DESCRIPTION

Figure 1:
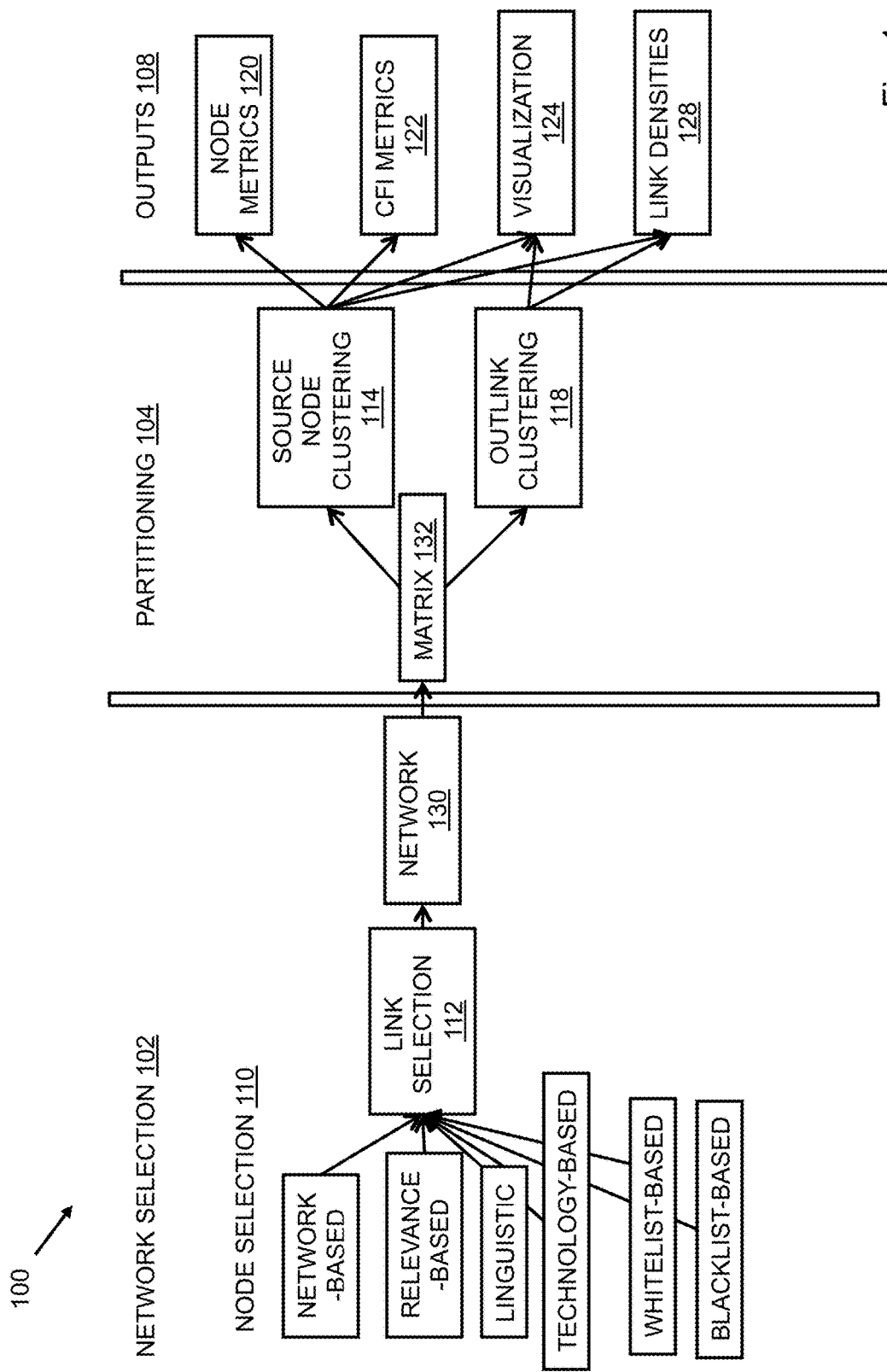
FIG. 1 depicts a process flow for attentive clustering.

The present disclosure relates to a computer-implemented method for attentive clustering and analysis. Attentive clusters are groups of authors who share similar linking profiles or collections of nodes whose use of sources indicates common attentive behavior. Attentive clustering and related analytics may include measuring and visualizing the prominence and specificity of textual elements, semantic activity, sources of information, and hyperlinked objects across emergent categories of online authors within targeted subgraphs of the global Internet. The disclosure may include a set of specialized parsers that identify and extract online conversations. The disclosure may include algorithms that cluster data and map them into intuitive visualizations (publishing nodes, blogs, tweets, etc.) to determine emergent clusterings that are highly navigable. The disclosure may include a front end/dashboard for interaction with the clustering data. The disclosure may include a database for tracking clustering data. The disclosure may include tools and data to visualize, interpret and act upon measurable relationships in online media. The approach may be to segment an online landscape based on behavior of authors over time, thus creating an emergent segmentation of authors based on real behavior that drives metrics, rather than driving metrics based on pre-conceived lists. Because the analysis is a structural one, rather than language-based, the analysis is language agnostic. In an embodiment, the segmentation may be global, such as of the English language blogosphere. In an embodiment, the segmentation may involve a relevance metric for every node based on semantic markers and a custom mapping of high-relevance nodes. The disclosure enables identifying influencers, such as who is authoritative about what to whom.

One method of obtaining attentive clusters may involve construction of a bipartite matrix, however, any number and variety of flat or hierarchical clustering algorithms may be used to obtain an attentive cluster in the disclosure. In an embodiment, a set of content-publishing source nodes ("authors") may be selected based on a chosen combination of linguistic, behavioral, semantic, network-based or other criteria. A mixed-mode network may be constructed, comprising the set S of all source nodes, the set T of all outlink targets from selected types of hyperlinks, and the set E of edges between them defined by the selected type or types of links from S to T found during a specified time period. A matrix, such as a bipartite graph matrix, may be constructed of source nodes in S linked to targets in T', derived by any combination of a.) normalizing nodes in T, optionally to a selected level of abstraction, b.) using lists of target nodes for exclusion ("blacklists"), and c.) using lists of target nodes for inclusion ("whitelists"). The matrix may represent a two-mode network (or actor-event network) that associates two completely different categories of nodes, actors and events, to build a network of actors through their participation in events or affiliations. In embodiments, the matrix is, in effect, an affiliation matrix of all authors with the things that they link to, wherein the patterns of their linking may be used to do statistical clustering of their nodes.

The matrix may be processed according to user-selected parameters, and clustered in order to perform one or more of the following: 1.) partition the network into sets of source nodes with similar linking histories ("attentive clusters"); 2.) identify sets of targets (linked-to websites or objects) with similar citation profiles ("outlink bundles"); 3.) calculate comparative statistical measures across these partitions/attentive clusters; 4.) construct visualizations to aid in interpretation of network features and behavior; 5.) measure frequencies of links between attentive clusters and outlink bundles, allowing identification and measurement of large-scale regularities in the distribution of attention by authors across sources of information, and the like. An arbitrary number and variety of flat or hierarchical clustering algorithms may be used to partition the matrix, and the results may be stored in order to select any solution for output generation. The resulting outputs (measures and visualizations) may provide novel, unique, and useful insights for determining influential authors and websites, planning communications strategies, targeting online advertising, and the like.

In an embodiment, systems and methods for attentive clustering and analysis may be embodied in a computer system comprising hardware and software elements, including local or network access to a corpus of chronologically-published internet data, such as blog posts, RSS feeds, online articles, Twitter "tweets," and the like.

Referring to FIG. 1, attentive clustering and analysis may include: 1.) network selection 102, 2.) partitioning 104, which may include two-mode network clustering in this embodiment, and 3.) visualization and metrics output 108. Network selection 102 may include at least two operations: a.) node selection 110, and b.) link selection 112. Optionally, a third may be applied in which network analytic operations are used to further specify the set of source nodes under consideration for clustering. For example, the operation may be filtering. Filtering may be technology-based, blacklist-based, whitelist-based, and the like.

In an embodiment, nodes may be URLs at which chronologically published streams or elements of content may be available. An initial set containing any number of nodes may be selected based on any combination of node-level characteristics and/or calculated relevance scores. Regarding node-level characteristics, there may be a number of different kinds of nodes publishing content online, such as weblogs (blogs), online media sites (like newspaper websites), microblogs (like TWITTER), forums/bulletin boards (like http://www.biology-online.org/biology-forum/), feeds (like RSS/ATOM), and the like. In addition to different technical genres of node, nodes may differ according to an arbitrary number of other intrinsic or extrinsic node-level characteristics, such as the hosting platform (e.g. BLOGSPOT, LIVEJOURNAL), the type of content published (text, images, audio), languages of textual content (e.g., French, Spanish), type of authoring entity (individual, group, corporation, NGO, government, online content aggregator, etc.), frequency or regularity of publication (daily, regular, monthly, bursty), network characteristics (e.g. central, authoritative, A-list, isolated, un-linked, long-tail), readership/traffic levels, geographical or political location of authoring entity or focus of its concern (e.g. Russian language, Russian Federation, Bay Area Calif.), membership in a particular online ad distribution network (e.g. BLOGADS, GOOGLE ADSENSE), third-party categorizations, and the like.

To support node selection 110 based on relevance to particular issues or actors, or relevance-based node selection 110, lists of relevance markers may be used to calculate composite scores across nodes. These lists may include such items as key words and phrases, semantic entities, full or partial URLs, meta tags embedded in site code and/or published documents, associated tags in third-party collections (e.g. DELICIOUS tags), and the like. For example, tags may be collected automatically, such as by 'spidering' sites for meta keywords. The corpus of internet data may be scanned and matches on list elements tabulated for each node. A number of methods may be used to calculate a relevance score based on these match counts. In an embodiment, relevance scores may be calculated by calculating individual index scores for text matches (T), link matches (L), and metadata matches (M), and then summing them. These individual index scores (I) may be calculated for each node by scanning all content published by a node during a specified period of time using a list of j relevance markers: $I=\text{sum}((x_1{}^*w_1)/t_1+(x_2{}^*w_2)/t_2 \ldots (x_j{}^*w_j)/t_j)$, where x is the number of matches for the item, w is a user-assigned weight (a scale of 1 to 5 is typical), and t is the total number of item matches in the scanned corpus. In an example, an initial set of source nodes may include the 100,000 Russian language weblogs most highly cited during a particular time frame. In another example, the initial set may include the 10,000 English language weblogs with the highest relevance scores based on relevance marker lists associated with the political issue of healthcare. In another example, the initial set may include all nodes by Indian and Pakistani authors in whatever language that have published at least three times within the past six months.

With respect to the link selection 112 component of network selection 102, objects may be particular units of chronologically published content found at a node, such as blog posts, "tweets", and the like. Links, also referred to as outlinks herein, may be hyperlink URLs found within a node's source HTML code or its published objects. Many kinds of links exist, and the ability to choose which kinds are used for clustering may be a key feature of the method. There are links for navigation, links to archives, links to servers for embedded advertising, links in comments, links to link-tracking services, and the like. Link selection 112 may be applied to links that represent deliberate choices made by authors, of which there may also be many kinds. These links may be to nodes (e.g. a weblog address found in a "blogroll"), objects (e.g. a particular YOUTUBE video embedded in a blog post), and other classes of entity, such as "friends" and "followers." Some node hosting platforms define a typology of links to reflect explicitly defined relationships, such as "friend," "friend-of," "community member," and "community follower" in LIVEJOURNAL, or "follower" and "following" in TWITTER, and the like. In other cases, informal conventions, such as "blogrolls," define a type of link. Some of these link types are relatively static, meaning they are typically available as part of the interface used by a visitor to a node website, while others are dynamic, embedded within published content objects. Link types may be parsed or estimated and stored with the link data. These links represent different types of relationships between authors and linked entities, and therefore according to the user's objectives, certain classes of links may be selected for inclusion. Different sorts of links also have time values associated with them, such as the date/time of initial publication of an object in which a dynamic link is embedded, or the first-detected and most recently seen date/time of a static link. Links may be further selected for clustering based on these time values.

From the parameters defined for node selection 110 and link selection 112, a mixed-mode network X 130 may be constructed, consisting of the set S of all source nodes, the set T of all outlink targets from selected types of hyperlinks, and the set E of edges between them defined by the selected type or types of links from S to T found during a specified time period. The network 130 may be considered "mixed mode" because while it may be formally bipartite, a number of nodes in S may also exist in T, which may be considered a violation of the normal concept of two-mode networks. Rather than excluding nodes that may be considered either S or T nodes, the systems and methods of the present disclosure consider them logically separate. A particular node may be considered a source of attention (S) in one mode, and an object of attention (T) in the other. Before clustering, the set of nodes may be further constrained by parameters applied to X, or to a one-mode subnetwork X' consisting of the network 130 defined by nodes in S along with all nodes in T that are also in S (or at a level of abstraction under an element in S, collapsed to the parent node). Standard network analytic techniques may be applied to X' in order to reduce the source nodes under consideration for clustering. For instance, requirements for k-connectedness may be applied in order to limit consideration to well-connected nodes.

In an embodiment, partitioning 104 may include: 1.) specification of node level for building the two-mode network, 2.) assembly of bipartite network matrix 132 using iterative processing of matrix to conform with chosen threshold parameters, and 3.) statistical clustering (multiple methods possible) of nodes on each mode, that is, source node clustering 114 and outlink clustering 118. Outlink clustering 118 to form an outlink bundle may involve identifying sets of web sites that are accessed by the same kinds of people.

With respect to specification of node level, distinction may be made between "nodes" and "objects," considering the node as a stable URL at which a number of objects are published. This may result in generation of a straightforward two-level hierarchy (object-node); however, nodes sometimes have a hierarchical relationship among each other (object-node-metanode). Consider the following three URLs: 1) http://www.bloghost.com/; 2) http://www.bloghost.com/users/johndoe/blog/; and 3) http://www.bloghost.com/users/johndoe/blog/09/6/21/myblogpost.html. Here, a three-level hierarchy with a metanode [1], node [2], and object exists. In some embodiments, the node URL may correspond very simply to a "hostname" (the part of a URL after "http://" and before the next "/") or a hostname plus a uniform path element (like "/blog" after the hostname). In other embodiments though, multiple nodes may exist at pathnames under the same hostname. Depending on the objective of the user, a "node level" may be selected for building the two-mode network, such that second mode nodes include (from most general to most specific level) a.) metanodes (collapsing sub-nodes into one) and independent nodes, b.) child, or sub-nodes (treated individually) and independent nodes, or c.) objects (of which a great many may exist for any given parent node). In embodiments, it may be possible to mix node levels according to a rule set based on defining levels for particular sets of nodes and metanodes, or on link thresholds for qualifying objects independently. Furthermore, a node with a webpage URL may often have one or more associated "feed" URLs, at which published content may be available. These feeds are generally considered as the same logical node as the parent site, but may be considered as independent nodes. If a target URL is not a publishing node, but another kind of website, the level may likewise be chosen, though more levels of hierarchy may be possible, and typically the practical choice may be between hostname level or full pathname level.

With respect to the assembly of the bipartite network matrix 132 using iterative processing of the matrix 132 to conform with chosen threshold parameters, links may be reviewed and collapsed (if necessary) to the proper node level as described hereinabove, and the two-mode network may be built between all link sources (the initial node set) and all target (second-mode) nodes at the specified node level or levels. Optionally, blacklists and whitelists may be used to, respectively, exclude or force inclusion of specific source or target nodes. From this full network data, an N×K bipartite matrix M, in which N is the set of final source nodes and K is the set of final target nodes, may be constructed according to user-specified, optional parameters, such as maxnodes, nodemin, maxlinks, linkmin, and the like. An iterative sorting algorithm may prioritize highly connected sources and widely cited targets, and then use these values to determine which nodes and targets from the full network data may be included in the matrix. Maxsources and maxtargets may set the maximum values for the number of elements in N and K. Nodemin may specify the minimum number of included targets (degree) that a source is required to link to in order to qualify for inclusion in the matrix. Linkmin similarly may specify the minimum number of included sources (degree) that must link to a target to qualify it for inclusion in the matrix. Two other optional parameters, nodemax and linkmax max be used to specify upper thresholds for source and target degree as well. Each value ($V_{ij}$) in M, is the number of individual links from source i to target j.

With respect to statistical clustering in each mode, that is node clustering 114 and outlink clustering 118, there may be a number of clustering algorithms which may be used to partition the network, including hierarchical agglomerative, divisive, k-means, spectral, and the like. They may each have merits for certain objectives. In an embodiment, one approach for producing interpretable results based on internet data may be as follows: 1) make M binary, reducing all values >0 to 1; 2) calculate distance matrices for M and its transpose, yielding an N×N matrix of distances between sources, and a K×K matrix of distances between targets. Various distance measures may be possible, but good results may be obtained by converting Pearson correlations to distances by subtracting from 1; 3) using Ward's method for hierarchical agglomerative clustering, a cluster hierarchy (tree) may be computed and stored for each distance matrix. Results of an arbitrary number of clustering operations may be saved in their entirety, so that any particular flat cluster solutions may be chosen as the basis for generating outputs.

In an embodiment, the clustering algorithm may be language agnostic, that is, forming attentive clusters around similar targets of attention without a constraint on the language of the targets. In an embodiment, clustering may make use of metadata that may enable the system to know about the content of various websites without having to understand a language. In another embodiment, the algorithm may have a translator or work in conjunction with a translation application in order to find terms across publications of any language.

Now that the first two stages of attentive clustering, network selection and two-mode network clustering, have been described we turn to a description of visualization and metrics output. Any particular set of cluster solutions for source nodes (an assignment of each node to a cluster) may be selected by the user in order to generate one or more of the following classes of output: 1.) per-cluster network metrics for source nodes 120; 2.) across clusters comparative frequency measures of link, text, semantic and other node and link-level events, content and features; 3.) visualizations 124 of the partitioned network combined with these measures and other data on node and link-level events, content and features; and 4.) aggregate cluster metrics reflecting ties among clusters taken as groups. Further, any particular set of cluster solutions for target nodes may be selected and used in combination with the set of cluster solutions for source nodes in order to generate: 1.) measures of link frequencies and densities 128 between source clusters and target clusters; 2.) visualization 124 of the previous as a network of nodes representing clusters of sources and targets with ties corresponding to link densities 128; and 3.) visualizations 124 of one-mode calculated (network of target nodes) networks with partition data.

In one class of output, and with respect to per-cluster network metrics for source nodes 120, in addition to standard network metrics for source nodes that are generated over the entire network, and which reflect various properties important for determining influence and role in information flow, user-selected cluster solutions may be used to generate a set of measures for each node, per-cluster. These measures may represent the node's direct and indirect influence on, or visibility to, each cluster, as well as its attentiveness to each cluster. For every node i, these measures may include the following: same-in: the number of nodes in the same cluster that link to i; same-out: the number of nodes in the same cluster i links to; diff-in: the number of nodes in other clusters that link to i; diff-out: the number of nodes in other clusters that i links to; same-in-ratio: the proportion of in-linking nodes from the same cluster; same-out-ratio: the proportion of in-linking nodes from other clusters; w-same-in: same-in scores where value of in-linking blogs is weighted by its centrality measure; w-diff-in: diff-in scores where value of in-linking blogs is weighted by its centrality measure; and per-cluster influence scores: similar scores (raw and weighted) for in-links from, and out-links to, each cluster on the map.

In another class of output, and with respect to across clusters comparative frequency measures of link, text, semantic and other node and link-level events, content and features, the partitioning of the network into sets of source nodes may allow independent and comparative measures to be generated for any number of items associated with source nodes. These may include such items as: a) the set of target nodes K in M; b.) any subset of all target nodes, including those on user-generated lists; c.) any set of target objects, such as all URLs for videos on YOUTUBE, or all object URLs on user-created lists; d.) any other URLs; e.) any text string found in published material from source nodes; f.) any semantic entities found in published material from source nodes; g.) any class of meta-data associated with source nodes, such as tags, location data, author demographics, and the like. For any item i in a set of items associated with source nodes, the following examples of measures may be generated per each cluster: 1) total count: number of occurrences of item within the cluster (multiple occurrences per source node counted); 2) node count: number of nodes with item occurrence within cluster (multiple occurrences per source node count as 1); 3) item/cluster frequency: total count/# of nodes in the cluster; 4) node/cluster frequency: node count/# of nodes in the cluster; 5) standardized item/cluster frequency: multiple approaches are possible, including z-scores, and one approach is to use standardized Pearson residuals, which control for both cluster size and item frequency across clusters and items in the set; and 6) standardized node/cluster frequency: multiple approaches are possible, including z-scores, and one approach is to use standardized Pearson residuals, or Cluster Focus Index scores 122. The higher the CFI score for the item, the greater the degree of its disproportionate use by the cluster. A score of zero indicates that the cluster cites the source at the same frequency as the network does on average. Other detailed data may be possible to obtain, such as the top nodes in each cluster, lists of all nodes in the cluster, lists of relevant Internet sites that each of the clusters link to (which enables identifying target outlinks where a message can be placed in order to reach specific clusters), the relative use of key terms across the clusters (which enables developing specific messages to communicate to each cluster), a hitcount (the raw number of times each outlink and term was found within all the identified nodes), source node and/or cluster geography and demographics, sentiment, and the like.

For example, differential frequency analysis can be done on meta-data, such as tags, that are associated with different attentive clusters to facilitate cluster interpretation. In the example, by sorting cluster focus scores 122 on the meta-data tags, interpretations of what the clusters are about may be derived without any manual review. The meta-data associated with the clusters may be used to facilitate interpretation of the meaning of the clusters. In an example, the meta-data may be language independent, such as GIS map data.

Figure 2:
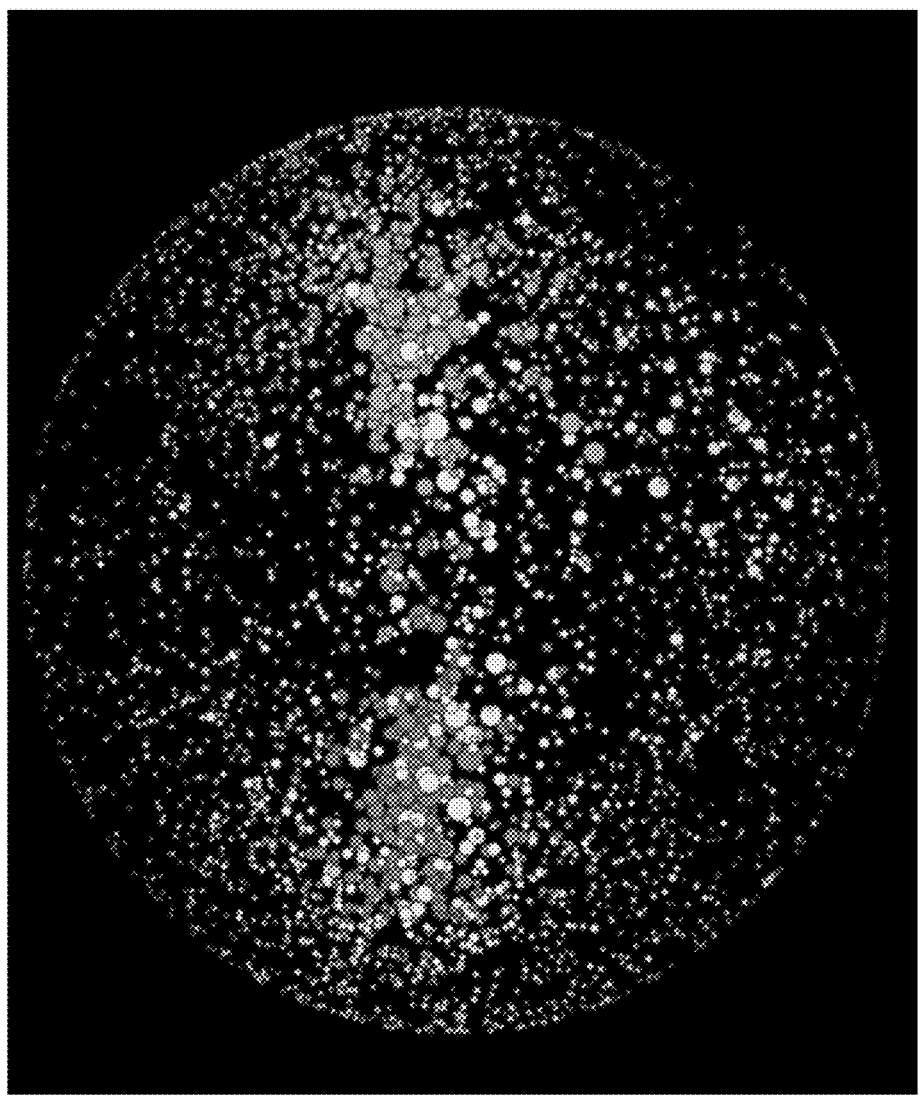
FIG. 2 depicts a social network map in the form of a proximity cluster map.

In another class of output, and with respect to visualizations of the partitioned network 124, a social network diagram may be generated and used to display link, text, semantic and other node and link-level events, content and features ("event data"), such as that shown in FIG. 2. The network map may be static or it may be the basis of an interactive interface for user interaction via software, software-as-a-service (SaaS), or the like. There may be two components to this process of visualization: 1.) creating a map of source nodes in a dimensional space for viewing; and 2.) use of colors, opacity and sizes of graphical elements to represent clusters, nodes and event data. With the dimensional mapping component, multiple approaches may be possible. One method may be to use a "physics model" or "spring embedder" algorithm suitable for plotting large network diagrams. The Fruchterman-Reingold algorithm may be used to plot nodes in two or three dimensions. In these maps, every node is represented by a dot, and its position is determined by link to, from, and among its neighbors. The size of the dot can vary according to network metrics, typically representing the chosen measures of node centrality. The technique is analogous to a locally-optimized multidimensional scaling algorithm. With the component related to use of colors, opacity and sizes of graphical elements to represent clusters and event data, nodes may be colored according to selected cluster partitions, to allow easy identification of various partitions. This projection of the cluster solution onto the dimensional map may facilitate intuitive understanding of the "social geography" of the online network. This type of visualization may be referred to as a "proximity cluster" map, because proximity of nodes to one another indicate relationships of influence and interaction. Further, projection of event data onto the map may enable powerful and immediate insight into the network context of various online events, such as the use of particular words or phrases, linking to particular sources of information, or the embedding of particular videos. This may be produced as static images, and may also be the basis of software-based interactive tools for exploring content and link behavior among network nodes.

In another class of output, and with respect to aggregate cluster metrics 128, metrics may be calculated for partitions at the aggregate level. Event metrics may include raw counts, node counts, frequencies (counts/# nodes in cluster), normalized and standardized scores, and the like. Examples typically include values such as: the proportion of blogs in a cluster using a certain phrase; the number of blogs in a cluster linking to a target website; the standardized Pearson residual (representing deviation from expected values based on chance) of the links to a target list of online videos; the per cluster "temperature" of an issue calculated from an array of weighted-value relevance markers; and the like.

As described above, any particular set of cluster solutions for target nodes may be selected and used in combination with the set of cluster solutions for source nodes in order to generate additional outputs. Visualizations produced may include: 1.) two-mode network diagram of relationships between clusters of sources and targets, treated as aggregate nodes and with tie strength corresponding to link density measures; and 2.) second-mode ("co-citation") network diagram, in which targets are nodes, connected by ties representing the number of sources citing both of them, and colors corresponding to cluster solution partitions. Another output may be macro measurement of link density. To reveal and measure large-scale patterns in the distribution of links from source nodes to targets, the matrix M may be collapsed to aggregate link measures among clusters of sources and clusters of targets. A series of S×T matrices may be used, with S as the set of source clusters ("attentive clusters") and T as the set of clustered targets ("outlink bundles"). These matrices may contain aggregated link measures, including: counts (c): the number of nodes in source cluster s linking to any member of target set t; densities (d): c divided by the product of the number of members in s and the number of members in t; and standard scores (s): standardized measures of the deviation from random chance for counts across each cell. Various standardized measures are possible, with standardized Pearson residuals obtaining good results. Any of these measures may be used as the basis of tie strength for two-mode visualizations described above.

In an embodiment, a density matrix may be constructed between attentive clusters and outlink bundles. The attentive clusters may be represented as row headers and the outlink bundles may be represented as column headers. The density matrix may allow users to see patterns in attention between certain sets of websites and certain bundles. The density matrix may provide a way to identify similar media sources. Further, the density matrix may provide information about attentive clusters that may be based on particular verticals.

Having described the process for attentive clustering, we now turn to examples of applications of the technique and various related analytical applications thereof for measuring frequencies of links between attentive clusters and outlink bundles, thus enabling identification and measurement of large-scale regularities in the distribution of attention by online authors across sources of information.

In an embodiment, and referring to FIG. 2, a social network map of the English-language blogosphere is depicted. The social network map graphically depicts the most linked-to blogs in the English language blogosphere. The size of the icons representing each individual blog may be representative of a network metric, such as the number of inbound links to the blog. This visualization depicts the output from a method for attentive clustering and analysis which identified attentive clusters of linked-to blogs, wherein the attentive clusters included authors with similar interests.

Figure 3:
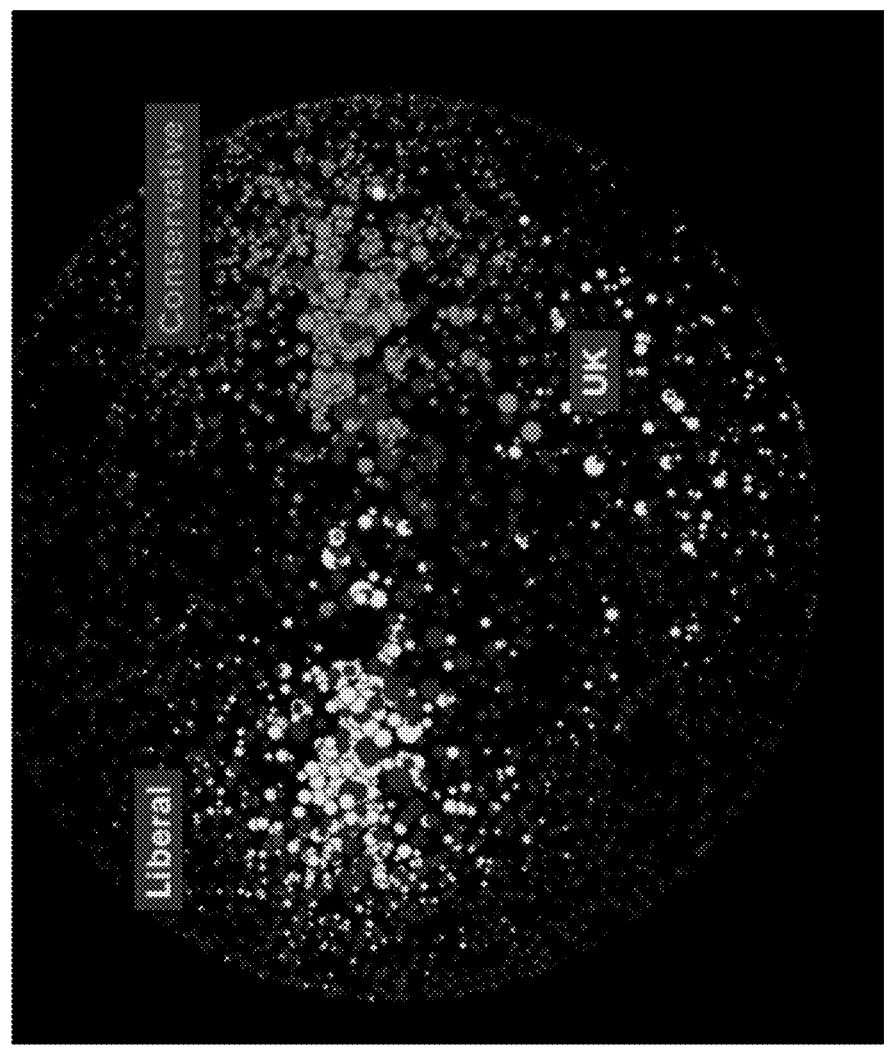
FIG. 3 depicts a social network map in the form of a proximity cluster map highlighting attentive clusters of liberal and conservative U.S. bloggers, and British bloggers.

Referring to FIG. 3, the method for attentive clustering and analysis analyzes bloggers' patterns of linking to understand their interests. The visualization in FIG. 3 highlights liberal and conservative U.S. bloggers, and British bloggers as attentive clusters. By zooming in on the visualization, subgroups such as conservatives focused on economics or liberals focused on defense may be identified from among the attentive clusters depicted.

Figure 4:
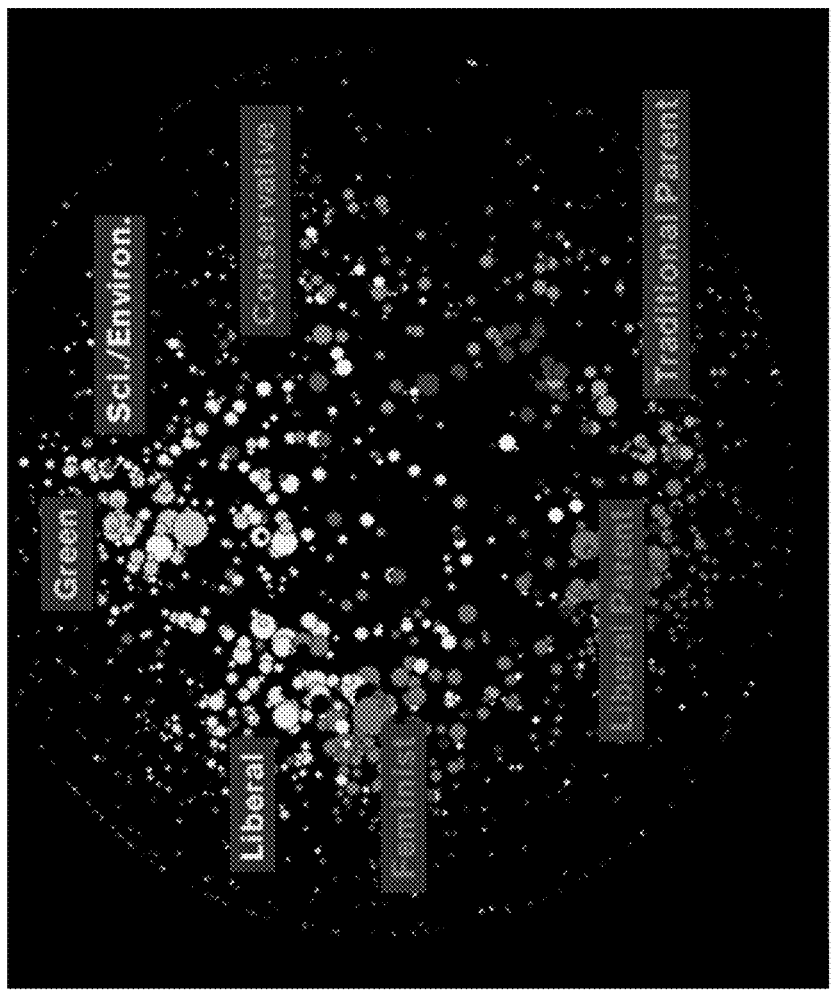
FIG. 4 depicts a social network map in the form of a proximity cluster map focused on environmentalists, feminists, political bloggers, and parents.
Figure 5:
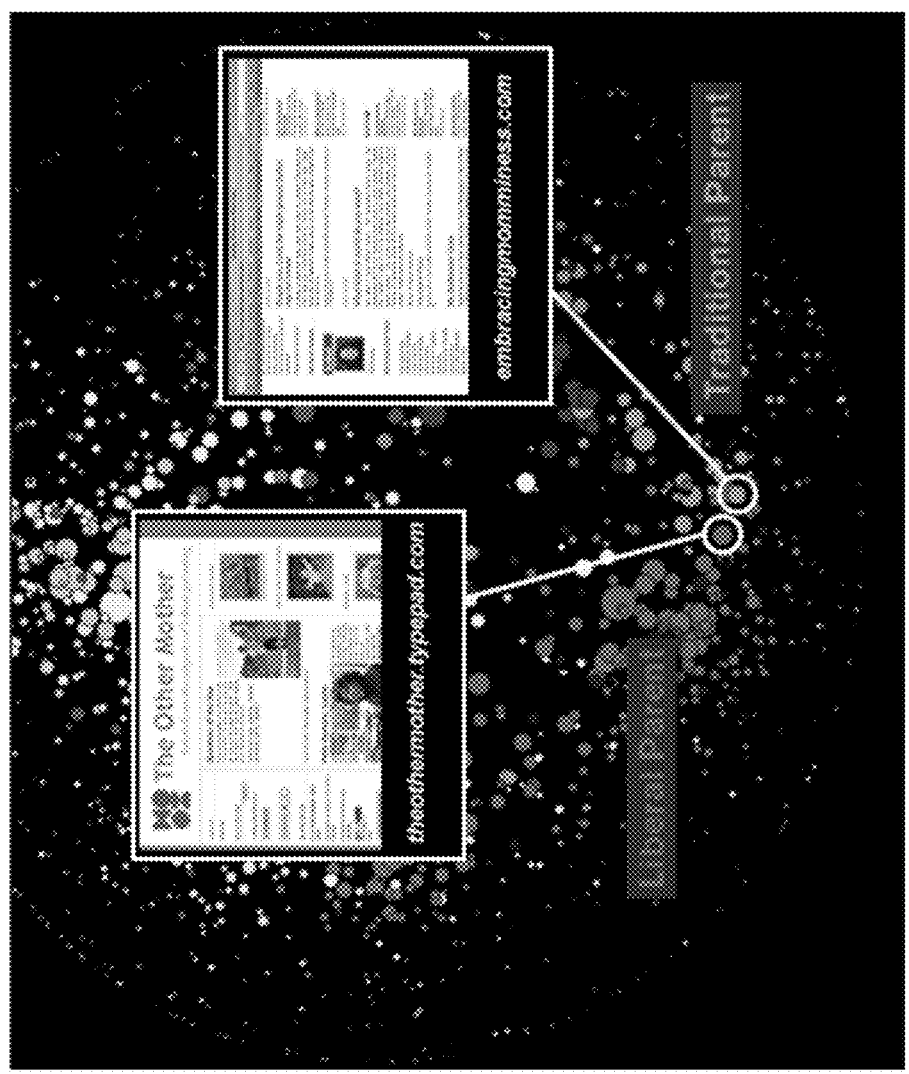
FIG. 5 depicts a social network map in the form of a proximity cluster map with a cluster relationship identified.

Referring to FIG. 4, the method for attentive clustering and analysis enables building a custom network map. In FIG. 4, the network map features attentive clusters of bloggers attuned to these topics: environmentalists, feminists, political bloggers, and parents. Subgroups within each topic may be delineated by a different color, a different icon shape, and the like. For example, within the parent bloggers, icons representing the liberal parent bloggers may be colored differently than the traditional parent bloggers. Surprising relationships may be discovered among groups of bloggers. For example, in FIG. 5, two parent bloggers with very different social values are closer in the network than either is to political bloggers who share their broader political views.

Figure 6:
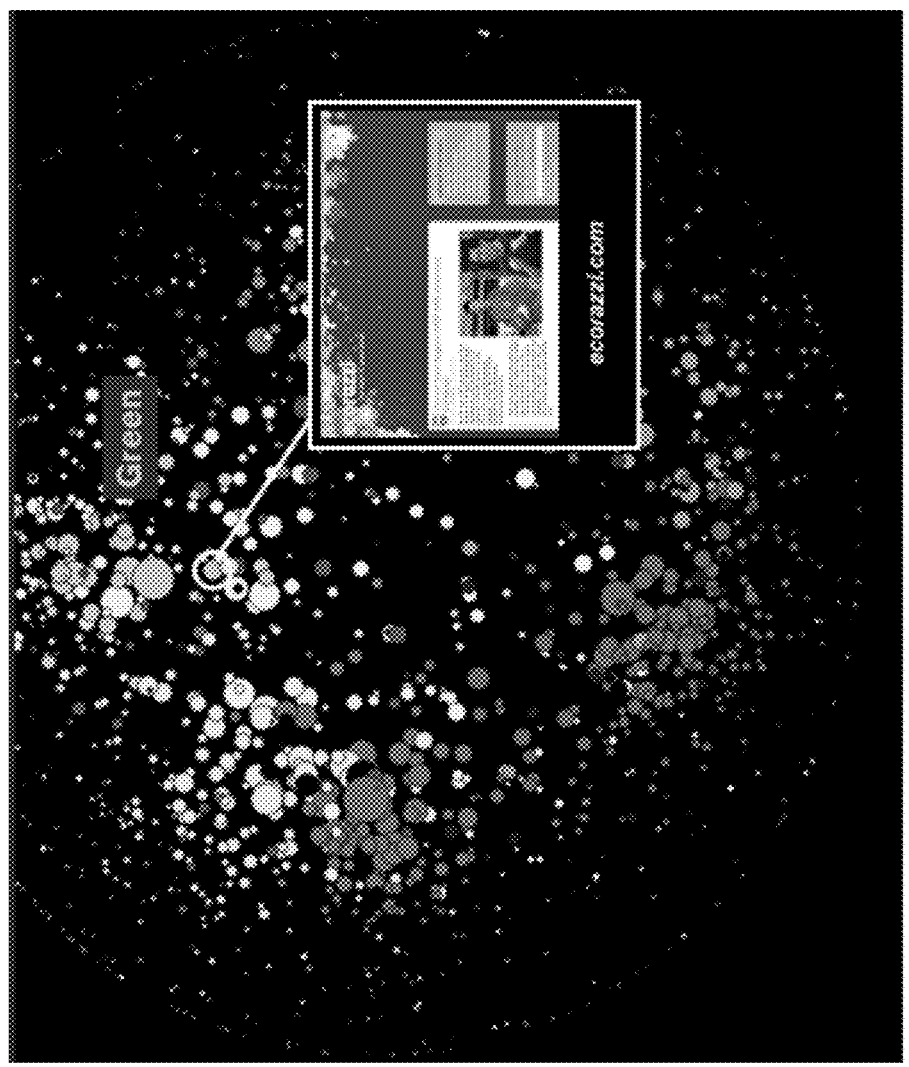
FIG. 6 depicts a social network map in the form of a proximity cluster map with a bridge blog identified.

Referring to FIG. 6, each attentive cluster may have its own core concerns, viewpoints, and opinion leaders. The method for attentive clustering and analysis enables identification of blogs that are considered bridge blogs, such as the one shown circled, which indicates that the blog is popular among multiple attentive clusters. The method for attentive clustering and analysis enables identification of whose opinions matter, about what, and among what groups.

Figure 7:
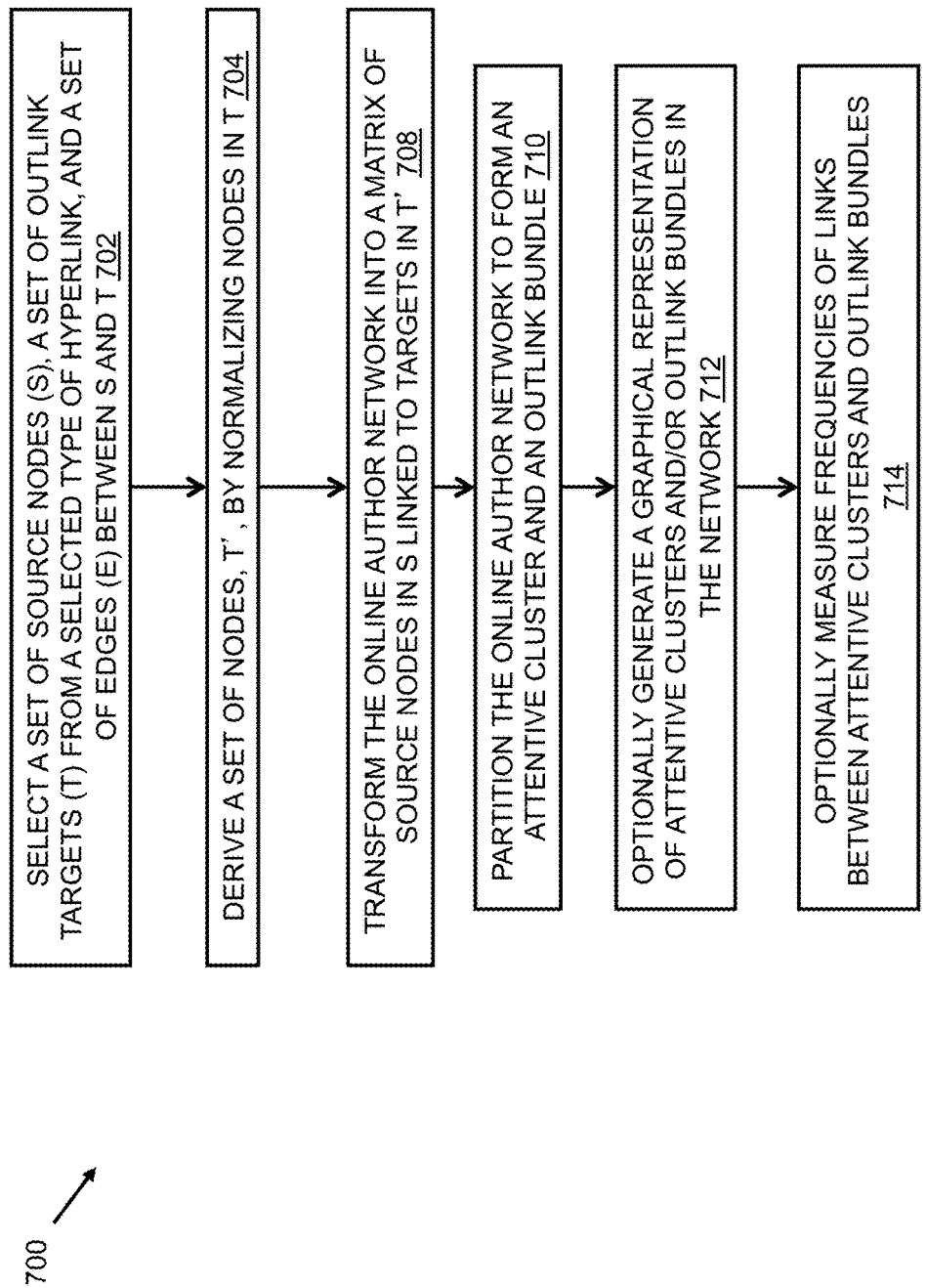
FIG. 7 depicts a flow diagram for attentive clustering.

Referring to FIG. 7, the steps of attentive clustering and analysis may include constructing an online author network, wherein constructing the online author network includes selecting a set of source nodes (S), a set of outlink targets (T) from at least one selected type of hyperlink, and a set of edges (E) between S and T defined by the at least one selected type or types of hyperlink from S to T during a specified time period 702; deriving a set of nodes, T', by any combination of a.) normalizing nodes in T, optionally to a selected level of abstraction, b.) using lists of target nodes for exclusion ("blacklists"), and c.) using lists of target nodes for inclusion ("whitelists") 704; transforming the online author network into a matrix of source nodes in S linked to targets in T' 708; and partitioning the online author network into at least one set of source nodes with a similar linking history to form an attentive cluster and at least one set of outlink targets with a similar citation profile to form an outlink bundle 710. The steps may optionally include generating a graphical representation of attentive clusters and/or outlink bundles in the network to enable interpretation of network features and behavior and calculation of comparative statistical measures across the attentive clusters and outlink bundles 712, wherein at least one element of the graphical representation depicts a measure of an extent of a type of activity within the network; and optionally measuring frequencies of links between attentive clusters and outlink bundles enabling identification and measurement of large-scale regularities in the distribution of attention by online authors across sources of information 714. The element of the graphical representation may use at least one of size, thickness, color and pattern to depict a type of activity. Attentive clusters may be visually differentiated in the graphical representation by at least one of a color, a shape, a shading, and a size. The size of the object representing the attentive clusters in the graphical representation may correlate with a metric. The nodes, targets, and edges may be collected from public and private sources of information. Constructing the matrix may include applying at least one threshold parameter from the group consisting of: maxnodes, targetmax, nodemin, targetmin, maxlinks, and linkmin. Constructing the matrix may include applying a minimum threshold for the number of included nodes that must link to a target to qualify it for inclusion in the matrix. Constructing the matrix may include applying a minimum threshold for the number of included targets that must link to a node to qualify it for inclusion in the matrix. Constructing the matrix may include using blacklists to exclude particular nodes, and whitelists to force inclusion of particular nodes. The matrix may be a graph matrix.

By identifying and measuring the frequencies of links between attentive clusters and outlink bundles, all manner of information about the distribution of attention by online authors across sources of information may be obtained. Various examples of the sorts of information, visualizations, applications, reports, APIs, widgets, tools, and the like that are possible using the methods described herein will be described. For example, two playlists for YouTube videos may be identified, one that has fraction with sub-cluster A the other with sub-cluster B. In another example, two RSS feeds may be organized that supply a user with items that have more attention from sub-cluster A versus sub-cluster B. In another example, a valence graph may be constructed that depicts words, phrases, links, objects, and the like that are preferred by one sub-cluster over another sub-cluster; such valence graphs may use aggregated sets of clusters defined by users to display dimensions of substantive interest, such as in FIG. 11. In yet another example, works from authors who are most relevant in a particular cluster may be displayed and then published as a widget, which may be custom-based on a valence graph, as a way of monitoring an ongoing stream of information from that cluster. Clusters may be customizable within the widget, such as via a dialog box, menu item, or the like. Further examples will be described hereinbelow.

A user may be able to, optionally in real time through a user interface, select a stream of information based on looking at the environment, zoom in based on clustering, figure out a valid emergent segmentation, and then set up monitors to watch the flow of events, such as media objects, text, key words/language, and the like, in real time.

In an embodiment, differences in word frequency use by attentive clusters may be used to differentiate and segment clusters. For example, the attentive clusters 'militant feminism' and 'feminist mom' may both frequently use terms associated with feminism in their publications, but additional use of terms related to militantism in one case and maternity in another case may have been used to subdivide a cluster of feminists into the two attentive clusters 'militant feminism' and 'feminist mom'. In extending this concept, not just word usage but the frequency of word usage, may also be useful in segmenting clusters. For example, in clusters of parents, the ones actually doing home schooling did not use the term 'home school' frequently, but rather used the term 'home education' with greater frequency. By identifying the specific language/words used by a cluster, the system may enable crafting messages, brands, language, and the like for particular clusters. In an embodiment, an application may automatically craft an advertisement to be placed at one or more outlinks in an outlink bundle using high frequency terms used by an attentive cluster. Further in the embodiment, the advertisement may be automatically sent to the appropriate ad space vendor for placement at the one or more outlinks.

In an embodiment, a method of using attentive clustering based on analysis of link structures to steer a further data collection process is provided. The data collection may include collection of web-based data, such as for example, clickstream data, data about websites, photos, emails, tweets, blogs, phone calls, online shopping behavior, and the like. For example, tags may be collected automatically or manually for every website that is a node. The tags may be non-hierarchical keywords or terms. These tags may help describe an item and may also allow the item to be found again by browsing or searching. In an example, tags may be associated in third-party collections such as DELICIOUS tags, and the like. In another example, there web crawlers may extract meta keywords and tags included within node html. Further, specific keywords and phrases may be exported to a database. In yet another example, the tags may be generated by human coders. Once a cluster partitioning exists, the system may do differential frequency analysis on the tags that are associated with different attention clusters. By sorting cluster focus index (CFI) scores along with the tags, the system can come up with an interpretation of the meaning of a cluster without requiring further analysis of the cluster itself. In an embodiment, the system may apply a further data collection process in order to associate respondents to a survey and their news sources with various corners of the internet landscape. For example, the influence of a particular news outlet across a segmented environment of the online network may be obtained by examining clustering in conjunction with a downstream data collection process, such as obtaining survey research, clickstream data, extraction of textual features for content analysis including automated sentiment analysis, content coding of a sample of nodes or messages, or other data.

In an embodiment, clustering data may be overlaid on GIS maps, "human terrain" maps, asset data on a terrain, cyberterrain, and the like.

In an embodiment of the present disclosure, a method of determining a probability that a user will be exposed to a media source given a known media source exposure is provided. The media source may include newspapers, magazines, radio stations, television stations, and the like. For example, a user who may be exposed to a particular media source may be clustered in a specific attentive cluster. Accordingly, the system may determine that users in that particular attentive cluster are more likely to be exposed to another media source because the second media source may also be present in an outlink bundle preferred by the cluster.

In an embodiment of the present disclosure, a method of attentive clustering on a meso level is provided. The method may enable identifying emergent audiences (Attentive Clusters) and monitor how messages (as specific as a single article in print; as broad as core campaign themes) traverse cyberspace. The method may involve mapping the attentive clusters where messages have, or are likely to find, receptive audiences. Mapping may enable identifying opinion leaders, and information sources, online and offline, which help shape their views.

The method may enable identification of the mindset/ social trends of a group of users. For example, the system may be able to associate an attentive cluster with a known network, such as a political party, a political movement, a group of activists, people organizing demonstrations, people planning protests, and the like. Via the ability to associate attentive clusters with particular groups of people, the system may be able to track the evolution of a movement or identity over time. Further, if a cluster supports a political movement, the system may track the impact of the political movement of the cluster on society. The system may track if the political movement has been accepted by majority of the people of the society, rejected by the society, if there is debate about the political movement, and the like. Accordingly, the method may enable growth of a brand, sale of a product, conveying a message, prediction of what people care about or do, and the like.

In an embodiment of the present disclosure, a system and method for multi-layer attentive clustering may be provided. In the system and method, attentive clusters may be tracked across various layers of a social segmentation, such as specific social media networks (Twitter™, Facebook™, Orkut™, and the like), a blogosphere, and the like. The system may be able to track development of an attentive cluster in a single layer or across multiple layers at every stage of the development of the cluster. When different layers of online media (such as weblogs, microblogs, and a social network service) are clustered individually, measures of association may be created between clusters across layers, based on density of hyperlinks between them, common identities of underlying authors, mutual citation of the same sources, mutual preference for certain topics or language, and the like. The system may also track the major players of clusters at every stage of development of the cluster.

For example, the growth of an attentive cluster supporting a political movement may be tracked back in time and over a period of a time. In the example, once an attentive cluster may be identified, the system may examine the nodes associated with specific players in the attentive cluster in order to determine characteristics, such as who is talking to whom, identify key nodes or hubs that link many other layers and/or media sources, identify apparent patterns of affinity or antagonism among clusters or other known networks, who may have started the political movement, when the political movement may have started, what messages were used at the forefront of the political movement's establishment, the size of the movement, the number of people who initially joined the political movement, growth of the political movement, influential people from various stages of the political movement, and the like. In this example, all of the analysis may be confined to activity in a single layer of a social segmentation or it may be undertaken across multiple layers. Continuing with the example, the impact of the political movement on society may be examined by tracking the penetration of an attentive cluster or its message across layers or the expansion of the attentive cluster in a single layer. Likewise, attentive cluster analysis may enable predictions. For example, an attentive cluster may be tracked in a single layer, such as by monitoring the number of Twitter followers, the frequency of new followers added, the content associated with that attentive cluster, inter-cluster associations, and the like, to determine if a political movement may be being spawned, expanded, diminished, or the like. In an embodiment, the socio-ideological configuration of the people who spawned the political movement may be evident from analyzing one or more of a blog layer, a social networking layer, a traditional media layer, and the like.

For example, a Twitter map may be formed where each colored dot is an individual Twitter account and the position is a function of the "follows" relationship. People are close to people they are following or who are following them. The pattern of the map may be related to the structure of influence across the network.

In an embodiment, the system may be deployed on a social networking site to identify and track attentive clusters and linkage patterns associated with the attentive clusters. For example, the system for attentive clustering may be applied on Facebook™ to identify attentive clusters in the Facebook™ audience and track the cluster's activity within Facebook™ In an example, the system may be used to identify a group of people who may be susceptible to a message. By identifying and tracking an attentive cluster in the Facebook™ layer that may be susceptible to a message, downstream activities, such as organizing in response to the message, may be examined. For example, an attentive cluster of university students may be presented with a message regarding a proposed law lowering the drinking age. The system may track activity within the cluster related to the message, identify new groups formed around the topic of the message, invitations to other groups regarding the message, opposition from other groups in response to the message, and the like. Indeed, the system may be able to track the formation of new attentive clusters in the Facebook™ layer in response to the message. In this case, the system may identify individuals or groups that link to one another who share a common interest or target of attention, such as concerned parents opposing the proposed law, anti-government groups supporting the proposed law, child advocate groups opposing the law, and the like. Discoveries related to the original layer may be applied to strongly associated clusters in other layers. For instance, determination about the interests of a cluster in the Facebook™ layer may be used to drive a communications or advertising strategy in associated clusters of other layers such as weblogs or Twitter™.

Measures for characterizing contagious phenomena propagating on networks may include peakedness, commitment (such as by subsequent uses and time range), and dispersion (including normalized concentration and cohesion) and will be further described herein.

In other embodiments, two-mode networks may be generated by projecting modes one onto another. For example, certain social networks may not allow handling of individual data, but may allow public page data to be accessed. In this way, data from individuals who comment on public pages may be obtained. Public pages may be treated as a two-mode network that is collapsed to one mode. For example, a two-mode network may be formed from two classes of actors, people and cocktail parties that the people attend. One class of actors could be labeled 1-5 and the other A-E to generate a scatter diagram depicting a two-mode network, either a network of cocktail parties attended by the same people or a network of people who attended the same cocktail parties. Likewise, networks may be formed based on who participates in the stream of objects that come from different public pages, the relationship between public pages, such as if there is a direct "like" relationship between public pages, weighted by how many people commented on objects from two or more pages, and the like.

These data may be clustered as described herein. In embodiments, the weight between public pages indicated by the number of users commenting on object from both pages may be used to visually indicate a stronger connection between pages with higher weights.

Clustering of this public page data may result in the formation of poles. For example, two poles may form where one set of pages is interacted with by one population and another set of pages interacted with by a very different population. There may be individuals who are interacting with both of these sets of pages at either pole. In any event, in the process of attentive clustering, users who are most tenuously connected to anything are forced to the outer edges of the cluster map.

In an embodiment of the present disclosure, a method of analyzing attentive clusters over time is provided. The analysis of these attentive clusters may enable the system to depict changes in the linking patterns of attentive clusters over a time period. Further, the analysis may allow depiction of any changes in the structure of the network itself.

In an embodiment, a time-based reporting method may be used by the system to demonstrate the effects of events/actions throughout a network of attentive clusters for a period of time. In the method, bundles that may be lists of semantic markers, including text elements embedded in a post or tweet, links to pieces of online content, metadata tags, and the like, may be tracked in clusters across a network, such as a blogosphere.

For example, a bundle of semantic markers related to obesity may be tracked over time to determine how the topic of obesity is being discussed. In the example, a particular bundle (with text, link and meta data elements) can be tracked across clusters to see where they are getting attention or not. The measure of attention may be defined as a 'temperature'. The 'temperature' is based conceptually on Fahrenheit temperatures (without negatives) as compared to other issues where 100 is very hot and 0 is ice cold. The method may have a tracking report as an output for tracking issues in a map across time. In this example, the tracking report may be focused on a collection of blogs most focused on childhood obesity organized into attentive clusters over a moving 12-month period of time. The blogs may be clustered broadly into policy/politics, issue focus, culture, family/parenting, and food attentive clusters. There may be sub-clusters defined for each of those clusters, such as conservative, social conservative, and liberal sub-clusters under the policy/politics cluster. The report may indicate the issue intensity for each cluster/sub-cluster by assigning it an average temperature per blog of conversation on the broad topic of childhood obesity within each group. The report may indicate the issue distribution for each cluster/sub-cluster by calculating a percentage of childhood obesity conversations taking place on blogs not in the map and within each cluster within the map. Continuing with this example, specific terms may be tracked across the clusters/sub-clusters over time and the method may indicate an average temperature based on the uses of specific terms in blogs within each cluster. In the example, the term 'school lunch' has a high 'temperature' in certain issue focus clusters, liberal policy clusters, and foodie clusters and steadily increased over the last eight moving 12-month periods. Similarly, the intensity of sites, or the average temperature based on links to specific web sites on blogs within each cluster, may be provided by the report. The intensity of source objects, or the average temperature based on the links to specific web content (articles, videos, etc.), may be provided by the report. The intensity of sub-issues, or the average temperature of conversation on identified issues defined by a set of terms and links, may be provided by the report. In the report, specific terms may be tracked on a monthly and per-cluster basis, specific sites may be tracked on a monthly and per-cluster basis, and specific objects may be tracked on a monthly and per-cluster basis.

In an exemplary embodiment, the system may identify and track structural changes in a network. For example, during the recent US elections, blogs appeared instantaneously that were anti-Obama, Pro-Palin, or Pro-McCain but were outside the conservative blogosphere. This rapid change in the network structure may be indicative of a coordinated, synchronized campaign to message and blog.

In an embodiment of the present disclosure, a method of attentive clustering by partitioning an author network into a set of source nodes with similar adoption and use of technology features is provided. For example, instead of a website being a target of attention for an attentive cluster or around which an attentive cluster forms, a feature or a piece of technology, such as an embedded Facebook 'Like' button, may be a target of attention or clustering item.

In an embodiment, a method of creating clusters of people and describing probabilistic relationships with other clusters, such as words, brands, people, and the like, is provided. The system may describe any probability of any relation between them.

Figure 9:
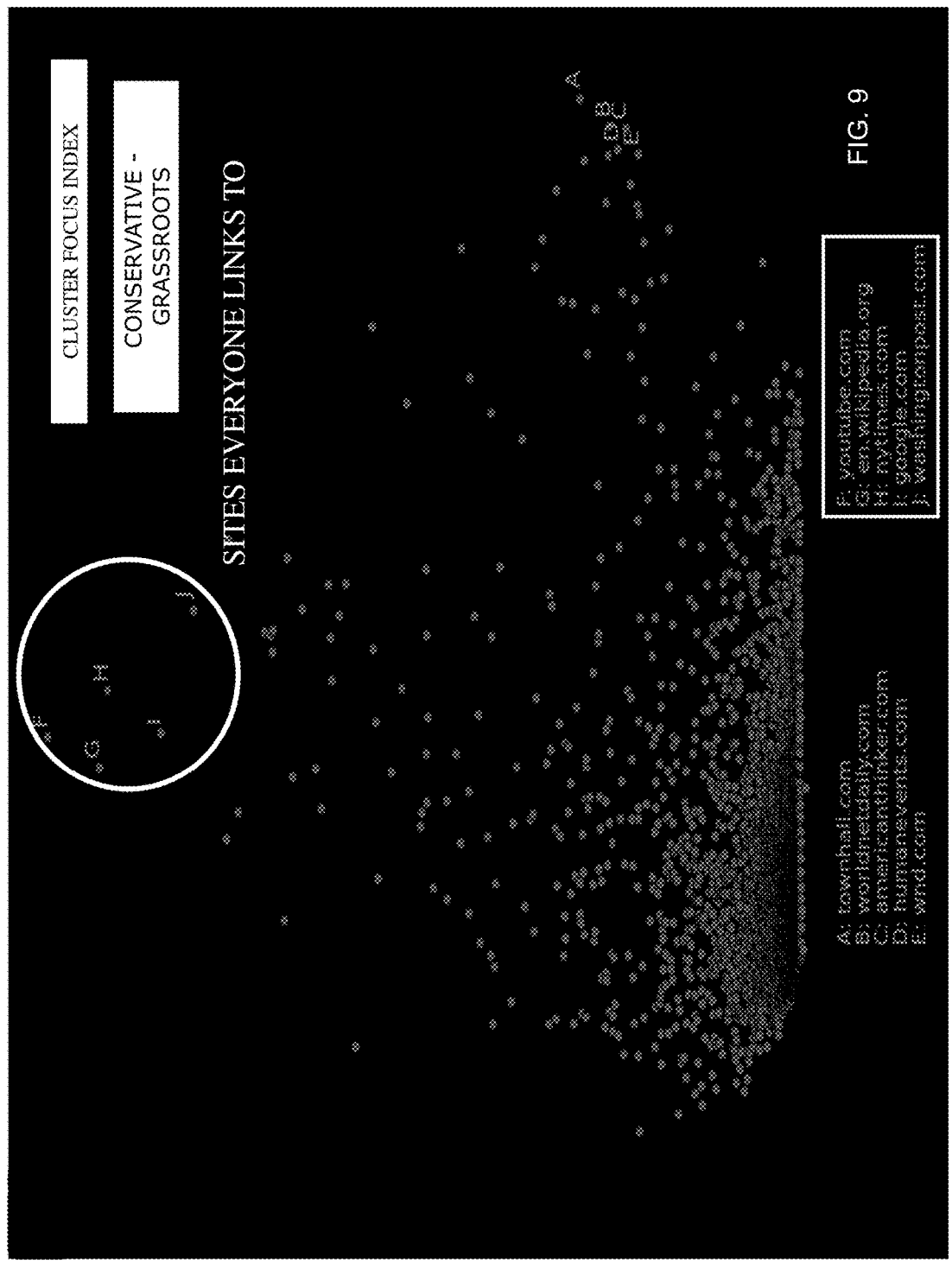
FIG. 9 depicts a graph of CFI scores.
Figure 10:
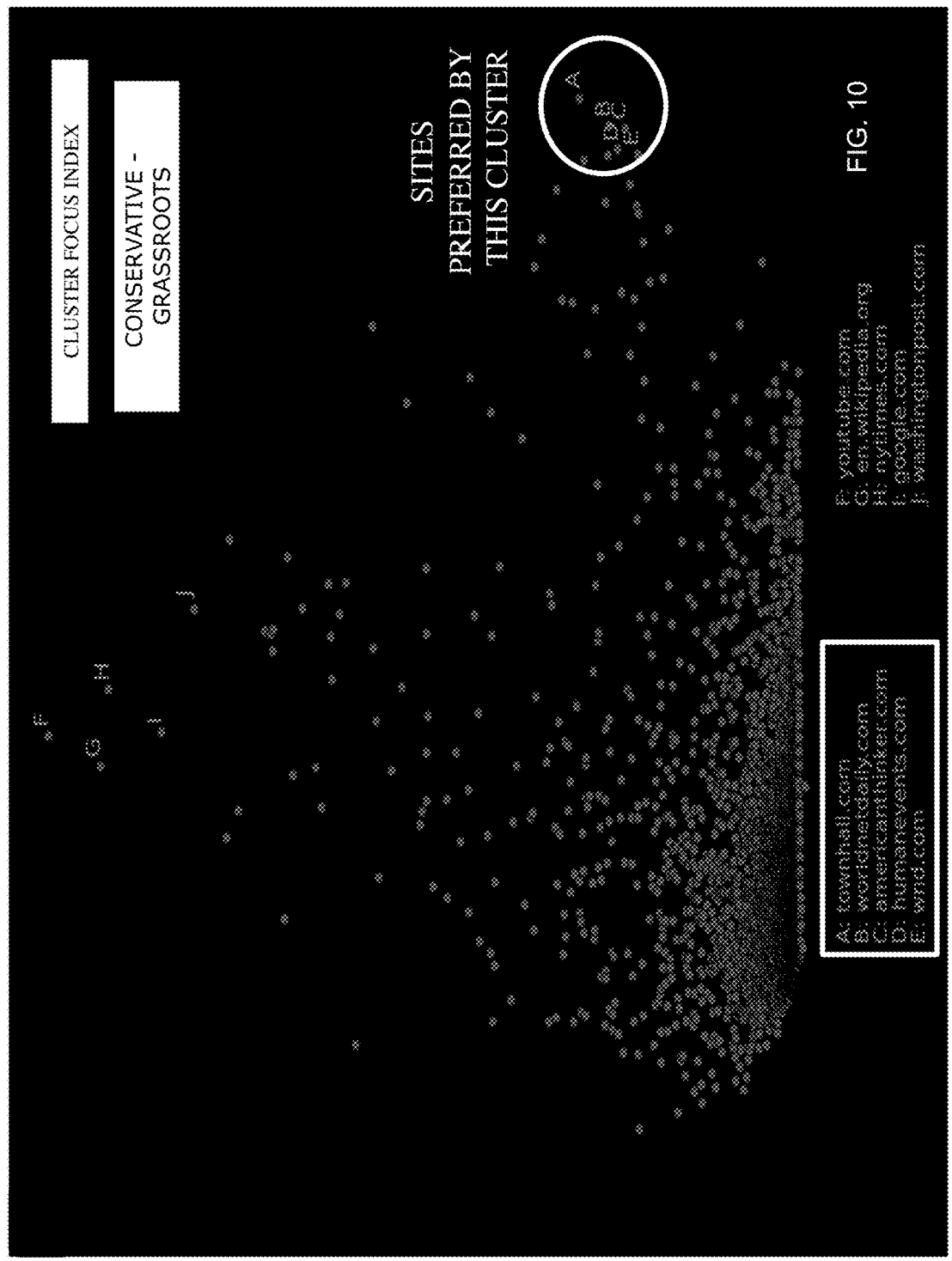
FIG. 10 depicts a graph of CFI scores.

To identify what an attentive cluster links to more than the network average or what words and phrases they use more than the network average, a cluster focus index score (CFI) may be calculated. CFI represents the degree to which an event, characteristic or behavior disproportionately occurs in a particular cluster, or a particular cluster, relative to the network, preferentially manifests an event, characteristic or behavior. For example, CFI score could be generated for a particular cluster across a set of target nodes, representing the degree to which a particular target is disproportionately and preferentially cited by members of the particular cluster, or the degree to which the particular cluster, relative to the network, preferentially cites the target. The CFI gives a sense of what is important to an attentive cluster, where they go for their information, what words, phrases and issues they discuss, and the like. FIG. 9 depicts a graph of cluster focus index scores for targets of a conservative-grassroots attentive cluster. The targets circled on FIG. 9 (F through J) are those that everyone in the network links to, according to their CFI. The targets circled in FIG. 10 (A through E) are those that are disproportionately linked to by the conservative-grassroots attentive cluster, according to their CFI.

In an embodiment, a method of identifying websites with high attention from an identified attentive cluster or author is provided. The method may include determining the websites frequently or preferentially cited by identified authors by examining the websites' cluster focus index (CFI) score. Further, the method may include automatically sending or placing advertisements, alerts, notifications, and the like to the websites. For example, a social network analysis may generate a network map with thousands of nodes clustered into attentive clusters. In an example with bloggers, influence data that results from the network analysis may be influence metrics for sites from across the Internet which bloggers link to, including mainstream media, niche media, Web 2.0, other bloggers, and the like. These are the influential sources (also called outlinks, or targets) used by specific groups of nodes across the map. For example, influencing a targeted cluster of bloggers can often be accomplished by targeting these sources, "upstream" in the information cycle, rather than going after the bloggers directly. In other embodiments, influence data may be metrics that reveal network influence among bloggers directly. Bloggers are usually thought of as simply being more influential or less, but this data lets the analyst discover which blogs are influential among which online clusters (segments), a far more granular and targeted approach. Each of these data sets can be sorted to examine either influence over the entire map or disproportionate influence over particular clusters (i.e.—how to reach particular audiences). Cluster targeting can be further refined to identify which nodes in a specific cluster have influence on any of the other clusters on the map. Because the conversation within social media covers a wide variety of topics, source and network influence alone do not necessarily reflect influence on a specific topic. A relevance index metric for discussion regarding particular topics, events, and the like may be added to a social network analysis to identify which nodes are most focused on this topic.

For both data sets there are two main sorts metrics representing influence. First are metrics representing the influence of nodes in the one-mode network (set of source nodes S) as a whole, or directly among particular clusters or among specific other nodes. For example, for any given node in S, count (also called in-degree) is the number of other nodes in S that link to it. Count can be calculated across the whole map, or per cluster. Second, score can be calculated that show the influence of target nodes (nodes in T or T') on clusters of nodes in S. Count can also be used, and CFI scores can be calculated that represent the influence of particular targets on specific attentive clusters. In other words, how specifically interesting or authoritative the target is for that cluster. Relevance index scores may for nodes may also be calculated using lists of semantic markers, to provide further metrics of value for targeting communications, advertising, and the like. Depending on the communications strategy, specific sorts of the data will create lists of likely high-value targets for further action. While count, CFI, and relevance index scores are all important, they can be combined in order to maximize certain objectives. The following use case examples include combining count and relevance into a targeting index, by multiplying their values. Other, more complicated maximization formulas are possible as well. The examples demonstrate specific influence sorts that can be generated from the Russian network data to address each use case. The network data is based on the linking patterns of the nodes in the RuNet map over a nine-month period ending in February 2010.

Use Case 1 and Use Case 2 involve finding influential sources. Use Case 1 involves identifying sources with the most influence over the entire map by doing a sort using the highest values of count. While extremely influential, and in many cases suitable for advertising campaigns, these universally salient sites also tend to be much harder to reach out to than sites that are smaller but specifically important to targeted segments.

Use Case 2 involves identifying sources that reach a targeted cluster by sorting on sources by Cluster Focus Index. CFIs may be sorted for any of the attentive clusters. Count metrics from the map as a whole and from the targeted cluster can be used to further prioritize for action. This sort is the equivalent of identifying traditional media trade press, the go-to sites for the selected segment. Frequently, these include specifically influential bloggers in addition to niche media and other sources.

Use Cases 3-6 involve finding influential nodes. Use Case 3 involves identifying the greatest network influence by sorting the nodes by indeg (total number of links from other nodes within the entire network). This sort specifically identifies the network's "A-list" nodes, the most influential network members (bloggers). Like prominent sources, these are often more difficult to reach than more targeted niche influentials, but they contribute greatly to spreading viral niche messages across the wider network.

Use Case 4 involves finding the most targeted influencers for a particular cluster by sorting the Cluster Focus Index scores for a targeted cluster to find nodes with cluster-specific influence. This identifies the nodes with particular influence, interest or prestige among the target cluster. These nodes tend to be much more "on topic" than others, and much easier to reach that map-wide A-list nodes. Cluster-specific influentials are not always from the target cluster itself, which can be very useful for trying to move discussion between particular clusters. Link metrics provide further assistance in deciding targeting priorities.

Use Case 5 involves following a particular topic at the map level by sorting using topic focus target scores, which combine links (network influence) and topic focus index (issue relevance). Formulas for calculating focus target score can be varied, but the default may be to multiply links by topic focus index. This may allow identification of those nodes in the entire map that discuss the target issue most frequently. These may be monitored to gauge dominant threads of discussion and opinion about the issue, and targeted for outreach.

Use Case 6 involves targeting a particular cluster's conversation on a topic by sorting within a cluster by the topic focus target score. This may allow members of the target cluster who write about the target issue to be identified for monitoring or persuasion. Variations of the formula for combining influence and relevance metrics into a single targeting metric can be used to bias the sort toward relevance, or toward influence, depending on strategic objective.

In an embodiment, a proximity cluster map method may be used to visualize 124 attentive cluster-based data and generate a network map. In the method, attentive clusters and heir constituent nodes may be displayed in a proximity cluster map. Nodes in the network map may be represented by individual dots, optionally represented by different colors, whose size is determined based on the number of other nodes on the map link to them. A general force may act to move dots toward the circular border of the map, while a specific force pulls together every pair of nodes connected by a link. In static images or an interactive visualization via software connected to a database, nodes may receive a visual treatment to display additional data of interest. For example, dots representing nodes may be lit or highlighted to represent all nodes linking to a particular target, or using a particular word, with other nodes darkened. In another example dot size may be varied to indicate a selected node metric.

Figure 8:
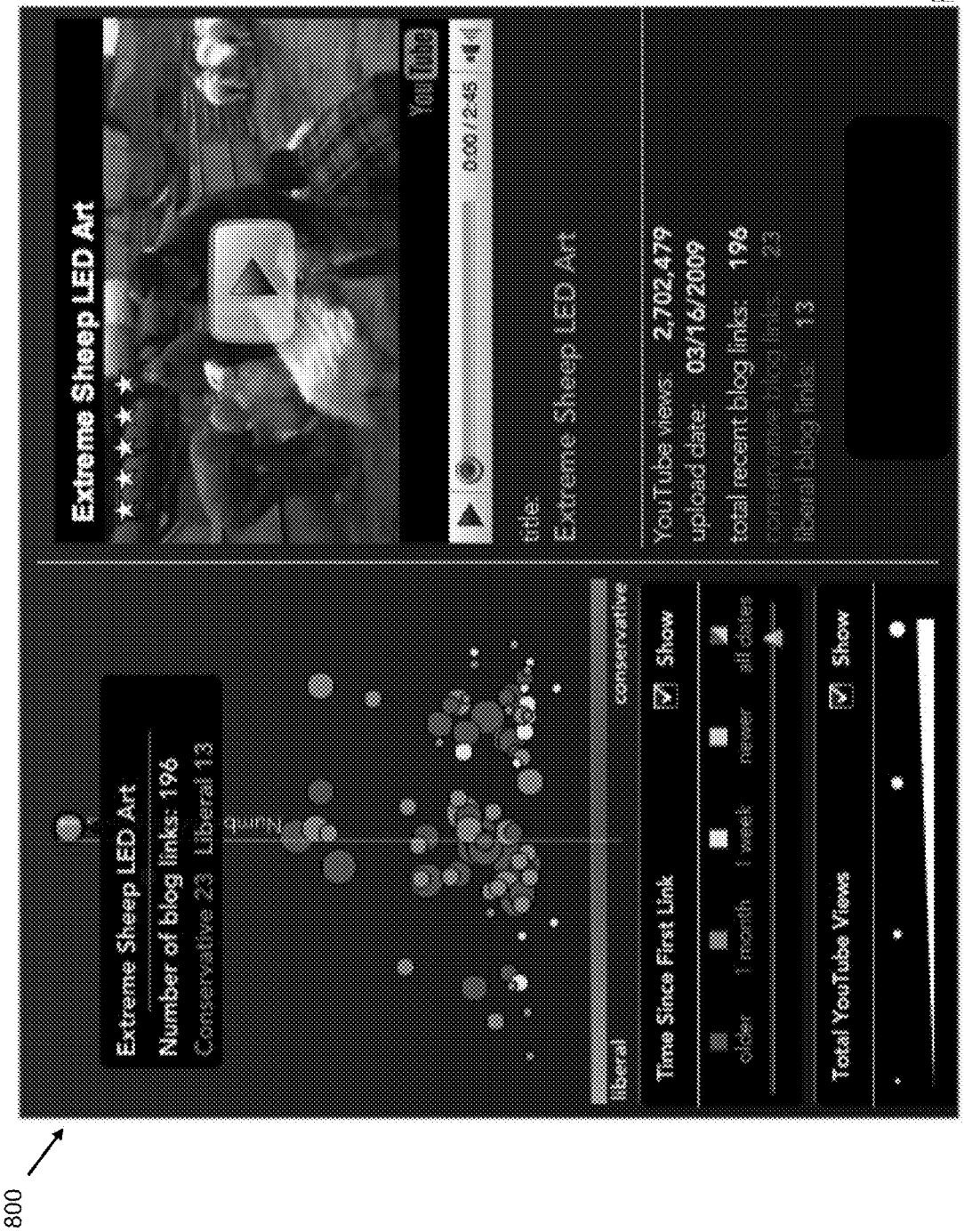
FIG. 8 depicts a Political Video Barometer valence graph.

In an embodiment, a valence graph method may be used to visualize 124 attentive cluster-based data and generate a valence graph. In the method, targets of attention or semantic elements occurring in the output of nodes may be displayed in a valence graph. The valence graph method may be understood via description of how a particular valence graph is built, such as a Political Video Barometer valence graph (FIG. 8) useful for discovering what videos liberal and conservative bloggers are writing about. This particular valence graph may be used to watch and track videos linked-to by bloggers who share a user's political opinions, view clips popular with the user's political "enemies", and the like.

The videos shown in the Barometer are chosen by queries against a large database built by network analysis engines performing network selection 102. Periodically, a crawler (or "spider") visits millions of blogs and collects their contents and links. Next, the system mines the links in these blogs to perform partitioning 104 and forms attentive clusters based on how the blogs link to one-another (primarily via their blog rolls), and, over time, what else the bloggers link to in common. Attentive clusters may be large or small, and the bigger ones can contain many sub-clusters and even sub-sub-clusters. In embodiments, determining what the blogs have in common may be done by examining meta-data, tags, language analysis, link target patterns, contextual understanding technology, or by human examination of the blogs or a subset thereof. In the example, American liberal bloggers and American conservative bloggers form the two largest sets of clusters in the English language blogosphere, and the Barometer draws upon roughly the 8,000 "most linked-to" blogs in each of these groups to position the videos on the graph by calculating proportions of links to each target by the two political cluster groupings.

The Barometer may be continually updated by scanning the blogs periodically, looking for new links to videos (or videos embedded right in the blogs). By counting these links, it can be determined what videos political bloggers are promoting. In embodiments, the link count may be displayed on the valence graph using an identifier such as icon or marker. In this example, some videos are linked to almost exclusively by liberal bloggers, some are linked to mostly by conservative bloggers, and a few are linked to more or less evenly by both groups. Once the system determines that a video has traction in the political clusters, it scans through data from other parts of the blogosphere to count how many "non-political" bloggers link to it as well.

The Political Video Barometer example illustrates one kind of valence graph and the insight that can be gained and the applications that can be built based on the method and the data obtained by the method. It should be understood that the method may be used to examine any sort of potentially cluster-able data, such as technology, celebrity gossip, the use of linguistic elements, the identification of new sub-clusters of particular interest, and the like. All aspects of the valence graph method, and the underlying attentive clustering analysis, may be customized along multiple variables to enable planning and monitoring campaigns of all kinds.

In an embodiment, a multi-cluster focus comparison method may enable comparing cluster focus index (CFI) scores of multiple attentive clusters. The CFI score may be a measure of the degree to which a particular outlink is of disproportionate interest to the attentive cluster being analyzed, in other words, the CFI indicates what link targets are of specific interest to a particular cluster beyond their general interest to the network as a whole. In an example, X may be the CFI score for cluster A and Y may be the CFI score for cluster B. The multi-cluster focus comparison method may compare the two clusters, A and B, based on their CFI scores, X and Y. This would allow a user to discern elements of common interest vs. divergent interest between the two clusters. Insights derived from this method would be of great value in creating and targeting advertising and communications campaigns.

Figure 11:
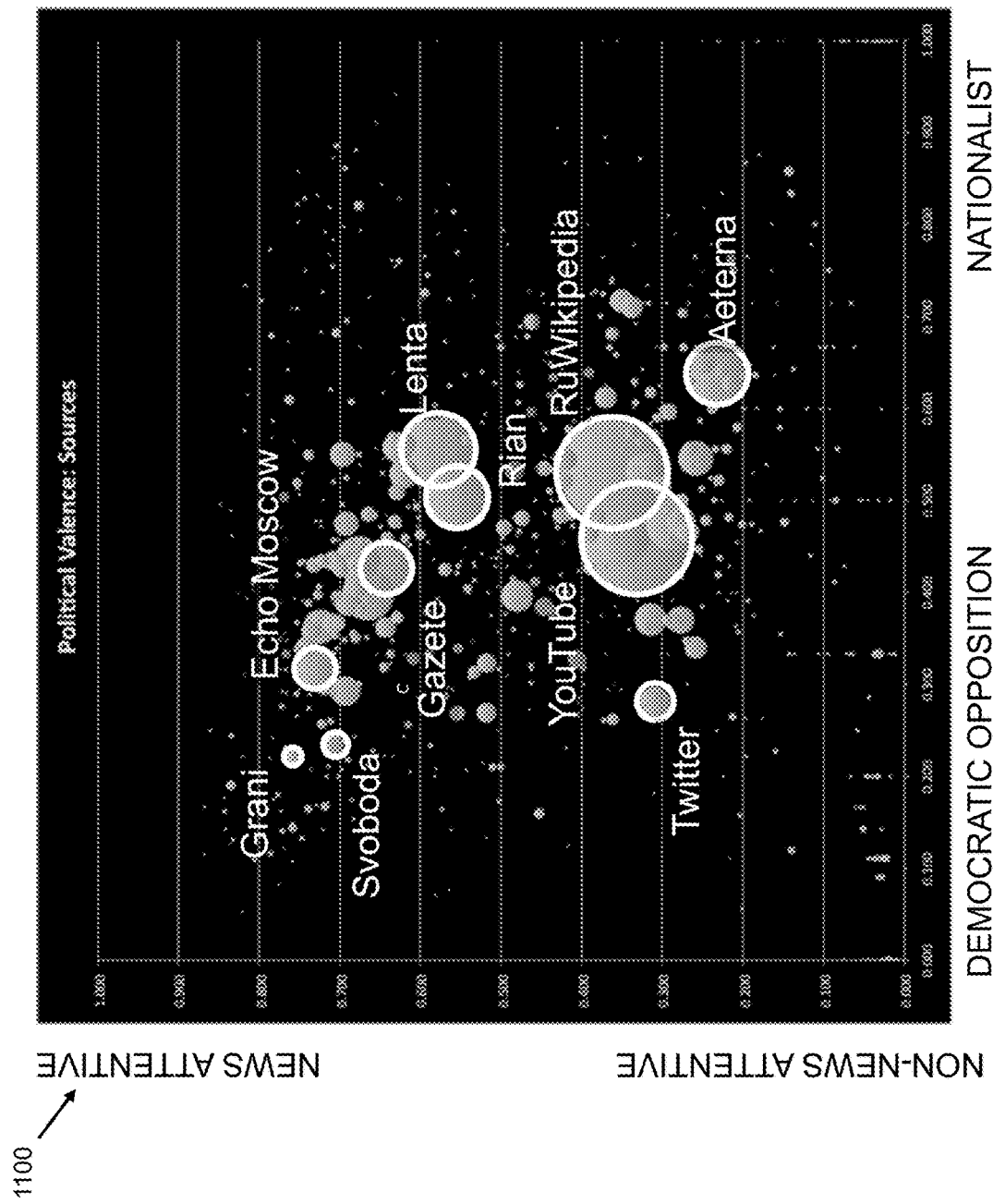
FIG. 11 depicts a bi-polar valence graph of link targets in the Russian blogosphere.
Figure 13:
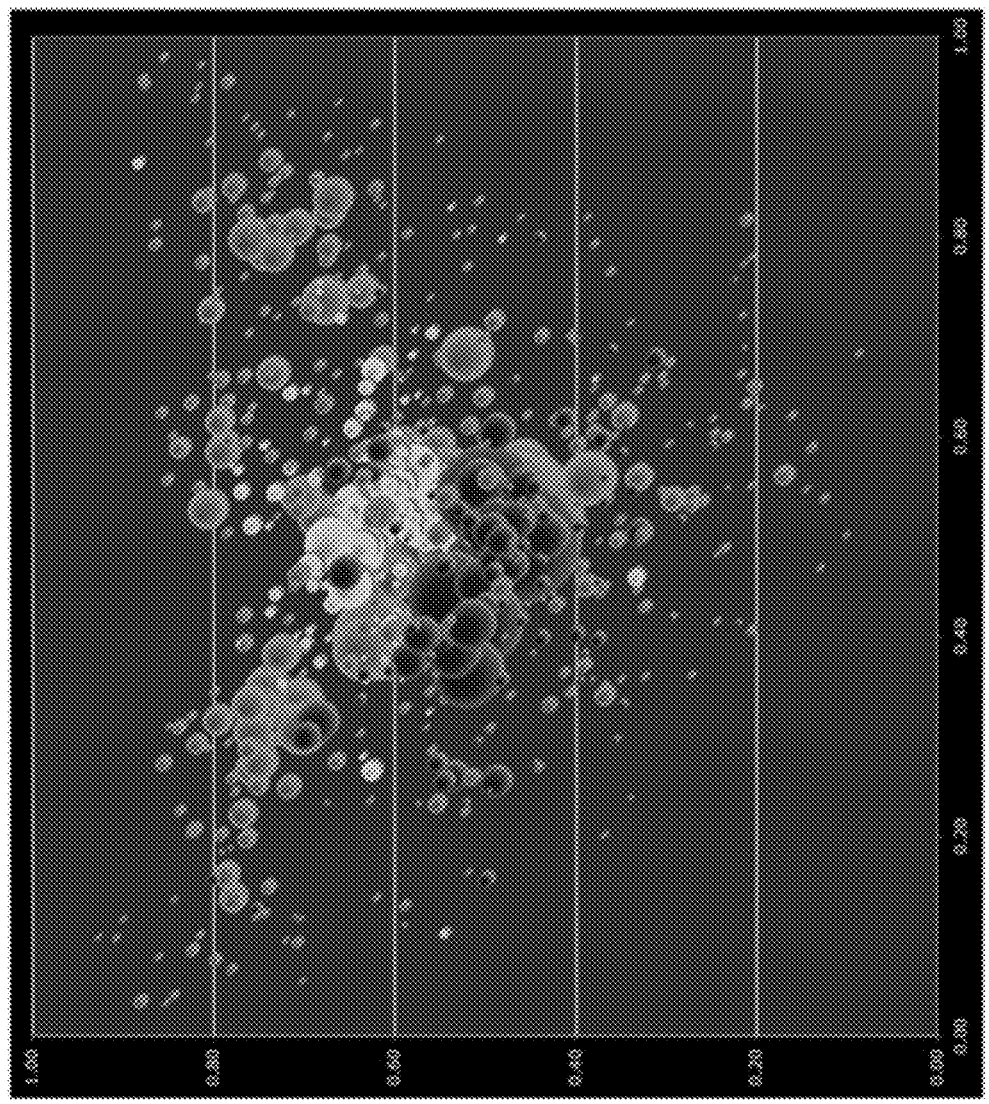
FIG. 13 depicts a valence graph of outlink targets organized by proportion of links from liberal vs. conservative bloggers.

In another embodiment, link targets, semantic events, and node-associated metadata may be scattered in an x-y coordinate space, and the dimensions of the graph may be custom-defined using sets of clusters grouped to represent substantive dimensions of interest for a particular analysis. Elements are plotted on X and Y according to the proportions of links from defined cluster groupings. For example, and referring to FIG. 11, using data from the Russian blogosphere, the top 2000 link targets for Russian bloggers may be plotted such that the proportion of links from "news-attentive" blog clusters vs. links from "non-news attentive" clusters determined the position on Y, while the proportion of links from the "Democratic Opposition" cluster vs. the "Nationalist" cluster determines the position on X, as shown in FIG. 11. In another example, popular outlink targets for the US blogosphere may be displayed with the X dimension representing the proportion Liberal vs. Conservative bloggers linking to them, and the proportion of political bloggers of any type vs. non-political bloggers represented by the Y dimension, as shown in FIG. 13. Various data may be visualized in the graph associated with the clusters of news-attentive and political bloggers, such as meta-data tags, words, links, tweets, words that occur within 10 words of a target word, and the like. These visualizations may be used in interactive software allowing user-driven exploration of the data graphed in valence space, optionally allowing user-defined sets of clusters to be used in calculating valence metrics.

In an embodiment, a method of node selection 110 based on node relevance to a defined issue, also known as semantic slicing, is provided. Semantic slicing may involve clustering according to a relevance bundle. A relevance bundle may include one or more of key markers, what the nodes may have linked to, what the nodes have posted, text elements, links, tags, and the like. In essence, semantic slicing involves pre-screened nodes for relevance based on semantic analysis.

The relevance bundles may be used to sort through all of the network data to select the top high relevance nodes. In an embodiment, a custom-mapping of a sub-set of the link economy may be done.

In an embodiment, semantic slicing may enable generating a contextualized report of interest to a user on an industry level. Semantic slicing may enable focusing attentive clustering on selected vertical markets. The vertical markets may be a group of similar businesses and customers who may engage in trade based on specific and specialized needs. Lists of semantic markers, such as key words and phrases, links to relevant websites and online content, and relevant metadata tags, are built which represent the relevant vertical market. Relevance metrics are calculated for candidate nodes, and a selection of high-relevance nodes are mapped and clustered, Continuing the example, the semantic slice may be done to analyze an energy policy vertical market by focusing the attentive clustering around one or more selected, highly relevant nodes. Thus, the attentive clusters may be more specific to identified domain interest of interest or vertical market. In this example, instead of just forming an attentive cluster of Conservative bloggers, by focusing attentive clustering on one or more key markers related to energy policy, the attentive clusters discovered include topic-relevant segmentations of particular kinds of Conservative bloggers discussing the issue, such as Conservative-Grassroots and Conservative-Beltway. Additional high-relevance attentive clusters may be identified, such as Climate Skeptics, Middle East policy, and the like. Cluster focus index scores may be used to determine what sites everyone in each cluster links to and which sites are preferred by the cluster. In an embodiment, semantic slicing may be done using a single node, such as a particular website, a particular piece of content, and the like. In an embodiment, semantic slicing may be done over a period of time to enable monitoring the impact of a campaign.

In an embodiment, a tool, such as software-as-a-service, for enabling users to define one or more semantic bundles for attentive clustering and as the basis of report outputs is provided. The tool may be an on-demand tool that may be used for semantic slicing. In such models, a user may declare a semantic bundle of nodes and/or links prior to attentive clustering.

In an embodiment, the system may provide an application programming interface (API) for delivering a segmentation to track one or more particular clusters of attention, or track how an audience is interacting with a piece of content, and the like. The data about the various clusters may be collected directly from the API. For example, a user may wish to track a cluster. The user may enter keywords related to the cluster in a search option provided by the API. Thereafter, the tool may track various websites and report back the weblinks and data that may be relevant to the cluster. The API may be used to interact with a valence graph at various resolutions. The API may provide segmentation data and metadata derived from the segmentation to other analytics and web data tracking firms, for use in their own client-facing tools and products. The segmentation and resultant data from attentive clustering provide an additional dimension of high value against which third-party tools and other analytic capabilities such as automated sentiment monitoring may be leveraged.

In an embodiment, the system may enable real-time selection of elements to visualize based on attentive clustering of social media. The system may facilitate selection of a stream of information based on looking at the environment, zooming in on a data element based on clustering, determining a valid emergent segmentation, and monitoring the flow of events in real time. The events may include media objects, text, key words/language, and the like. For example, the real-time selection of elements may facilitate an analysis of trends/events especially for financial purposes.

In an embodiment, a search engine may be provided that prioritizes search results being displayed to a user based on a determination of real-time attention including attention from a particular cluster or set of clusters. A user may be able to customize the prioritization of search results, such as by getting real-time attention from a particular cluster, from a particular sub-cluster, and the like.

In an embodiment, a search engine is provided that searches within only those sites/accounts with high cluster focus for a chosen segment. For example, a GOOGLE search may be restricted to the 30 websites with the highest CFI scores for the Dirt Bike racing cluster of OAKLEY's TWITTER followers map. Thus, the search may only return results from a list of key influential sites related to the chosen segment. In other embodiments, the search may be restricted to websites (or domains within them) with a particular CFI score, websites (or domains) that meet a threshold CFI score, websites that fall into a range of CFI scores for a chosen segment, websites with a particular M score, and the like. In an embodiment, the search query may restrict the search to particular websites that are identified based on the CFI scores. In an embodiment, the search query may be restricted by CFI score of a website and the CFI score restriction may be indicated in the settings of the search engine. In other embodiments, the CFI score for sites to search may be indicated in the search string itself. For example, a user may indicate a particular search they want to perform and they may be provided with a slider bar where the user indicates that the search should be restricted to those websites with a CFI score falling into the range selected on the slider bar. The slider may be provided with a normalized scale, such as ascribing 1 to low CFI scores and 10 to high CFI scores, such as using a linear, logarithmic, or other scaling process. The system may then search a database of websites for the range of CFI scores to identify one or more websites to which to limit the search. These websites are then included in a search string that is provided to a search engine.

Similarly, the search can be restricted to only specific content, or specific content may be promoted to high ranking within a search, leaving other content to the lower ranked results. One way to do this restriction is to utilize the valence mapping functionality of the system. As described herein, a valence graph may be constructed for a chosen segment that depicts words, phrases, links, objects, and the like that are preferred by one cluster over another cluster. Content indicated in the valence graph may be indexed by the system and only that content in the valence graph may be searched by a search engine. Further restriction of the content may be employed, such as by website, CFI score, and the like.

In an embodiment, attentive clustering and related analyses may result in identifying issues, attitudes and messaging language that may be specific to discourse for a target market, and may be suitable for presentation in a report. For example, in a clustering of bloggers sympathetic to Arts in Schools, by examining intra-cluster linking patterns, it may be determined that most of the bloggers within each cluster tend to keep the discussion within their cluster except for the bloggers in the "Interesting/teachers/educators" cluster who have a tendency to spread conversation to each of the other clusters. This behavior points to an opportunity to work with these bloggers to spread messages across the space. In continuing with the example, by examining clustering related to specific keywords, websites, outlinks, objects, and the like, it may be determined that there is a broader discussion about education and education reform than about arts and arts education. Therefore, a conclusion may be that introducing an arts education message to education discussions has more potential than introducing arts education messages to arts discussions. In the report, various valence graphs may be presented, such as cluster specific term valence maps, maps of sources, outlink maps, term specific maps, issue maps, and the like. Alternatively, the report may be presented as a spreadsheet of data.

In an embodiment of the present disclosure, the report may feed into a method of generating a campaign blueprint for both social and upstream media sources and a method of identifying influence inter-cluster and intra-cluster in order to plan a campaign. The blueprint may include target audience, demographic details, objectives of the campaign, flow of the campaign, messaging to use in the campaign, outlinks to target, and the like. Systems and methods for measuring the success of a campaign in various online segments and generating targeted data sets identifying sub-clusters specific to a user's identity or objective are provided.

In an exemplary embodiment, the campaign tracker may track data from a variety of sources to provide closed-loop return on investment (ROI) analysis. The tool may parse the information of each website accessed by the users, keywords entered, any information about the campaign, and the like. Further, the tool may track how people react to the campaigns and which ones are most successful. The campaign tracker may track and analyze results in real-time to determine the effectiveness of the campaigns.

In addition, the tool may enable the system to generate reports for clients. The reports may include details about the campaigns such as campaign type, number of people who have viewed the campaign, any feedback from the people, and the like.

In an embodiment, analyst coding tools (ACT) and a survey integrator may support distributed metadata collection for qualitative analysis to best interpret quantitative findings. The tools may include an interactive visual interface for navigating complex data sets and harvesting content. This interface may contain an interactive proximity cluster map which can display specific node data, metadata, search results, and the like. This proximity cluster map interface may enable the user to click on nodes to see node-specific metadata and to open the node URL in a browser window or external browser. Using the tools, a user can add metadata and view metadata about any given blogger on a map. The tools enable grabbing whole sets of blogs or items to add to semantic lists, and may enable a user to define surveys so a team of human coders can open the website and fill out surveys.

In an embodiment of the present disclosure, a dashboard may be provided. The dashboard may combine advanced network and text analysis, real-time updates, team-based data collection and management, and the like. In the embodiment, the dashboard may also include flexible tools and interfaces for both "big picture" views and minute-by-minute updates on messages as they move through networks. Using the dashboard, a user may define bundles and track them in the aggregate through networks over time. Using the dashboard, a user may be able to see how specific media objects are doing with a particular cluster over time.

Figure 12:
FIG. 12 depicts an interactive burstmap interface

In an embodiment, the dashboard may provide a burstmap feature in which the history of selected events or sets of events over a timeframe may be displayed using a proximity cluster map. During playback, nodes in the map will light up at a time corresponding to their participation in the selected event or events. For example, at a time in playback representing a certain date, every node which linked to a particular YouTube video will light up, allowing the user to see the pattern of linking as it unfolded over time. Optionally, this burstmap feature may include a timeline view displaying event-related metrics over time, such as the number of nodes linking to a particular video. Optionally, the burstmap feature may include lists of events available for display. An example of a burstmap interface is found in FIG. 12.

In an embodiment, techniques disclosed herein may be used to generate social media maps that visualize social media relationship data and enable utilization of a suite of metrics on the data. Social media maps may be constructed via clustering of various social media communities including TWITTER, FACEBOOK, blogs, online social media, and others. In one embodiment, the clustering technique used may be manual, relationship-based, attentive clustering such as previously disclosed herein, network segmentation, or another analogous technique. The social media maps may be organized in portfolios that are targeted to market segments or relate to an issue/topic campaign. Social media maps may be offered via an API or as raw data to plug into a third party dashboard. Services related to the social media maps that may be offered include robust tools for searching, comparing and generating integrated reports across multiple maps. searchable indexing and map browsing. Pricing for social media maps may be via subscription, for one or more maps, a portfolio of maps, the whole portfolio of maps, the whole portfolio maps save some exclusive/custom items, or the like. Systems and methods for how to generate, utilize, update and offer social media maps will be further described herein.

A comprehensive catalog of social media maps and network segmentations may be offered and updated on a regular basis. The catalog may include targeted portfolios for key markets, such as consumer goods, media and entertainment, politics and public policy, energy, science and technology, government, and more. The catalog may contain maps for each layer of the social media system, such as blogs, Twitter, social network services, forums, and the like. It may contain maps for all major languages, countries and regions of the world. Social media map data may be used within partner dashboard systems, so that a range of commercial tools can be leveraged by subscribers and so that the social media map data are "portable" across various tools. In addition, a suite of reporting tools may be used in conjunction with the social media maps.

Figure 14:
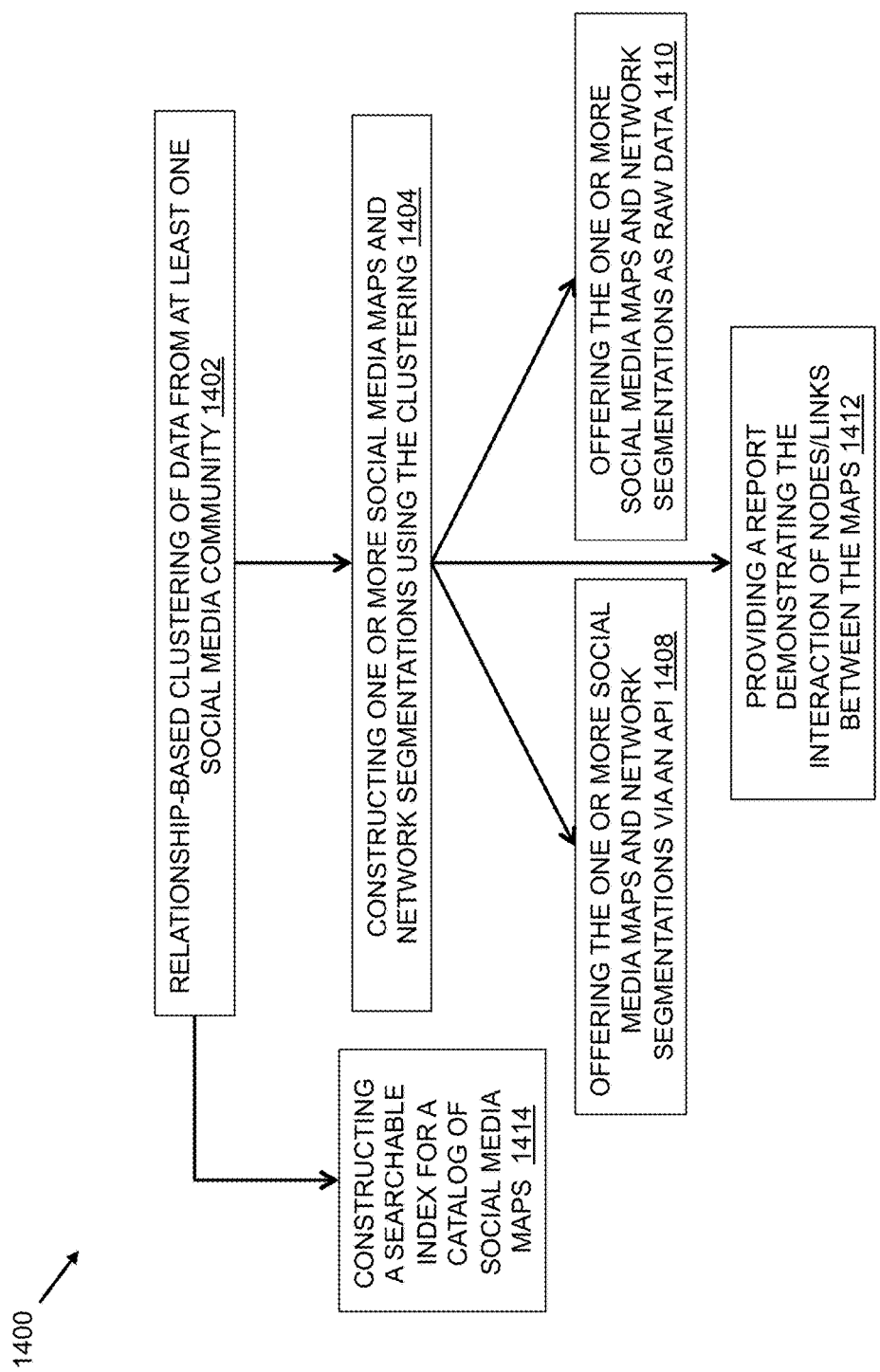
FIG. 14 depicts a flow diagram relating to social media maps.

In an embodiment, one or more social media maps and network segmentations may be constructed via clustering of data from at least one social media community. The social media map or network segmentation may be offered via an API or as raw data. The social media community may be based on at least one of a social media layer, a language, a country, a region, or the like. In some embodiments, the clustering technique may be attentive clustering, as described previously herein, relationship-based, manual, network segmentation, or the like. Referring now to FIG. 14, relationship-based clustering of data from at least one social media community 1402 is used to construct one or more social media maps and network segmentations using the clustering 1404. One or more social media maps and network segmentations may be offered via an API 1408 or as raw data 1410. A report may demonstrate the interaction of nodes/links between the maps 1412.

In embodiments, the maps may be generated by an autonomous process. The autonomous process may create maps based on one or more criteria, a scope definition, an instruction, or the like. For example, a social graph may be generated based on followers of an individual or entity in a social network. In another example, the map criteria may be semantically based, such as based on key words or hashtags. In yet another example, the maps may be geo-based, such as based on which users/nodes are in a territory. In still another example, the maps may be based on previous mappings. In this example, segments in other maps on health and fitness may be used to triangulate or iterate to a mapping of a new category. In another example, the map may be based on an arbitrary set of accounts generated by a third party. One scenario might be a mapping of the social network accounts for all the users of a mobile application. In still another example, the maps may be based on a nomination of individuals based on some criteria, such as demographics. Once generated, the maps may be stored and indexed.

In embodiments, maps may be based on CFI scores for dynamic data (e.g. YOUTUBE videos). However, the amount of data may be increased to obtain a better indication of what the segment is communicating about whether data can be obtained on the influencers of a segment, which may be coming from off the map. In addition to looking at data coming from the segment, the system may be able to access data from social media accounts that have high CFI for that segment (not just the ones that are "in" the segment). Thus, calculating cluster focus for the dynamic data may be improved. CFI scores may be calculated for a first segment. Then, CFI scores may be calculated for those influencers on the first segment. For example, the first segment may be followers of a particular art gallery but the system can also examine the CFI for the first segment's influencers, which may be several well-known Art Gallery aficionados who may or may not be followers of the particular art gallery. In embodiments, certain maps may be based only on the CFI scores calculated for the influencers.

A searchable index for a catalog of social media maps may be constructed 1414. Further, social media maps in the catalog may be searchable. For example, the maps may be searchable by a keyword, a URL, a semantic marker, and the like. In embodiments, the social media maps may be indexed by one or more of a keyword, URL or semantic marker so as to form a searchable index of social media maps. In embodiments, the searchable index may include metrics to indicate a statistic regarding the social media maps. For example, the statistic may represent a dimension of popularity, relevance, semantic density, or similar feature. For example, a search engine may be enabled to return maps in terms of relevance by using certain statistics in the searchable index.

For example, a semantic marker may include a keyword, a phrase, a URL (node or object level), a tag (such as those from bookmarking and annotation services, meta keywords extracted from HTML, tags assigned by coders, etc.), and the like. Semantic markers may also include those used in particular social network environments, such as TWITTER, and may include follows relationships, mentions, re-tweets, replies, hashtags, URL targets, and the like. Any of these semantic markers may be used to index a social media map.

Based on at least one of the search terms or the search results, a new social media map subscription may be suggested. For example, if a user searches a social media map index for the terms "Nissan LEAF", "electric vehicle", and leafstations.com, subscriptions to social media maps such as automobiles, eco-friendly products, and California trends may be suggested.

In an embodiment, a dashboard may be used for browsing, visualizing, manipulating, and calculating metrics for one or more social media maps constructed via clustering of data from at least one social media community. Clustering techniques may include relationship-based, manual, attentive clustering, or the like. In some embodiments, the dashboard may be a third party dashboard that supports visualization of data from clustering, wherein the data may be delivered by a raw data feed, an API plug-in, or any other data delivery method. In embodiments, the data from clustering may be joined with or otherwise integrated with data from other data sources to form a new data set. The new data set may be similarly browsed, visualized, manipulated, and processed by dashboards.

In an embodiment, APIs, dashboards, and partner tools may be used with social media maps for planning/assessment. For example, social media maps may be used for enterprise resource planning, business insight, marketing, search engine optimization, intelligence, politics, industry verticals, financial industry, and the like. For example, an entertainment promotion company may own a plurality of social media accounts. If they could navigate sector-level mappings related to genres of music, they could use the maps to target music genre-specific messages using the most appropriate of those accounts for maximum effectiveness.

In embodiments, custom maps may be derived from mashing up sets of social media maps.

In an embodiment, the social media maps may be constructed via clustering (e.g. relationship-based, manual, attentive, etc.) of data from at least one social media community targeted to a specific market segment. For example, the market segments may include government intelligence, public diplomacy, social media landscapes in other countries, pharmaceuticals, medical, health care, sports, parenting, consumer products, energy, and the like. In these embodiments, the market segment may be used to index the social media maps.

In an embodiment, a reporting product may leverage social media maps to demonstrate the interaction of nodes and/or links between social media maps. For example, a multi-map report may be generated comparing the nodes and links in different social media communities in a particular market/environment. The reporting product may be integrated with a dashboard or analytics platform. Multi-map reports generated by the reporting product may be used to demonstrate various phenomena, such as how particular items can be found in particular social media layers. For example, a multi-map report may demonstrate how weblog hosts are having customers driven to them from TWITTER. In another example, a multi-map report may demonstrate how FACEBOOK pages are getting attention from a segment of TWITTER.

In an embodiment, information derived from the social media maps, including portions of or the entire map itself, may be published or displayed as a map widget, which may enable monitoring an ongoing stream of information from one or more clusters or one or more maps. Information being displayed that is derived from the social media map may be customizable within the widget, such as via a dialog box, menu item, or the like. A user may be able to, optionally in real time through a user interface, select a stream of information based on looking at the environment, zoom in based on clustering, figure out a valid emergent segmentation, and then set up monitors to watch the flow of events, such as media objects, text, key words/language, and the like, in real time. The published, widgetized map acts as a sensor network to obtain a host of behavioral data and leads that can be leveraged by the map's user or hosts. In embodiments, users may interact with other users' map widgets to discover content and individuals/entities. Using other users' map widgets, users may grow their own networks by engaging with the content and people/entities in the widget, such as to start following a person or to re-tweet an item.

There are at least three processes that yield attributes of nodes including calculating a relevance score, performing a CFI bias weighting, and identifying nodes as "allowed" or "not allowed" (e.g. blacklist/whitelist). Automated social media map refresh may leverage one or more of these processes.

Figure 15:
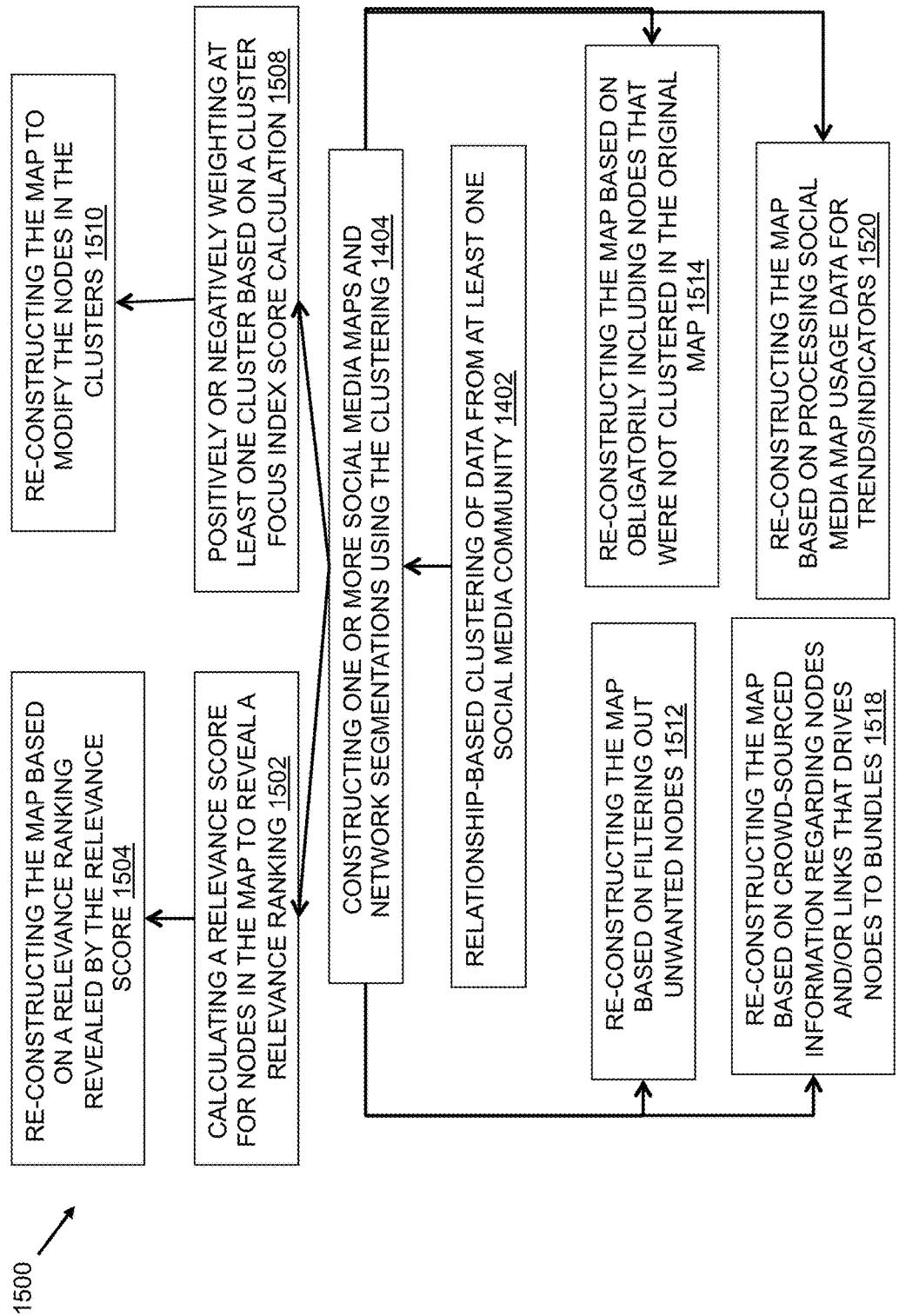
FIG. 15 depicts a flow diagram relating to refreshing social media maps.

In an embodiment and referring to FIG. 15, a social media map may be automatically refreshed via calculating a relevance score for nodes or bundles in the map 1502 and re-constructing the map based on a relevance ranking revealed by the relevance score 1504. Semantic/relevance marker bundles may include lists of semantic markers like key words, phrases, relevant link targets, accounts that are followed on TWITTER, and the like. Semantic markers may be manually curated. In an embodiment, the refresh process may involve performing the relevance search/semantic slice that generated the original map for new relevance/semantic markers. A relevance calculation may be performed on the nodes to calculate a relevance score.

In another embodiment, a social media map may be automatically refreshed via positively or negatively weighting at least one cluster based on a CFI score calculation 1508 and re-constructing the map to modify the nodes in the clusters 1510. Modifying the nodes may be done to include positively weighted nodes and exclude negatively weighted nodes. CFI scores for clusters may be leveraged to evolve a map in a certain direction. Clusters in the map that include preferred/wanted nodes/links are positively weighted. Clusters are negatively weighted in they are deemed to not be relevant. Applying weightings to the map may enable pulling in additional nodes that are more relevant. Weighting map clusters for the CFI bias operation may be done by humans.

In an embodiment, a social media map may be automatically refreshed via filtering out unwanted nodes 1512. In an embodiment, a social media map may be automatically refreshed via obligatorily including nodes that were not clustered in the original map 1514. Semantic markers that are known to not fit based on their relevance ranking or for some other reason are not allowed are filtered out. In embodiments, nodes may be forced into the map whether or not they were identified in the relevance search/semantic slice. Curating black lists of nodes may be done by humans.

In an embodiment, a social media map may be automatically refreshed via crowd-sourced information regarding nodes and/or links that drive nodes to bundles 1518. In an embodiment, a social media map may be automatically refreshed via processing social media map usage data for trends/indicators 1520. Usage data may relate to one or more of what is ignored, what is further explored, what is used, how clusters are grouped, what name/label is assigned to a cluster, what color is used for a cluster, what order/position the cluster is placed in a report, and the like. Nodes preferentially interacted with may be weighted more heavily.

In embodiments, community feedback may influence each of the three streams of automated map refresh described herein. Community feedback provides an indication of news, events, information, etc. that may drive addition of nodes to the bundles, such as for example, if a new website is a target link. This sort of feedback may provide feedback or guidance as to the CFI bias operation. For example, if feedback suggests that a cluster is relevant, then that cluster may be positively weighted Feedback and updating may based on how people are using the maps, such as understanding what they ignore, what they drill down on, what they use, how they want to group things, what name/label they assign a cluster, what color they use for a cluster, what clusters are most important to a client based on an order/position the client places it in a report, and the like. Refreshing the maps may leverage this captured information.

In an embodiment, feedback may be received passively from clickable/interactive maps via a built-in feedback system. This feedback system may be used as a naïve weighting system. In an embodiment, the map may include a flag available to provide commentary or feedback In an example, a map may include raw clusters and human-made groupings and the attachment of other sort of metadata such as the coloring of a cluster. The example may be that of the Russian blogosphere, which may contain 40 clusters and 7-8 groups, including 5 right wing Russian nationalist groups and a liberal opposition group. Clusters may be processed by human-assigned re-aggregation, and metrics may be run against them to progressively refine the clusters. Different clients, even on a base map, may want to group things differently, name a cluster in an interface differently, color a cluster in an interface differently, and the like. Users need to be able to define groups, re-label clusters, select clusters and the like. Community feedback may provide observations as to how users are grouping the same map and that yields data about which clusters are related to each other that is "crowd-sourced" to the user. Users may define the order in which the data are presented in the reporting. For example, a user may want to place data on preferred clusters higher in a chart. Cluster ordering and positioning information is customizable, which can be harvested as an importance weighting by the community.

In another example, map users may contribute to map metadata to generate a community data set established and/or expanded by users. For example, users could input the gender of a Tweeter/blogger. The user community itself may be a segmentable population. The user community can contribute to scoping a map for a particular topic. For example, something about a disease might appear in various places: Consumer segments, Politics, Medical/science, Sports, and the like. User feedback may also help scope the size of the map. For example, a user may ask: Should the map be constructed on the first 5,000 targets or should we use 20,000 targets? In an embodiment, user-contributed data may be used to provide metadata for a social media map constructed via clustering (e.g. relationship-based, manual, attentive, or the like) of data from at least one social media community.

Figure 16:
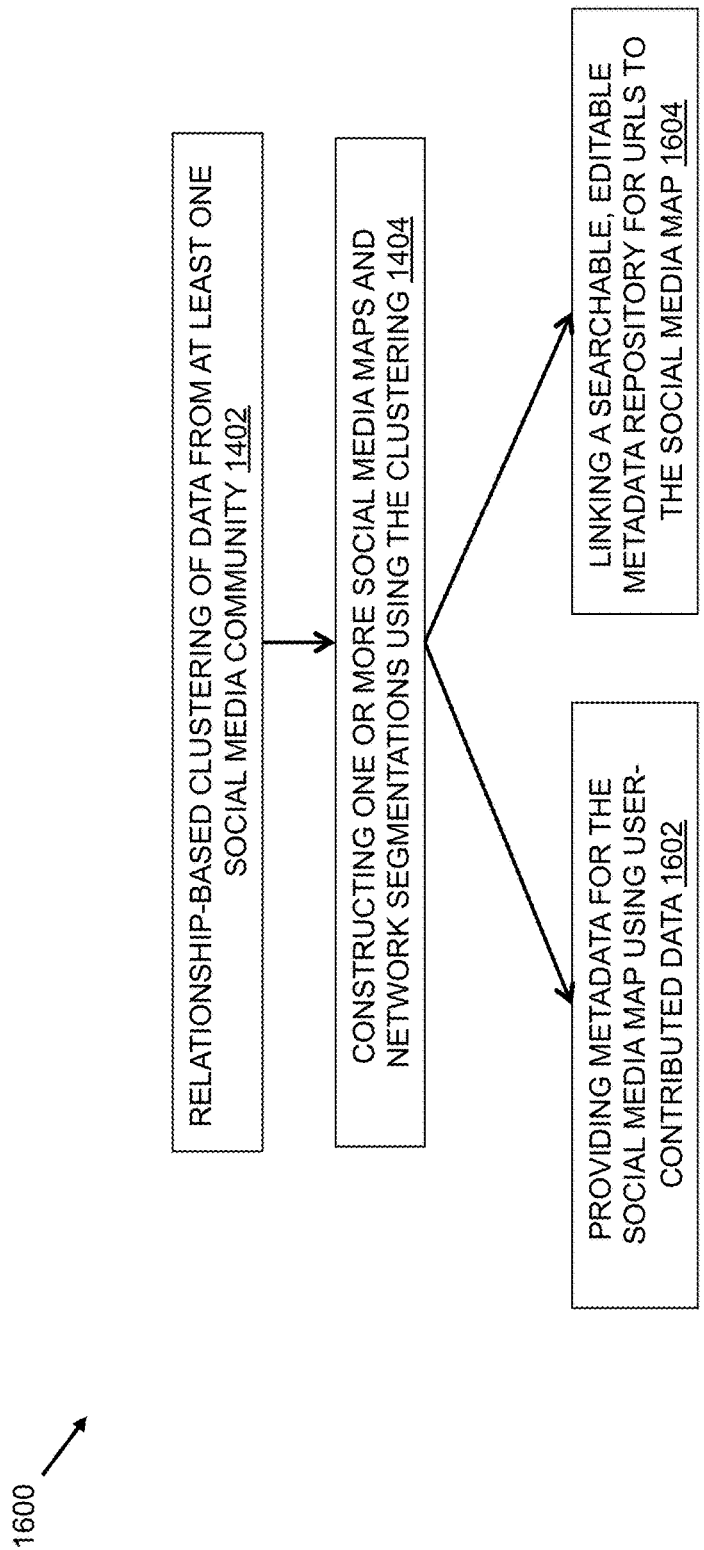
FIG. 16 depicts a flow diagram relating to social media maps.

In an embodiment and referring to FIG. 16, data, including user-contributed data, may form a searchable, editable metadata and basic information repository for URLs 1602, such as to form a URLipedia. The repository may be linked to one or more social media maps 1604.

Figure 17:
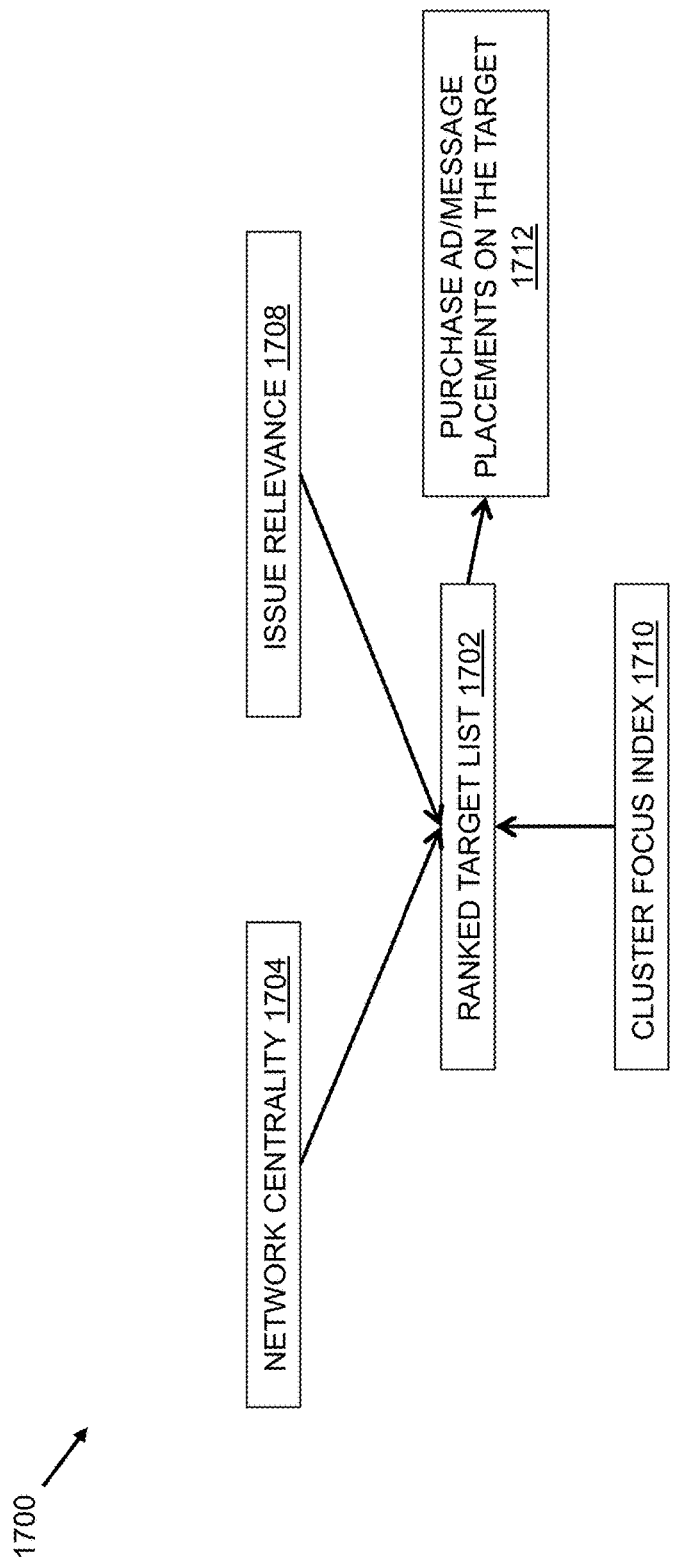
FIG. 17 depicts formation of a ranked target list.

In an embodiment and referring to FIG. 17, clustering (e.g. relationship-based, manual, attentive, or the like) of data from at least one social media community may be used to generate an actionable targeting list. Targeting lists combine network centrality 1704, issue relevance 1708 and CFI for a cluster 1710 into a ranked target list 1702 that may be used by marketers or other interested parties in order to reach certain nodes in some meaningful order for targeting for strategic communication or other business purpose. The formula of combination may be adjusted to maximize ranking to suit client/user objectives. In an embodiment, network centrality may be a universal score related to how central a node is in the network. For example, daytime talk show hosts may have a network centrality of 100 in the general population, while economists may be a zero. In an embodiment, a Cluster Focus Index score may be calculated for each cluster. For example, daytime talk show hosts may be a zero CFI for economics, but economists are 100. In an embodiment, an issue relevance score may be calculated for each cluster. For example, the issue relevance related to the budget deficit may be calculated based on a publication frequency score (e.g. # of tweets). Other score techniques may be used to calculate an issue relevance.

In an embodiment, users may be able to purchase ads or message placements on a target from the targeting list 1712. From the targeting list, users may be enabled to buy an ad placement or message placement on the target site at the click of a button. In an embodiment, the effect, or impact, of the ad/message placements may be tracked for the node and across a social media map. Thus, the system may enable users to identify targets according to a ranked list based on network centrality, CFI, and issue relevance, and then place and track ads/messages on the targets from the lists. In another embodiment, targeting lists may be used in connection with any ad network for ad/message placement. Tracking ads/messages may involve receiving feedback on actions taken with respect to the ads/messages, calculating impact metrics, and the like.

In an embodiment, a historical data browser may provide a mechanism for visualizing archived, historical social media map data, such as for research or historical purposes. For example, there may be value to academia of accumulating old social media maps and showing the delta between them, such as to explore how the market has evolved over some period of time. Historical social media map data may also be useful for financial industry forensics and intelligence analysis.

In an embodiment, CFI metrics may be displayed on a social media map. A CFI metric for items in clusters indicates how much attention there is to that item for that cluster. An attention score indicates the relative attention to an item as compared to other items for a cluster for a range of time or for a "point" in time. A higher attention score means the item is more specific to the cluster. Attention scores are non-linear in the sense that anything below two is not significant and greater than two, it is exponentially significant.

CFI scores may be a metric for measuring search engine optimization and/or advertising effectiveness because it represents cluster specificity. CFI metrics would have to be combined with a more global metric to enable companies to shift from thinking at the execution/implementation layer (e.g. where do I advertise?) to the strategic layer (e.g. where are we going with this community?).

In an embodiment, a CFI Graph may include CFI scores for sources and nodes on the map. In the upper right of the map are clusters with high focus on the particular cluster, high overall level of attention, and many in-links. On the CFI graph, users can see various items at a glance. For example, users may find the key players related to a topic or the landscape of players to determine who has influence.

In an embodiment, a CFI graph may include a Cluster Map Properties Editor/User Interface. The interface enables users to label clusters, assign clusters to a group, and perform group metrics.

Maps may be generated based on semantic elements, bundles, white lists, black lists, and the like in an automated fashion in come embodiments but labeling the clusters in an automated way, such as when a map update is made, may be difficult. Draft labels may be assigned when the cluster is created or updated based on a previous storehouse of knowledge. A confidence score as to that labeling may be generated. To automate the labeling, members of a cluster may be compared with membership of clusters of past maps and if a high percentage are the same then it is assumed the clusters relate to the same thing and are labeled similarly. In another embodiment, automated labeling is based on a structural equivalence. Labeling a node or an object that has well defined properties may be easier than labeling a cluster, which is a collection of objects. Structural equivalence involves examining the node's outlinks. For example, if people are friends with the same people, then they may have similar interests. In another example, blogs that link to the same sets of things are likely to be similar. In yet another example, if there are two people who have superior relationships to twenty soldiers, chances are that the two people are sergeants or some other form of commander. While this may work at the node level, it is harder to do at the cluster level. CFI scores, which are already generated for clusters, may be used in the generation of labels. For example, for two clusters with numerous links from nodes in these clusters to other nodes, it is difficult to compare the clusters at face value. One might just be larger, more popular, or have more links. However, CFI scores enables a comparison between two items or sets of items that a cluster may be disproportionately paying attention to. For example, Cluster 1 is very interested in horses and baseball, while Cluster 2 is very interested in horses and basketball. Given the CFI scores, vector cosine similarity can be used to determine the relationship between the two clusters. For each cluster, vectors can be built based on the CFI scores calculated for each of the clusters for the same items (e.g.: Cluster 1=CFI 1(1), CFI1(2) . . . etc.; Cluster 2=CFI2(1), CFI2(2) . . . , etc.) The vectors may be plotted in a 3D vector space. The cosine of the angle between the two vectors may be one indication of the relationship between the two clusters. If the cosine is small, the confidence is high. As maps are updated with new content, clusters in the new map can be compared to clusters of old maps. When there is a match, that is, a small angle between two cluster vectors, the label from the cluster in the old map is assigned to the cluster in the new map. In embodiments, the cosine of the angle may also act as a similarity score. There are a number of measures for vector distance, including correlation distance, cosine similarity, Euclidian distance, and the like.

In embodiments, to limit the number of CFI's to include in vector generation the CFI's may be filtered to include only a CFI of two or more on a particular cluster. This effectively reduces the dimensionality of the space.

In other embodiments, items that are similar may be aggregated in labeling. For example, using outlink bundles rather than an individual CFI score may enable grouping items into target clusters and examining the density of links to the target cluster.

In an embodiment, an advertising campaign planning tool can enable running a campaign on blogs, and tracking success in other layers (e.g. TWITTER; FACEBOOK; segment-specific online forums).

In an embodiment, URL shorteners included in social media content may be tracked. The system may provide reporting outputs that track the success of a social media campaign including a URL shortener in different layers of the social media system. The system may not only be used to plan the campaign, but may also be used to report on the TWITTER bounce from blog activity or the FACEBOOK bounce from blog activity, for example.

In an embodiment, the system may enable campaign planning (e.g. domestic, international, multi-platform, multi-network, etc.) where language is not a required first limitation. For example, the system may enable campaign planning in marketing such as for consumer goods, media and entertainment, movie marketing, video games, social games, music, international product launches, talent agencies, public diplomacy, public health, political campaigns, and the like. Campaigns may be tracked, such as with a chronotope analysis, as will be further described herein, to determine a pattern that exists in time and space determined by combining temporal and network features in the analysis of the segments/clusters.

In an embodiment, the system may marry internal reporting with other reporting tools such as splash, resonance, clicks, transactions, and the like.

In an embodiment, the system enables analysis and prediction, such as in the financial industry (e.g. market predictions and trading positions), social media firms whose value is built around prediction, and the like.

In embodiments, third party data and clusters may be used with the mapping techniques described herein.

In embodiments, models may be built on one or more clusters using tools that can be accessed across clusters.

Figure 23:
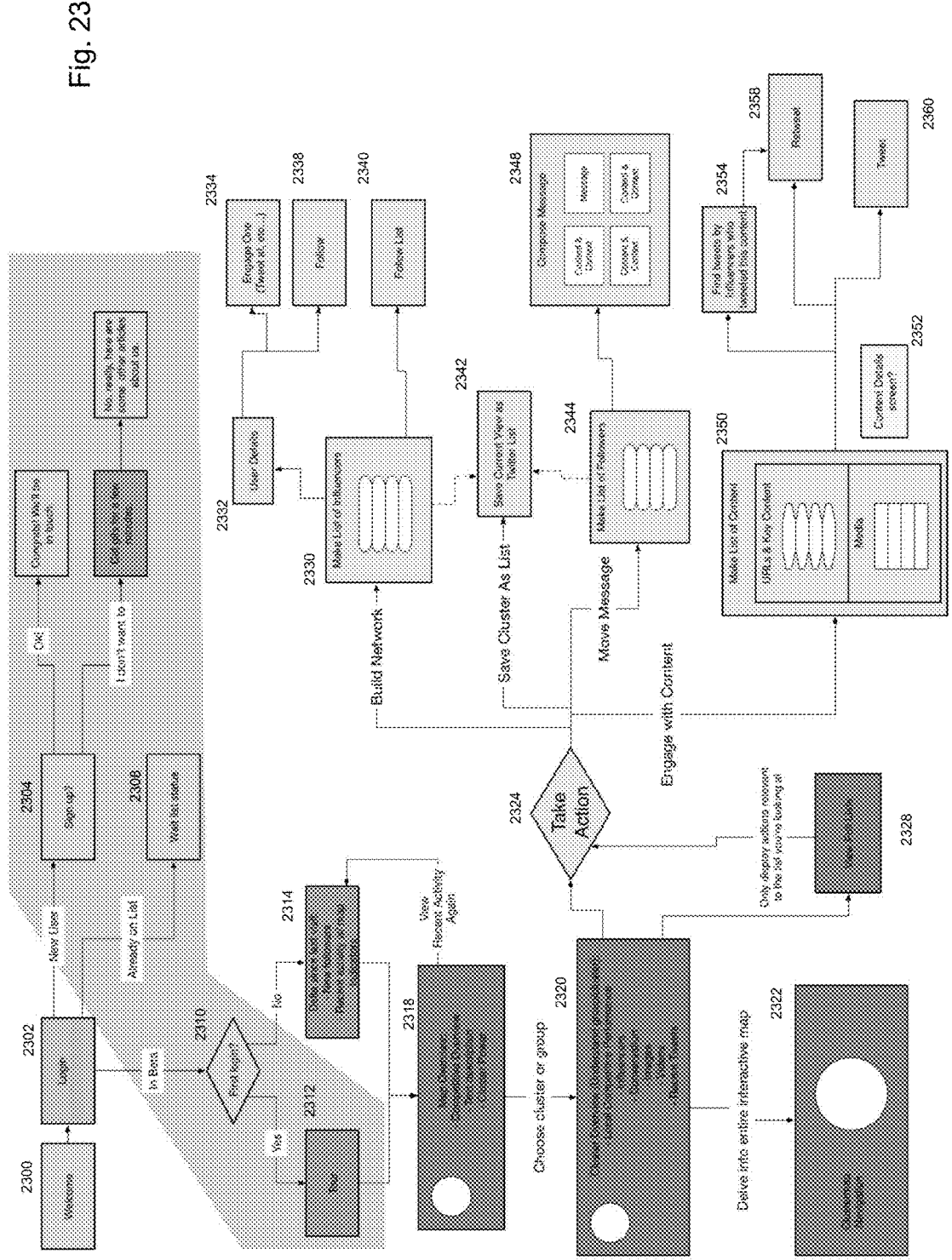
FIG. 23 depicts a social media map platform user flow.

In some embodiments, a social media map and network segmentation may be constructed via clustering of data from a single user's social media community. Referring now to FIG. 23, a user flow for becoming a user and interacting with a map is depicted. Starting from logical block 2300, processing flow proceeds to a login screen at logical block 2302 where users may log in, such as via a social media authorization. If the user is a new user, the user is sent to a sign up page at logical block 2304, where they may sign up or be given additional content to entice a sign-up. If the user is already on a list as having requested access, processing flow proceeds to logical block 2308 to check a wait list status. If the user is a beta user, processing flow proceeds to logical block 2310 where it is determined if the login is a first login. If so, processing flow proceeds to logical block 2312 where a tour may be taken. After the tour, processing flow may proceed to logical block 2318 where a map overview is presented, including a competitive overview, a text description, a cluster power, and the like. If the user is not a beta user, processing flow may proceed to logical block 2314 where the delta since last visit is presented, including new followers, recent activity with map indicators, and the like. Processing flow may then proceed to logical block 2318. From logical block 2318, processing flow may proceed back to logical block 2314 if recent activity is requested again. Alternatively, if the user chooses a cluster or group at logical block 2318, processing flow may proceed to logical block 2320 to obtain a cluster overview, including local competitive performance, influencers, conversation, images, videos, recent tweets, and the like. If the user chooses to delve into the entire interactive map, processing flow may proceed to logical block 2322 for clustermap navigation. Processing flow may alternatively proceed to logical block 2324 from logical block 2320 where the user may take action. In an alternative embodiment, processing flow may first proceed to logical block 2328 where there user may first view full lists and then processing flow may proceed to logical block 2324 where only actions that are relevant to the list being reviewed are displayed at logical block 2324. From logical block 2324, the user may choose to build a network, save one or more clusters as a list, move a message, engage with content, or the like. If choosing to build a network, processing flow may proceed to logical block 2330 where the user is prompted to make a list of influencers. From there, user details may be entered at logical block 2332 and then actions such as engaging one of the users make current logical block 2334 or a follow action may be taken at logical block 2338. From logical block 2330, a follow list may be generated at logical block 2340 or the current view may be saved as a Twitter list or some other social media list at logical block 2342. Likewise, if the 'Save Cluster as List' action is selected, processing flow may proceed to save the current view as a Twitter list or some other social media list at logical block 2342. If the move message action is selected, a list of followers may be made at logical block 2344 and from there the current view may be saved as a Twitter list or some other social media list at logical block 2342 or a message may be composed at logical block 2348 which may include content and context and the message. If engage with content is chosen at logical block 2324, processing flow may proceed to logical block 2350 where a list of content, such as URLs, key content and media, may be made. Users may choose to screen content details at logical block 2352 after which processing flow may proceed to logical block 2360 word tweet is generated, logical block 2358 where a re-tweet is generated, or logical block 2354 where tweets by influencers who tweeted the content are found and then potentially re-tweeted at logical block 2358.

In order to scale the amount of information in the social media maps, clustering techniques may need to be modified. In general, some set of nodes pay attention to some set of targets and the nodes get clustered based on the targets they pay attention to. There are at least two extensions of this general approach. In one embodiment, a very large number of nodes pay attention to a very large number of targets. Thus, for clustering, the number of operations scales at least polynomially (e.g. the cube of the number of nodes). For example, for 10,000 nodes the number of operations is in the billions. To accommodate this scale, computing power may need to be augmented.

In another embodiment, attentive gravity may be used to scale up the size of the social media maps. Nodes pay attention to targets (input data), however an object may be created where nodes are not discretely assigned to a cluster but are drawn to different poles, such as ideological, thematic, or topical poles. Depending on which nodes a target pays attention to, it can be drawn to one pole, another pole, or the middle. Instead of discrete maps with a plurality of clusters (e.g. 40) in a plurality of colors (e.g. 40), an attentive gravity map may have poles where the nodes are distributed based on how close they are to each pole. A node may have a set of scores which represent a gravitational coefficient for each of the poles of gravity. The gravitational coefficient may be used with other visualizations in order to modify the size, color, or opacity of the cluster representation based on the attentive gravity toward a pole. In another embodiment, the gravitational coefficient may simply be used as a metric on the cluster map previously described herein. The gravitational coefficient provides the degree to which a node matches a segmentation (e.g., a sports weight and a parenting weight for the same node, rather than just sorting the nodes into different clusters/segmentations and throwing out the relationship to other clusters or segmentations).

Clusters themselves may not really be definitive. For example, a node might not be in just one cluster. Such characteristics may be reflected in mapping technologies.

One technique may be a Discrimination Function. In an example, 1,000,000 nodes may be clustered. An initial condition may be a seed attentive clustering for a small number of nodes, such as 10,000. To expand the clustering, the centroids of the clusters are used to assign values to the other clusters (the X,Y average of the dots). For example, it can be determined if a new node is closer to the centroid of one cluster or of another. As many nodes as desired to be incorporated into a map may be clustered via this technique. In this example, this technique applies to nodes 10,001 through 1,000,000.

Another technique may be to iteratively cluster the 1,000,000 nodes in batches of 10,000. Then, the CFI scores of those clusters may be used to cluster like clusters with each other. The clusters may be combined at a meta-cluster level. To make that work well, how similar some clusters are may need to be tracked across large groups of sub-clusters to see which ones are idiosyncratic and should standalone versus ones that are somewhat consistent and should be joined.

In an embodiment, it may be desired to reduce the scale of the map to just those actors connected at a mesoscale while eliminating actors who aren't really active members of the network and are just "star" followers. An Influence Network Discovery method may be used to reduce very large networks to their most influential core communities and obtain a sub-graph of maximally connected sub-actors. A variable $K_{corr}$ may be assigned to each member of the network, where $K_{corr}$ relates to a minimum connectedness, or the number of other nodes in the network to which the individual is connected (e.g. a known measure of connectedness in networks). One way to reduce the network quickly is to restrict the network by $K_{corr}$ value. For example, a network may be restricted to only those with a $K_{corr}$ of five and up, that is, only those people connected to at least five other people. Another way to reduce the network may be done iteratively. For example, a network of people surrounding the Democratic Party may be reduced iteratively. In a first step, inactive members and members with few followers may be eliminated. Then, certain network members, such as public figures or those who have a lot of followers may be removed temporarily from the network and reserved in a "keep" set. Then, the remaining network may be examined and refined by $K_{corr}$. In the example, members of the network with a $K_{corr}$ of one are removed from the network. Removal of these people from the network may change the $K_{corr}$ values for the remaining members of the network. The process iterates, removing those network members with the lowest $K_{corr}$ values. The process can iterate until a specified number of network members is obtained. At this point, any members in the keep set may be added back to the network. As a second pass, a $K_{corr}$ of the keep set members may be done and limited to the node threshold. Based on the follow patterns of the members retained in the map, they may be assigned to a cluster.

In an embodiment, a delta report may be provided to examine the evolution of a cluster map and capture the most salient points of change in the last interval. The delta report may identify which clusters have grown, which sites are being targeted more by clusters now than before, which topics are being discussed more now than before, which clusters are more active than before, and the like. The delta report may be provided on a periodic basis, such as weekly, monthly, and the like. Generating the delta report may involve reporting which CFI scores changed the most and which clusters are more active than before. Delta reports may be enabled by organization into a self-updating database with time snapshots. A delta report may be useful in customizing a stream of content. For example, a stream of new objects of interest for clusters in the map can be provided as a delta report and feed to a user.

In an embodiment, a self-service tool may be designed to let users access the system and initiate generation of a social media map. In an embodiment, a user may log in to the system or, in embodiments, to a social network or other third party website, in order to initiate the map creation process. A bot may be spawned that harvests data and maps the data to clusters. The bot may further provide cluster labels and CFI scores. The output may be a social media map data object with CFI scores. The self-service tool may enable user browsing of clusters and the map, tagging nodes, grouping and labeling clusters, and the like. In an embodiment, a machine learning labeler may suggest cluster labels. The user-generated labels may be fed into the machine learning facility used to label clusters for the social media maps. The focus of the self-service tool may be on actions that strategically build a user's network and strategically message to components of the network. CFIs can be used to determine a similarity among maps so that an existing social media map that is similar to the self-service map may be recommended for review.

Social media maps may be used to enable users to strategically message components of their network. In an example, a social media map may be created for the Twitter followers of a live entertainment company. Certain clusters relate to dense communities around particular stars or particular genres of music. For the live entertainment company, there are relatively few messages that they transmit that everyone in the map cares about; however, using social media maps, clustering enables more discrete message targeting. If the company wants to use Twitter to get the word out about a country artist, for example, they can target the country music cluster only with their messaging. If the company wants to target only those nodes within the country music cluster that have the highest influence, CFI scores may be used to limit the messaging in order to maximize the impact on the cluster. Such discrete targeting may be particularly useful in the case where direct messaging to followers may be limited.

Social media maps may be used to enable users to strategically build their network. For example, in the live entertainment company, the country music cluster may be growing in size. The social media map may be used to identify niche influential nodes for the country music cluster, such as by using segment CFI data to maximize connections with targeted segments/key influencers. Then, the user can start following those influential nodes in hopes that they will follow back. Such a process may help build the network in a desired strategic direction. Users may be able to see how they are doing against competitors for any given segment by examining the proportion of influencers (high CFI target), who may or may not be in the map, following them versus others.

In one embodiment, social media maps may be organized and navigated as a map of maps, where each map appears as a node on a larger map. The strength of the connection between maps is the maximum of ratios of how many nodes are in one map versus another map. In navigating and searching the maps for a particular target, an indication may be given when a cluster in one map is very similar to another cluster in another map that may or may not be accessible by the user, for example, if one map relates to diabetes and another relates to obesity, a common cluster may be groups actively modifying lifestyles to avoid both pathologies. In embodiments, the system may provide an interface from the search screen with which the user may purchase the map they do not currently have access to.

In an embodiment, user segmentation may be used to find segments for targeting as customers. Maps may be automatically generated for the target customer and conversion rates to paying customers may be tracked.

Described herein is a system for examining social media phenomena, such as hashtags, and how they spread in a network. Patterns of spreading may include salience, commitment, or a combination thereof termed resonant salience where there is a burst of activity followed by a sustained commitment, or resonance, pattern. By combining temporal and network features in the analysis of the segments/clusters, chronotopes (i.e.; patterns that exist in time and space) emerge.

In an embodiment, a timeline view may be used to examine messages across clusters. The timeline may include the chronotope as the drill down. For example, a primary timeline may be organized in rows by grouping of clusters (e.g. similar clusters are assigned together into a group). There may be several bands for groups (e.g. things for which there is a CFI score). The timeline may be examined for objects of interest that have very high CFI scores at some point. One example may be hash tags in a twitter network. A dot may be placed at the point in time when the activity (attention) peaked (had the most citations, re-tweets, etc.) for that object of interest. A dot may be placed in the macro timeline for the group (showing the peak points of all objects of interest) where the peaks were for each group (a group corresponds to a band below the main timeline). When the dot that corresponds to the peak of attention to an object of interest for a group/cluster is clicked, the chronotope is revealed. The chronotope for that object of interest may appear in a window below the timeline. The timeline view may include time on the X axis and groups/clusters on the Y axis. Peak interest points for objects may appear as dots at points in time corresponding to the groups that have interest. Clicking on that object reveals the chronotope for that object for all of those groups.

Interacting with data in the chronotope view may reveal what the object of interest is. In some embodiments, a group of items may be selected at a time period for a certain cluster/group and a word cloud or semantic analysis of proper nouns that appear in those items may be assembled.

Social media sites enable users to engage in the spread of contagious phenomena: everything from information and rumors to social movements and virally marketed products. For example, Twitter has been observed to function as a platform for political discourse, allowing political movements to spread their message and engage supporters, and also as a platform for information diffusion, allowing everyone from mass media to citizens to reach a wide audience with a critical piece of news. Different contagious phenomena may display distinct propagation dynamics, and in particular, news may spread differently through a population than other phenomena. Described herein is a system for classifying contagious phenomena based on the properties of their propagation dynamics, by combining temporal and network features. Methods and systems described herein are designed to explore the propagation of contagious hashtags in two dimensions: their dynamics, that is, the properties of the time series of the contagious phenomena; and their dispersion, that is, the distribution of the contagious phenomena across communities within a population of interest. Further described is a method for simultaneously visualizing both the dynamics and dispersion of particular contagious phenomena. Using this method, particular contagious phenomenon chronotopes, or persistent patterns across time and network structure, may help emerge a taxonomy for contagious phenomena in general.

Given some contagious phenomenon p, p may be considered to have spread to user u the first time that u engages with p. For simplicity, engagement is measured as mentioning the phenomenon. For news, mentioning is likely a sufficient form of engagement, while for a political movement, stronger evidence of engagement may be preferable (contributing money, attending a rally, etc.). However, in social media sites, higher levels of mentioning often correlate with higher levels of engagement (e.g., users tweet about a political rally), while false indicators of engagement are rare: if a user wishes to mention a political movement to disagree with it, she will often not use a tag or specific name referring to that movement, but use a variant of it (e.g., a Twitter user who wants Vladimir Putin out of power may use the tag #Putinout instead of #Putin when tweeting about the prime minister and future Russian president). Therefore, the number of first mentions of p by users in some social media site is used as a proxy for the number of users that p has spread to.

In an embodiment, measures for characterizing contagious phenomena propagating on networks may include peakedness, commitment (such as by subsequent uses and time range), and dispersion (including normalized concentration and cohesion).

The peakedness of a contagious phenomenon is a scale-invariant measure of how concentrated that phenomenon is in time. A peak may be defined as a day-long period where total first mentions by day lies two standard deviations above the median first mentions. The specific duration of the peak window and the required deviation can be varied to maximize usefulness for particular kinds of phenomena and for particular social media networks. Median may be used instead of mean because, due to the skewed distribution of first mentions by day for most contagious phenomena, the mean is over-inflated. Contagious phenomena with short lifespans tend to have a sharp peak, when a large number of people mention the phenomenon, but the number of mentions is very small on either side of the peak. In contrast, long-lifespan contagious phenomena tend to grow slowly, with a less pronounced peak of mentions. The peakedness of a contagious phenomenon is the fraction of all engagements with that phenomenon that occur on the day with the most engagements with that phenomenon. A high peakedness means that most of the network's engagement with the phenomenon (e.g. for a social network, people in the network mentioning it) occurs within a short span of time, typically, hours to days. In contrast, a low peakedness means that the network's engagement with the phenomenon is spread over a long period of time, typically, weeks to months. Phenomena with high peakedness, such as news stories, may propagate rapidly through the network and then dissipate just as rapidly in the course of the daily news cycle. Phenomena with low peakedness may include popular websites and videos, which may maintain a slow but steady rate of engagement—individuals in the network are constantly discovering these phenomena, even as others get tired of them and stop engaging.

Commitment is the measure of the average scope of engagement with a particular contagious phenomenon by nodes in the network, or the staying power of a phenomena. Using the example of people engaging with online content in a social network, the commitment with a particular piece of online content can be the average scope of mentions of that content by pieces of the network. This measure would, for example, differentiate between a political movement that is just a fad, and one that accumulates a number of diehard supporters who keep the movement alive. Scope may be measured in at least two ways, which leads to the following two sub-measures: Commitment by Subsequent Uses and Commitment by Time Range. In social media sites, the cost in terms of time and effort to mention something for the second or third or tenth time is relatively small; therefore, for a second dimension, two quantities may be defined: first, the average number of subsequent mentions (all mentions excluding the first mention of the phenomenon by a user) of a contagious phenomenon among the adopting users; and second, the average time difference (in days) between first and last mention of the phenomenon among the adopting users. While the first measure, 'Commitment by Subsequent Uses', is relatively easy to inflate by mentioning the phenomenon multiple times in a short period, the second measure, 'Commitment by Time Range', indicates long-term commitment to mentioning the phenomenon by a set of users.

Commitment by Subsequent Uses is the average number of subsequent engagements with a phenomenon after a node's first engagement. For instance, if each person in a social network played an online game at most once, Commitment by Subsequent Uses for that story would be zero. In contrast, if just one percent of the people in a social network played an online game thirty times each, Commitment by Subsequent Uses for that game would be twenty-nine. Phenomena with high Commitment by Subsequent Uses may include online games, which encourage repeat engagements. Other phenomena with high Commitment by Subsequent Uses may include astro-turfed content, where a third party may encourage repeated interest in the content by paying or otherwise endorsing people who engage with it.

Commitment by Time Range is the average time period between the first and last engagement with a phenomenon by nodes in the network, measured over some large time window (e.g. a year). For example, if each person in a social network read articles on a blog ten times over the course of one day and never visited it again, Commitment by Time Range for that blog would be one day. However, if just one percent of the people in a social network read articles on a blog once every week for ten weeks and then abandoned it, Commitment by Time Range for that blog would be ten weeks. Phenomena with high Commitment by Time Range include blogs with loyal followers who keep coming back for more content. Phenomena with low commitment by Time Range include news stories that, on average, a person reads only once and never sees again.

In addition to measuring the dynamics of contagious phenomena (the properties of the time series of engagements with a phenomenon), the dispersion of contagious phenomena (the properties of distribution of a contagious phenomenon throughout a population) may be measured. Dispersion is a measure of the distribution of engagements with a contagious phenomenon over the network through which it propagates. Phenomena that are highly dispersed are broadly popular but may have less focused engagement from a particular group; phenomena that are not dispersed are not broadly popular but may have focused engagement with a particular group. There are many ways of measuring the distribution of engagements with a phenomenon over a network, including the following two sub-measures: Normalized Concentration and Cohesion.

The Normalized Concentration of a contagious phenomenon presupposes a partition of the underlying network into discrete clusters, which usually represent communities. Given such a partition, the Normalized Concentration of a contagious phenomenon is the fraction of all engagements that come from the cluster that engages most with the phenomenon, or the Majority Cluster. For instance, if a social network were divided into two clusters, one of which engaged with a particular news story nine times, and the other, only once, the Normalized Concentration for that phenomenon would be 0.9. However, if both clusters had engaged with the story five times, the Normalized Concentration for that phenomenon would be 0.5. Phenomena with high Normalized Concentration tend to be the cause celebré of a particular community, e.g. political and social movements that have not gained wide traction. Phenomena with low Normalized Concentration may include headline news stories that touch many communities at once. Depending on the size of individual communities, Concentration may or may not correlate inversely with popularity.

In addition to Normalized Concentration, some aspect of the connections between the engaged users may be measured. For example, it's possible that a contagious phenomenon is widely spread across a number of communities, but diffuses only through strong ties so that the engaged users form a clique. Conversely, it is possible that a contagious phenomenon is confined to a single community, but spreads through weak ties and the engaged users are sparsely interconnected. Therefore, a measure of Cohesion may be defined as the network density over the subgraph on all users engaged in a particular contagious phenomenon. Contagious phenomena that spread over strongly connected sets of users will have a Cohesion close to one, whereas phenomena that spread over weakly connected sets of users will have a Cohesion close to zero. The Cohesion of a contagious phenomenon is the network density of the sub-graph of all nodes engaging with the phenomenon. The network density of a graph is the total number of actual connections between nodes in the graph divided by the total possible number of connections (usually $n*(n-1)/2$ for undirected graphs, where n is the number of nodes in the graph). For example, if only three people read a particular blog, but all those people knew each other, the Cohesion of that blog would be 1.0. In contrast, if ten people read a particular blog, but every one of those ten people knew exactly two of the others (the people were connected in a circle graph), the Cohesion of that blog would be $10/(10*9/2)=10/45\sim0.22$. Phenomena with high Cohesion may include stories and memes that propagate in an "echo chamber" of people who already know each other and engage with similar kinds of online content. Phenomena with low Cohesion include news and rumors that move between acquaintances, such that, for example, after multiple propagations, the person who hears the rumor and the person who started it may be total strangers.

Figure 18:
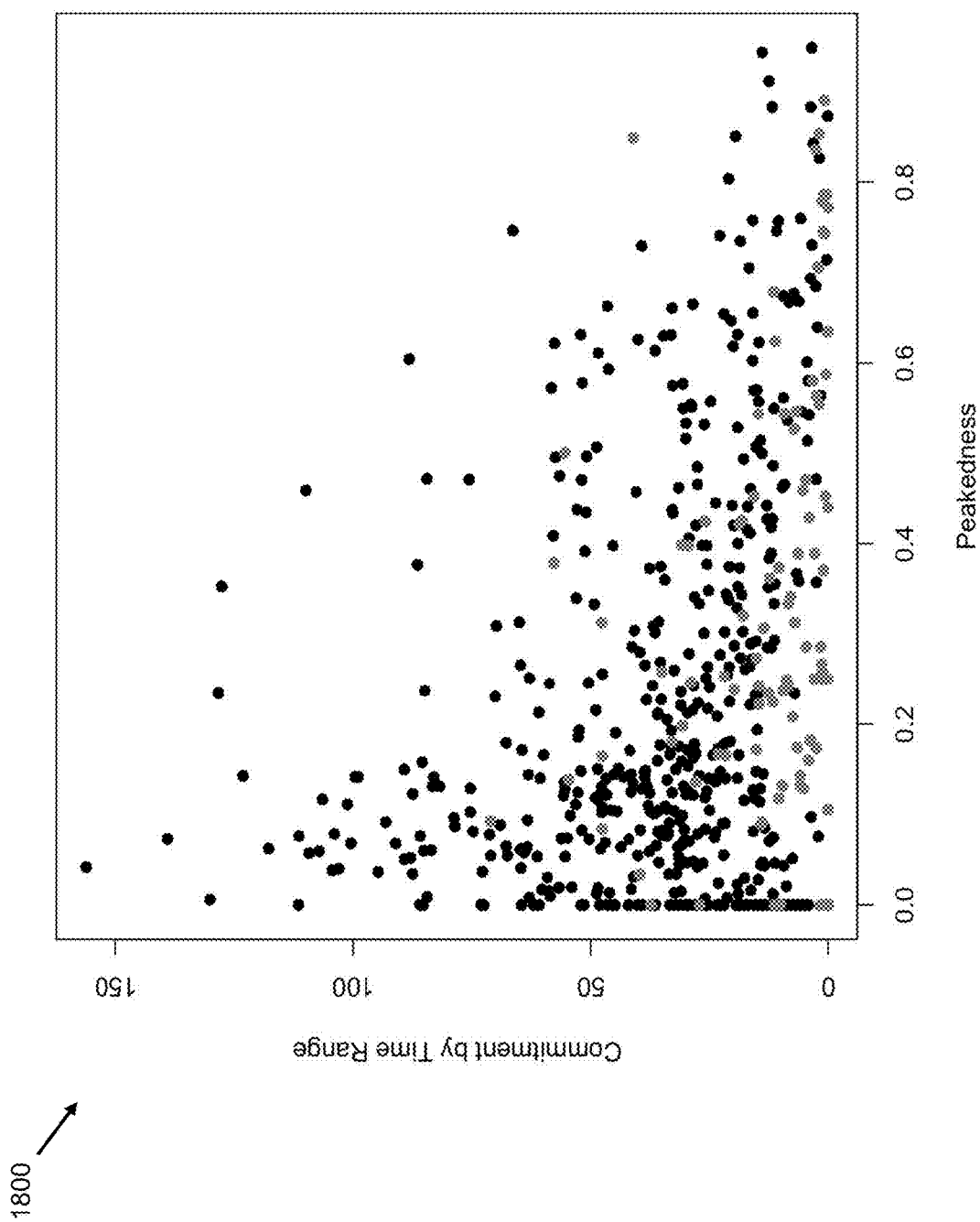
FIG. 18 depicts Peakedness vs. Commitment by Time Range for two sets of hashtags.

In embodiments, phenomena with high Peakedness tend to have low Commitment, making those two measures a natural pair for comparing different online phenomena. For example, FIG. 18 depicts Commitment by Time Range on the Y axis and Peakedness on the X axis for two different sets of data depicted by different icons. In this example, the two datasets are: 1) 112 Bundled hashtags relating to specific topics shown in red or as icon #1; and 2) a baseline dataset of the top 500 hashtags for all users shown in black or as icon #2. The bundled hashtags display a generally lower level of Commitment by Time Range than the top 500 hashtags at the same level of Peakedness. Some of the top 500 hashtags have extreme levels of Commitment, up to 150 days. Hashtags with the highest levels of Commitment are of several sorts, which notably include regional/location tags, tags for particular sports, religion tags (e.g., 'Catholic,' 'Jewish'), tags for particular news outlets, and general tags related to investing and financial markets. Intuitively, all of these are topics that might engage a stable set of users over a long time.

Figure 19B:
FIG. 19b depicts Peakedness vs. Commitment by Commitment by Time Range.
Figure 19A:
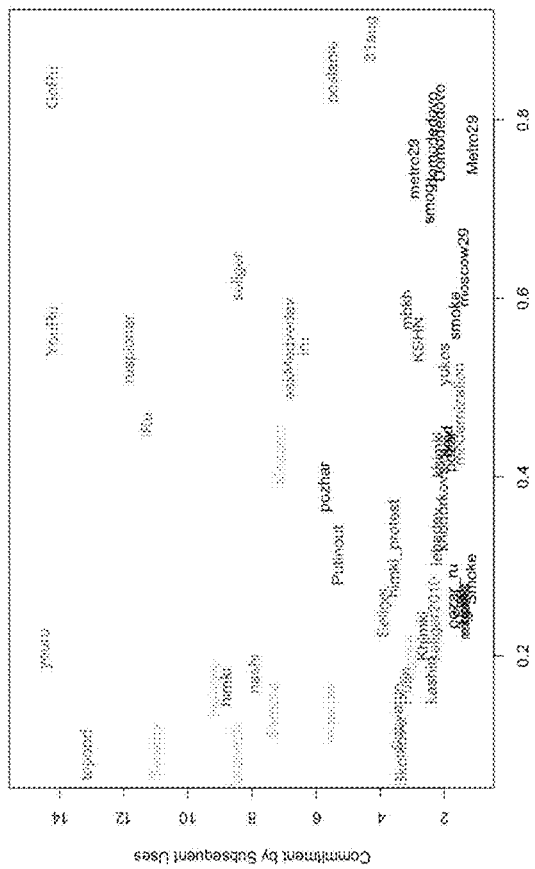
FIG. 19a depicts Peakedness vs. Commitment by Subsequent Uses.

Referring to FIG. 19, and in an example, dealing primarily with topics related to Russia, peakedness is plotted for the bundled hashtags against both levels of Commitment: subsequent uses (FIG. 19*a*) and time range (FIG. 19*b*). In FIG. 19*a*, there are several distinct regions of the distribution. On the bottom right, hashtags with high Peakedness and low Commitment by Subsequent Uses are all directly related to salient news events, which in this case are the airport and metro bombings in Russia (#Domodedovo, #explosion, #metro29, #Moscow29). On the bottom left, hashtags with low Peakedness and low Commitment by Subsequent Uses are generally not very popular. Some of them are very generic (#moscow, #metro), and some just never had a peak nor became adopted by a committed user base. Some of these are tags that are similar to popular tags, but reflect less-used variations. On the top left, hashtags with low Peakedness and high Commitment by Subsequent Uses are all regional hashtags (with the exception of the Nashi hashtag that refers to a pro-government political youth movement in Russia). These regional hashtags were tangentially related to the forest fires events, but their main use is likely in talking about local affairs, hence the high commitment of a few users. Finally, on the top right, there are a number of hashtags with both high Peakedness and high Commitment by Subsequent Uses. These tend to be pro-government political hashtags (#iRu and #GoRu are both related to Medvedev's policy of modernization while #ruspioner and #seliger are both related to the Seliger youth camp). This observation suggests that pro-government political hashtags have some event (such as the Seliger camp) that is linked to a sudden burst of popularity, but subsequent to that event, users continue to include the hashtag in their tweets. This suggests that pro-government political hashtags may have 'staying power' in the Russian twitter community. Alternatively, or in combination with this, a committed set of users may use the pro-government hashtag both before and after the event, perhaps in an organizational or mobilizing capacity.

In contrast, and referring to FIG. 19*b*, some of the same clustering seen in FIG. 19*a* is depicted, where news is on the bottom right, regional hashtags are on the top left, but the top right group dominated by pro-government hashtags has moved down, indicating that these hashtags do not have staying power over long periods of time: they may be mentioned multiple times, but in a relatively short time range around the peak (days or weeks, not months). In contrast, the hashtags on the top right in FIG. 19b are the regional hashtag #Moscow and the political hashtag #Putinout (referring to the anti-Putin movement). It is important to note that #Putinout in particular has relatively long temporal staying power (an average of 50 days between first and last mention by a user in the dataset) but relatively short staying power by mentions (an average of less than six subsequent mentions).

Figure 20:
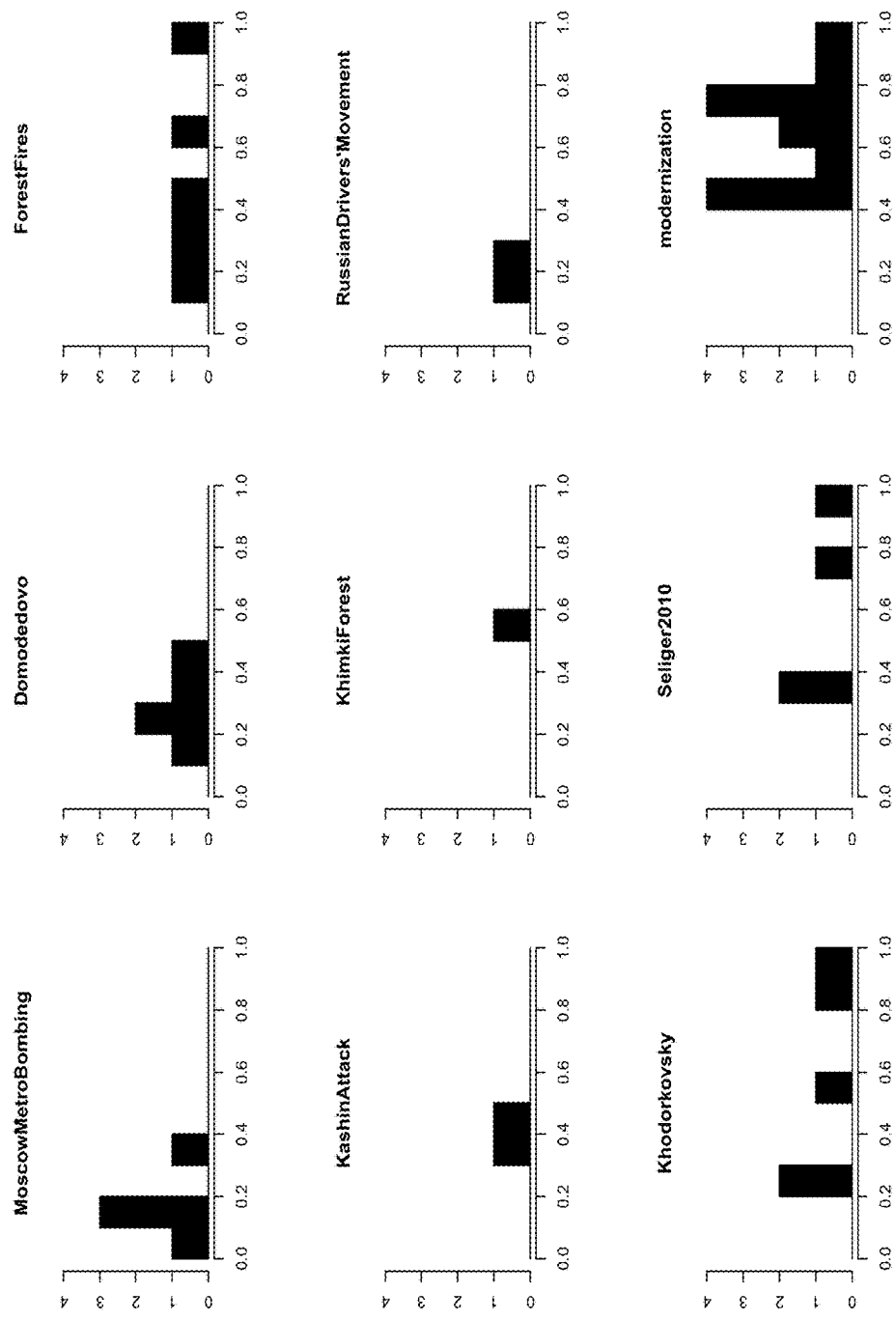
FIG. 20 depicts a distribution of mention-weighted normalized concentration by topic.
Figure 21:
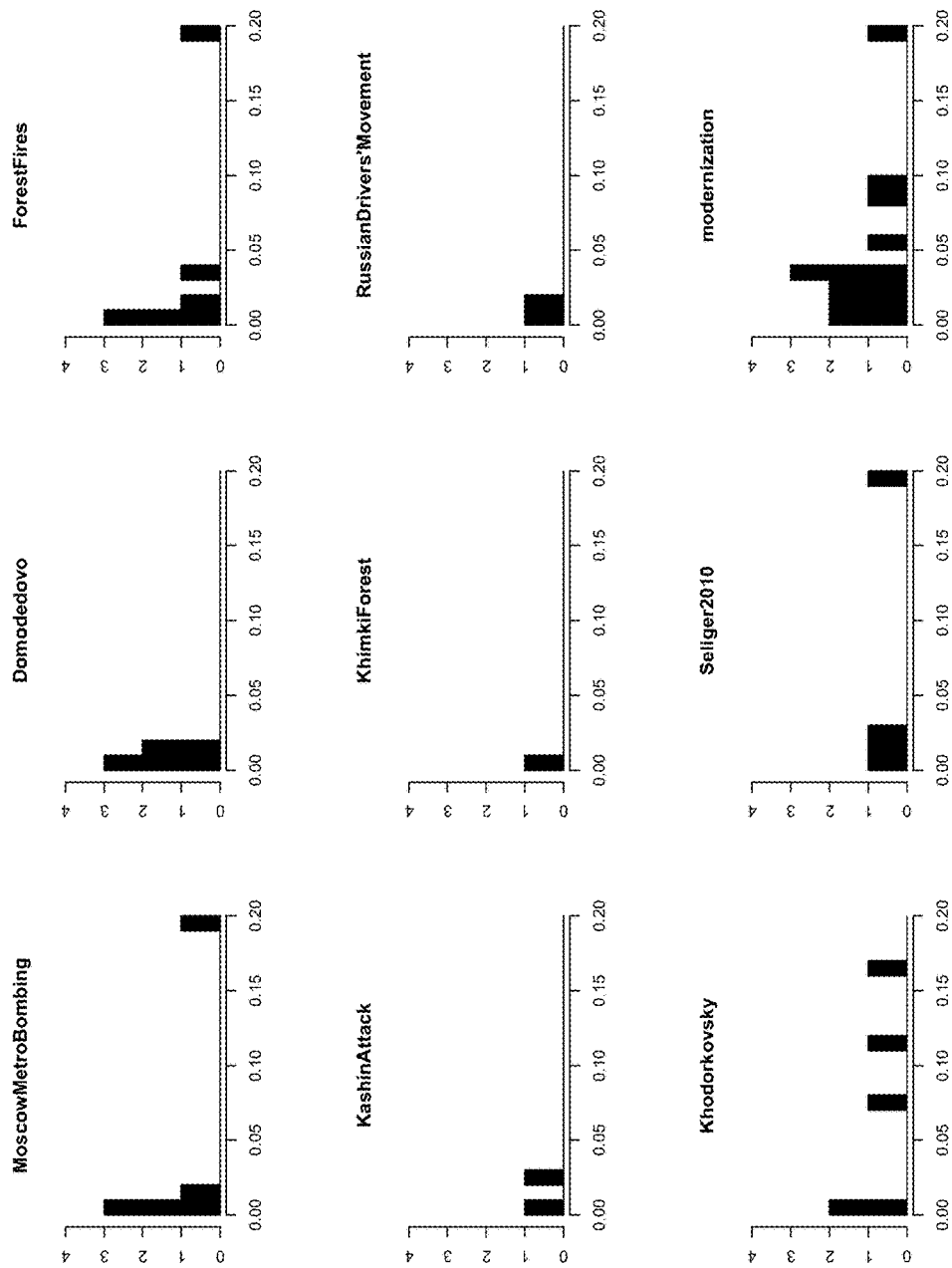
FIG. 21 depicts a distribution of Cohesion by topic.

Referring to FIG. 20 and FIG. 21, measures of dispersion of hashtags are analyzed across a core set of Twitter users. In FIG. 20, the distribution across nine topics of Normalized Concentration are plotted by hashtag within each topic. Comparing across all nine topics enables distinctive patterns to emerge: the minimum Concentration among pro-government hashtags in the Seliger and modernization topics is between 0.3 and 0.4. In contrast, the maximum Concentration among opposition hashtags in the Kashin and Russian Drivers' Movement topics, is between 0.4 and 0.5. Pro-government hashtags are on the whole more concentrated within one cluster than opposition hashtags. Hashtags related to news events, such as the Moscow Metro Bombing and the Domodedovo attack, tend to be diffuse, which is in line with the intuition that major news events tend to engage the population as a whole rather than specific communities.

In FIG. 21, the distribution across nine topics of Cohesion are plotted by hashtag within each topic. For ease of visualizing, the distribution plots are cut off at 0.2 and all hashtags with Cohesion >0.2 are assigned a value of 0.2. Again, there is a contrast between opposition hashtags, which have extremely small Cohesion of 0.03 and below, and some pro-government hashtags (especially those in the Seliger and modernization topics), that have the much higher Cohesion of 0.10-0.30. Curiously, a few news-related hashtags have very high Cohesion, which suggests that some news-related hashtags may spread through strong ties.

Figure 22A:
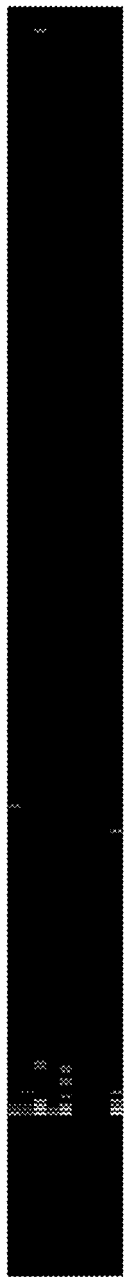
FIG. 22a depicts a chronotope of the #metro29 hashtag.
Figure 22B:
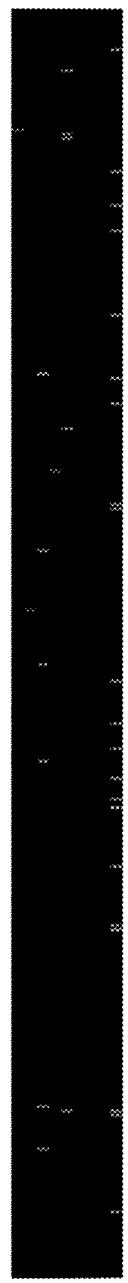
FIG. 22b depicts a chronotope of the #samara hashtag.
Figure 22C:
FIG. 22c depicts a chronotope of the #iRu hashtag.

FIGS. 18 through 21 provide a high-level analysis of hashtag diffusion among the Russian-speaking Twitter community, both from the temporal and the spatial (network) perspective. However, this analysis necessarily leaves out the idiosyncrasies of individual hashtags. Referring now to FIG. 22a, FIG. 22b, and FIG. 22c, chronotopes of the #metro29 (a), #samara (b), and #iRu (c) hashtags are depicted. In typical chronotope images, color indicates cluster group and color brightness indicates volume of engagements. Detailed analysis of individual contagious phenomena enables crossing the dimensions of dynamics (loosely, temporal properties) and dispersion (loosely, spatial properties) of the latter. Therefore, a spatiotemporal analyses of contagious phenomena, such as hashtags, may be constructed and patterns in their diffusion across time and space may be discovered. Such patterns may be called the chronotopes of the hashtags. A chronotope is simply a pattern that persists across a spatiotemporal context, originally used in literary theory to describe genres or tropes.

In order to discover hashtag chronotopes, the diffusion of individual hashtags is visualized both across different communities and across time. First, a particular hashtag is selected and the set of engagements of Twitter users with this hashtag is binned by day. Next, for each day, the volume of engagements for that day is broken down by cluster group. Finally, a grid where columns correspond to cluster groups and rows correspond to days is created. Each row-column cell of the grid is filled with a color corresponding to the cluster group. A cue as to the volume of engagements corresponding to a particular cell is given via the brightness of the color: the brighter the cell, the more engagements with a hashtag on that day from that cluster group. Black cells correspond to days when a particular cluster group has no engagements with the hashtag.

FIG. 22 shows three such visualizations: the #metro29 hashtag related to the Moscow Metro bombings on Mar. 29, 2010; the #samara hashtag related to the Russian city of Samara; and the #iRu hashtag, related to President Dmitri Medvedev's policy of modernizing Russia. These three visualizations display three distinctive patterns across space and time: #metro29, in FIG. 22a has a 'salience' chronotope, with engagements across the spectrum of cluster groups during the week around March 29. In contrast, #samara in FIG. 22b has a 'resonance' chronotope, with consistent engagements from the local cluster group, presumably residents of Samara talking about their city. Finally, #iRu in FIG. 22c has a 'resonant salience' chronotope, with an initial cross-group burst of activity in late November, 2010 (around the time of Medvedev's announcement of his new policies), followed by consistent engagements from the Pro-Government cluster group over the next month. Note that FIG. 22 does not contrast with FIG. 19, which suggests that pro-government hashtags have low staying power, but instead presents a more subtle picture: the cluster group of pro-government users remains active in the #iRu hashtag over the course of a month, but, as FIG. 19b indicates, individuals within that cluster rarely carry on with adoptions for more than 5 days. There may be a high turnover of users of the #iRu hashtag, with new enthusiasts coming in even as the original adopters lose interest in the topic.

In embodiments, phenomena with the Salience Chronotope tend to have high Peakedness and low Commitment while phenomena with the Resonance Chronotope tend to have low Peakedness and high Commitment by Time Range. Phenomena with the Resonant Salience Chronotope tend to have both high Peakedness and high Commitment by Time Range.

In an embodiment, a flexible algorithm may be used for optimizing a targeted network influence campaign. For example, a user may have a high CFI score but they may not message their social networks frequently, thus targeting these individuals may not optimize the campaign. The algorithm may output an M Score, which may be calculated from a CFI score plus some other network or behavioral metric. In embodiments, wherever it is described to use the CFI score, the M score may instead be used to maximize campaign effectiveness. In embodiments, the M score may be an interpolation of the number of followers of the target item (influence) and the CFI score of the target item (specificity). This mathematical calculation may result in a normalized score on a scale, such as a scale from 1 to 10 where 1 is low impact and 10 is high impact. Thus, the M score is a general measure of influence and specificity.

One way to calculate the M score is to combine CFI and count, where count is the overall number of members on the map that have engaged with that target, in a formulaic way. The formula is M score=count (alpha)+CFI (1-alpha) [normalized 1 to 10].

In embodiments, the M-score may be user-tunable, so that there is a choice to prioritize "segment specificity" vs. "global footprint", and/or "network position" vs. "behavioral profile" (e.g. someone who re-tweets frequently) when selecting behavioral and/or network metrics to calculate the M score. In an embodiment, for example, a slider 2902 may be provided to users so that can select a target that is more niche or more global. The M score enables optimizing a campaign on network position or on behavior. If the slider is dragged towards 'niche', alpha approaches zero and the M score is near equivalent to just the CFI score of the target item (high specificity). If the slider is dragged towards 'broad', alpha approaches 1 so that the M score is near equivalent to just the number of followers of the target item (high influence). Setting the slider somewhere in between 'niche' and 'broad' allows users to tune the set of individuals/entities that they want to target.

In an embodiment, direct ad placement may be enabled by CFI scores/M scores. Using CFI scores and/or M scores, a list of targets/websites may be created and ads may be placed directly on the target/website via integration with various products, such as Twitter sponsored tweets, Facebook ad exchange, Google AdSense/Adwords, third party online ad networks, and the like.

Figure 24:
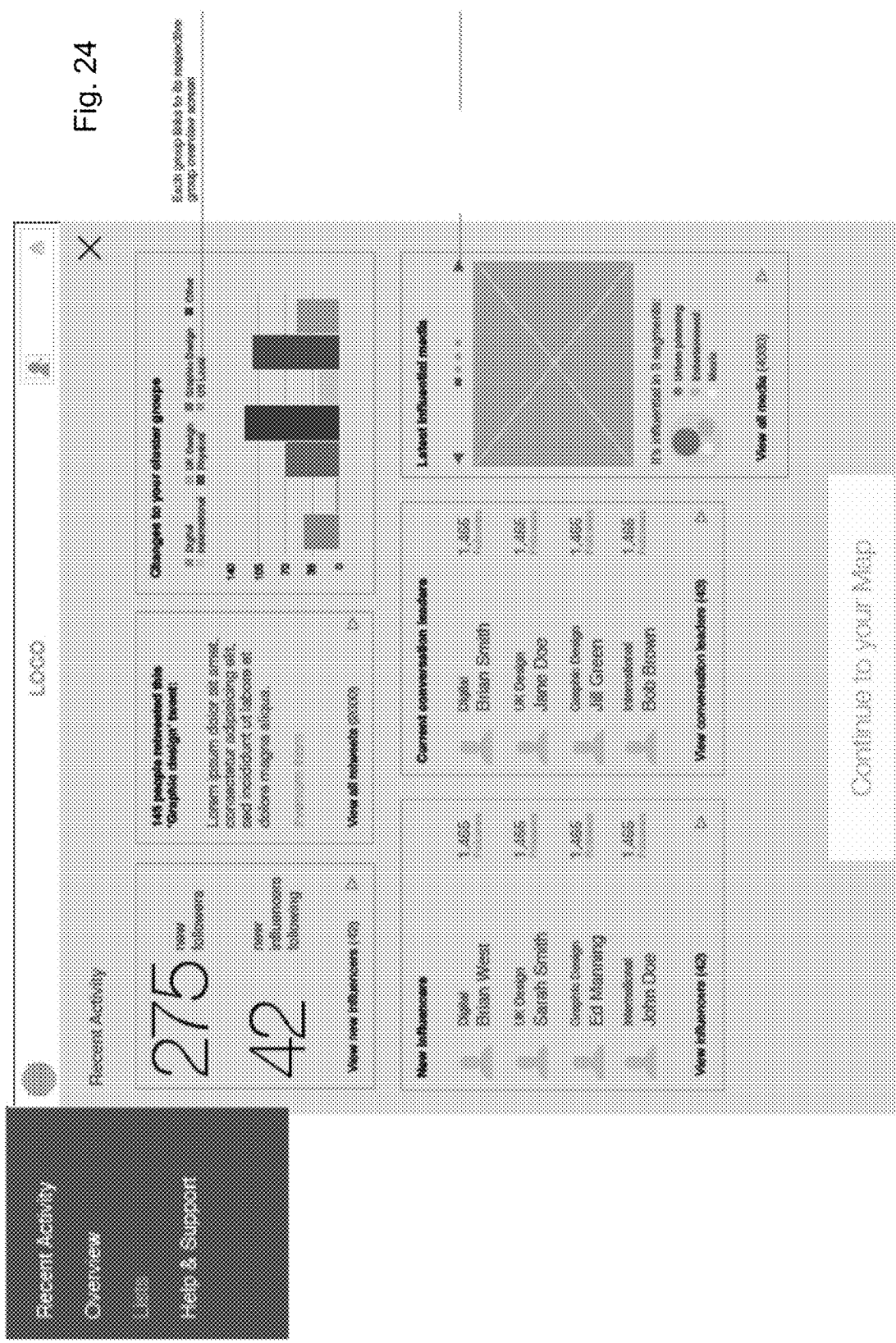
FIG. 24 depicts a recent activity page for a social media map platform.

Referring now to FIG. 24, a recent activity page of a social media map platform provides recent activity, such as new followers, new influencers following the user, an indication of any re-tweets including the number of people who have re-tweeted an item, changes to the user's cluster groups with links to respective group overview screens, a list of new influencers including their cluster group and their number of followers, the current conversation leaders including their cluster group and their number of followers, a view of all media being shared in the network including the latest influential media and the segments in which the media is influential, links to an overview page, links to a lists page, links to a help and support page, and the like. The user may continue to their map from this screen. Graphics, such as a bar graph, may be included in the changes to the user cluster groups box to indicate the number of users in each cluster group. Graphics, such as a bubble chart, may also be included in the media box to indicate the size of the segments in which the displayed latest media is influential.

Figure 25:
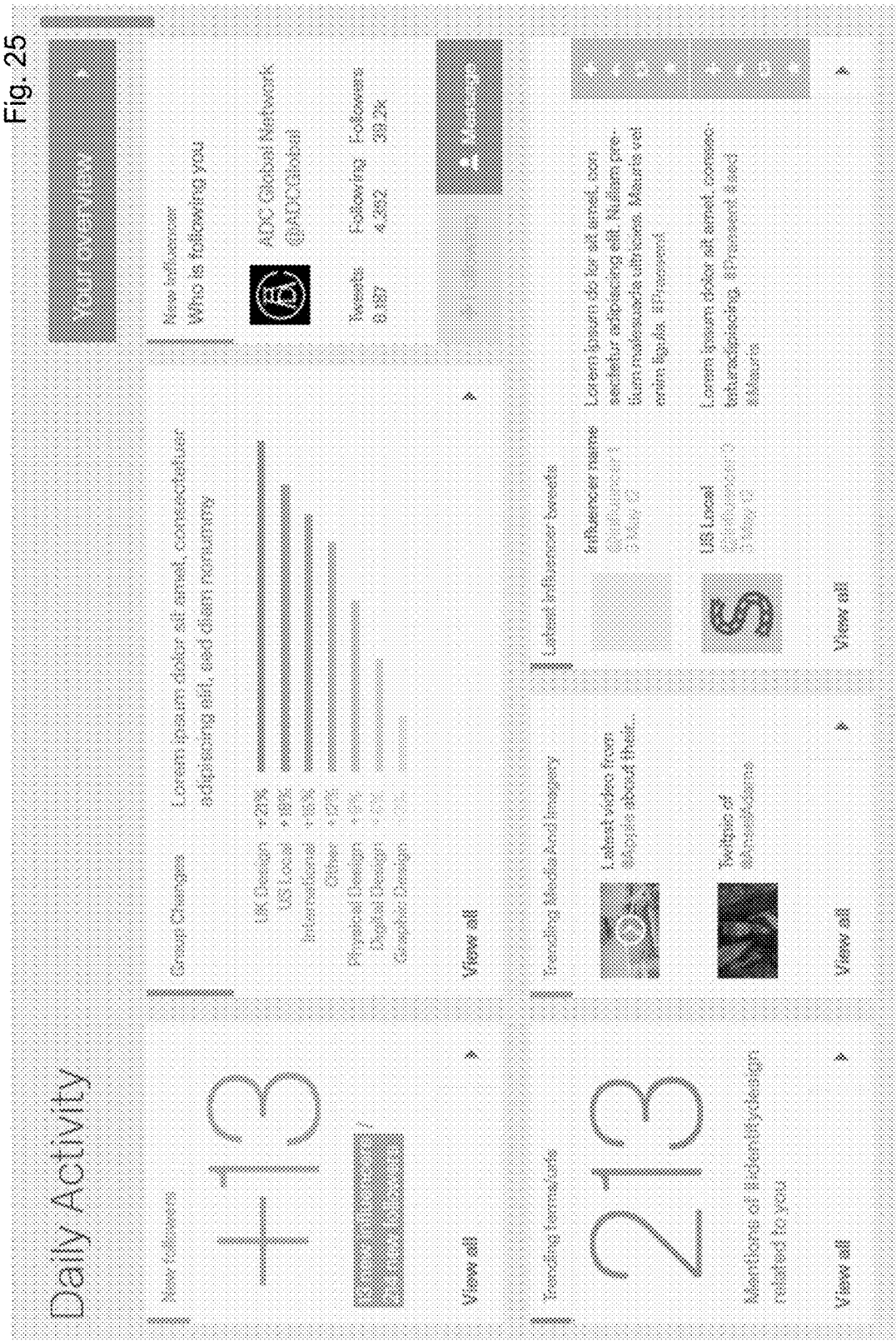
FIG. 25 depicts a recent activity page for a social media map platform.

Referring now to FIG. 25, another example of a recent activity page of a social media map platform is shown. In this example new followers are shown including the number of followers are new influencers, and group changes including a percent change for each cluster group, information on new influencers such as their name, handle, number of tweets, number of followers number of people they are following, and a button to message them or follow them. Also on this page are trending terms/URLs, including the number of mentions of a hash tag that is related to the user, trending media and imagery, and latest influencer tweets. Icons may be provided to reply, re-tweet, favorite a tweet, share or embed a tweet, and the like.

Figure 26:
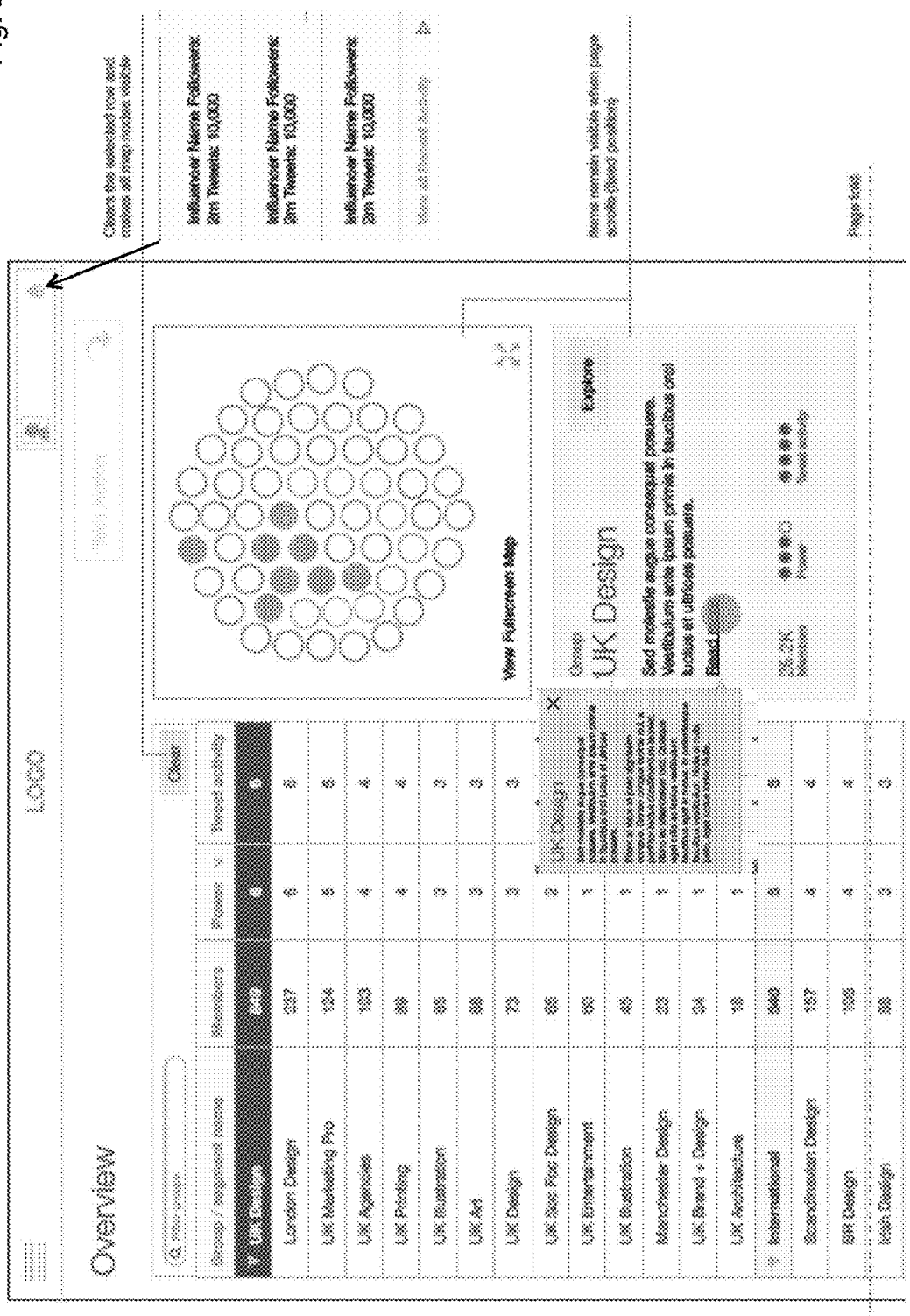
FIG. 26 depicts an overview page for a social media map platform.

Referring now to FIG. 26, an overview page is shown. The overview page includes a table of cluster groups, the number of members in the group, the power of the cluster, and the tweet activity. A power score is an indication of which segment is worth engaging with and may be an indication of which segments are most dense and represent the greatest signal of interest. In one embodiment, power may be calculated based on network density: the number of connections divided by the number of possible connections. In another embodiment, power is calculated based on coordinates, such as the average distance from the center of a cluster map. In another embodiment, power may be calculated as the average distance from the centroid of the cluster that emerges in the clustering computation. In embodiments, power is like the segment/cluster version of the M score.

Figure 27:
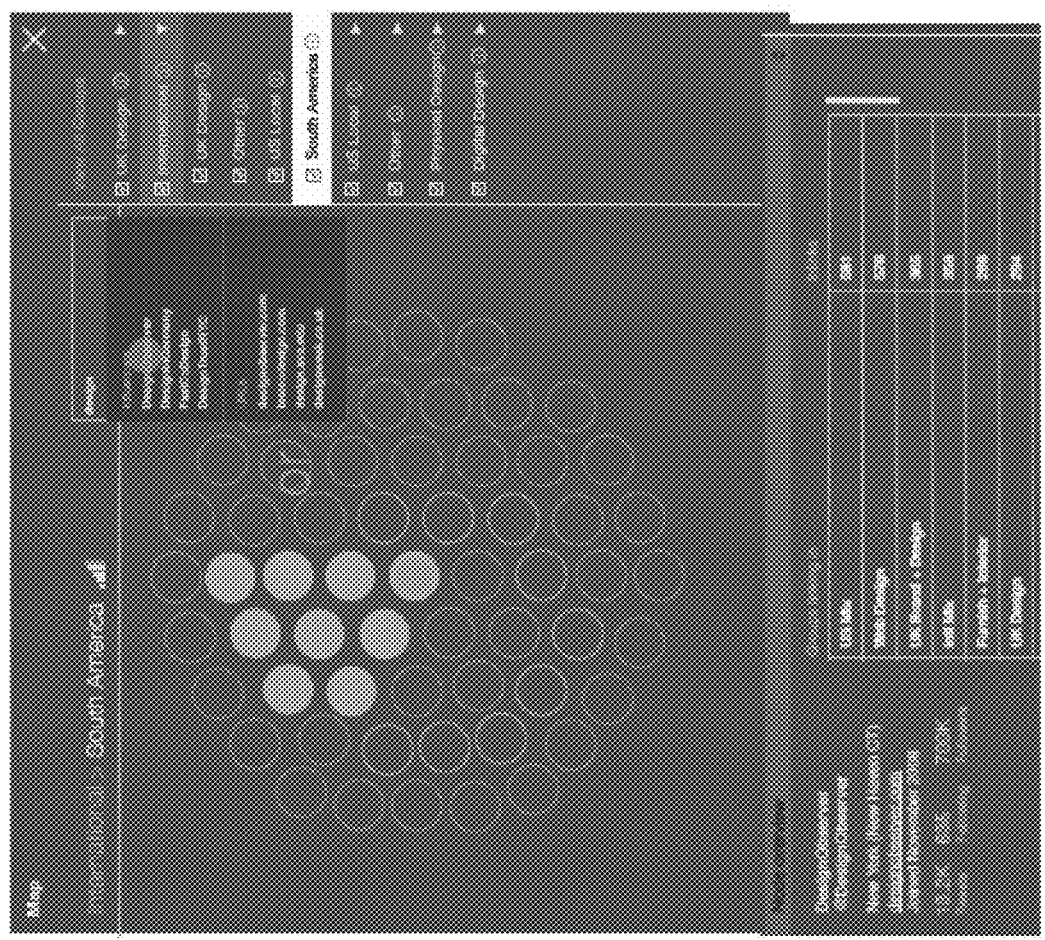
FIG. 27 depicts an interactive map for a social media map platform.

Continuing with the page on FIG. 26, an individual cluster may be selected and a representation of that cluster in a map may be highlighted. For example, the UK design cluster has been highlighted and a dialog box appears showing more information about the individual group, including number of members and graphics depicting the power and tweet activity associated with the group. When the user clicks the 'Read more' link, a box may appear with more information. The map and group information items may remain visible when the page scrolls such that they are in a fixed position. Selecting clearer on the page overview causes the selected row to be cleared and makes all map nodes visible. An alarm icon on the overview page allows the user to review all recent activity including number of tweets from various members of the network. Selecting 'view full-screen map' will send the user to a screen such as that shown in FIG. 27. Referring now to FIG. 27, a full-screen map is displayed. In this map, the international cluster has been selected and the South America sub-cluster was selected. The colored nodes in the map may indicate one or both of the selected clusters and sub-clusters. The influencers in a particular sub-cluster may be viewed and when an influencer is selected, the URLs associated with that influencer there may be shown. A node overview may appear including the influencer name, their handle, their location, their URL, when they joined the social network, their number of tweets, their number of followers, the number of people they are following, the groups they are linking in, the number of in-links in each group, as well as any other relevant information.

Figure 28:
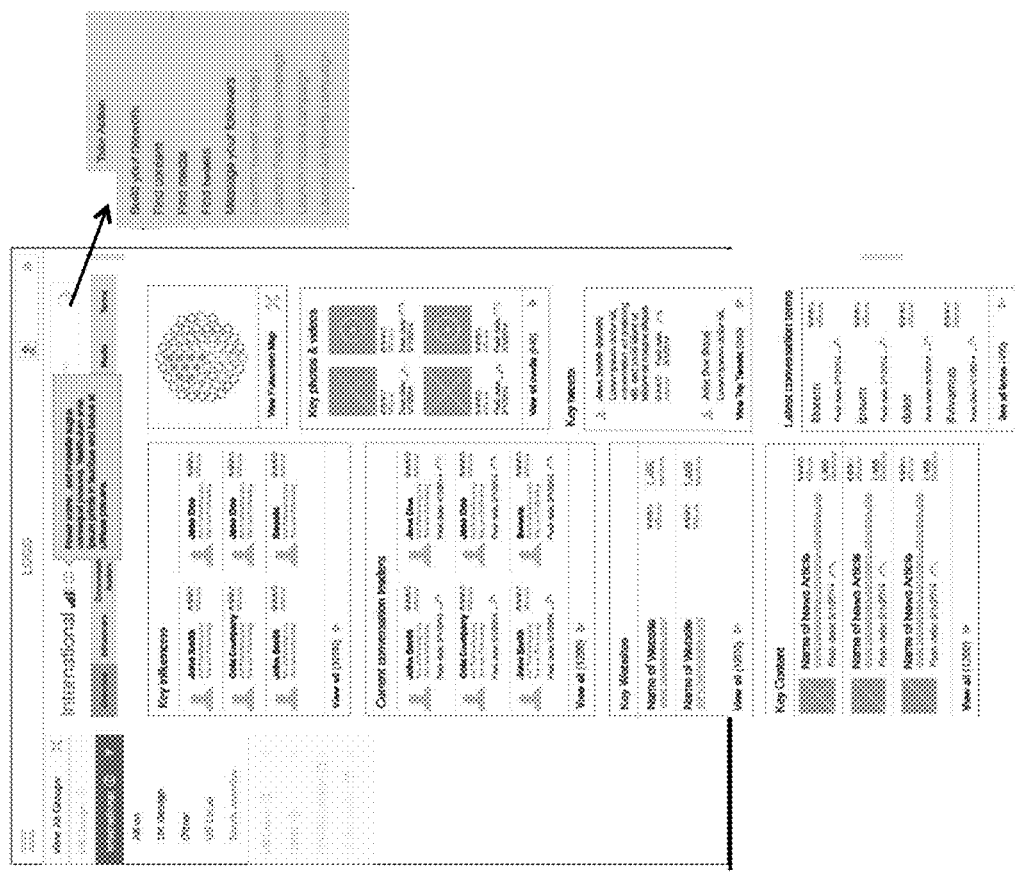
FIG. 28 depicts an overview page for a social media map platform.

Referring now to FIG. 28, an embodiment of an overview page is shown. In this view, a segment or cluster has been selected and data regarding that segment is displayed, such as key influencers, current conversation leaders (mentions), an interactive map, key photos and videos or other media, key tweets/re-tweets, key websites, key content, latest conversation terms, and the like. Effectively, this page shows an enhanced version of cluster-focused data and makes it more accessible. The power score for the segment is displayed as well as an icon from which the user may take certain actions such as build their network, find content, find media, find tweets, message followers, launch a Twitter campaign, launch a Facebook campaign, launch a mobile campaign, launch a social media campaign, launch an AdWords campaign, launch an advertisement campaign, and the like. The overview page may be a user interface. Notifications of certain data and data presentation may be made in the user interface, for example, which may be implemented by software and embodied in a tangible medium, such as a mobile device, smartphone, tablet computer, or the like. The user interface may be a touchscreen embodiment, such that to utilize the user interface, a user is required to touch the screen of the device displaying the user interface. The user interface may be accessible on different computing devices and capable of dynamically accessing user specific data stored on a network server and/or local device.

Figure 29:
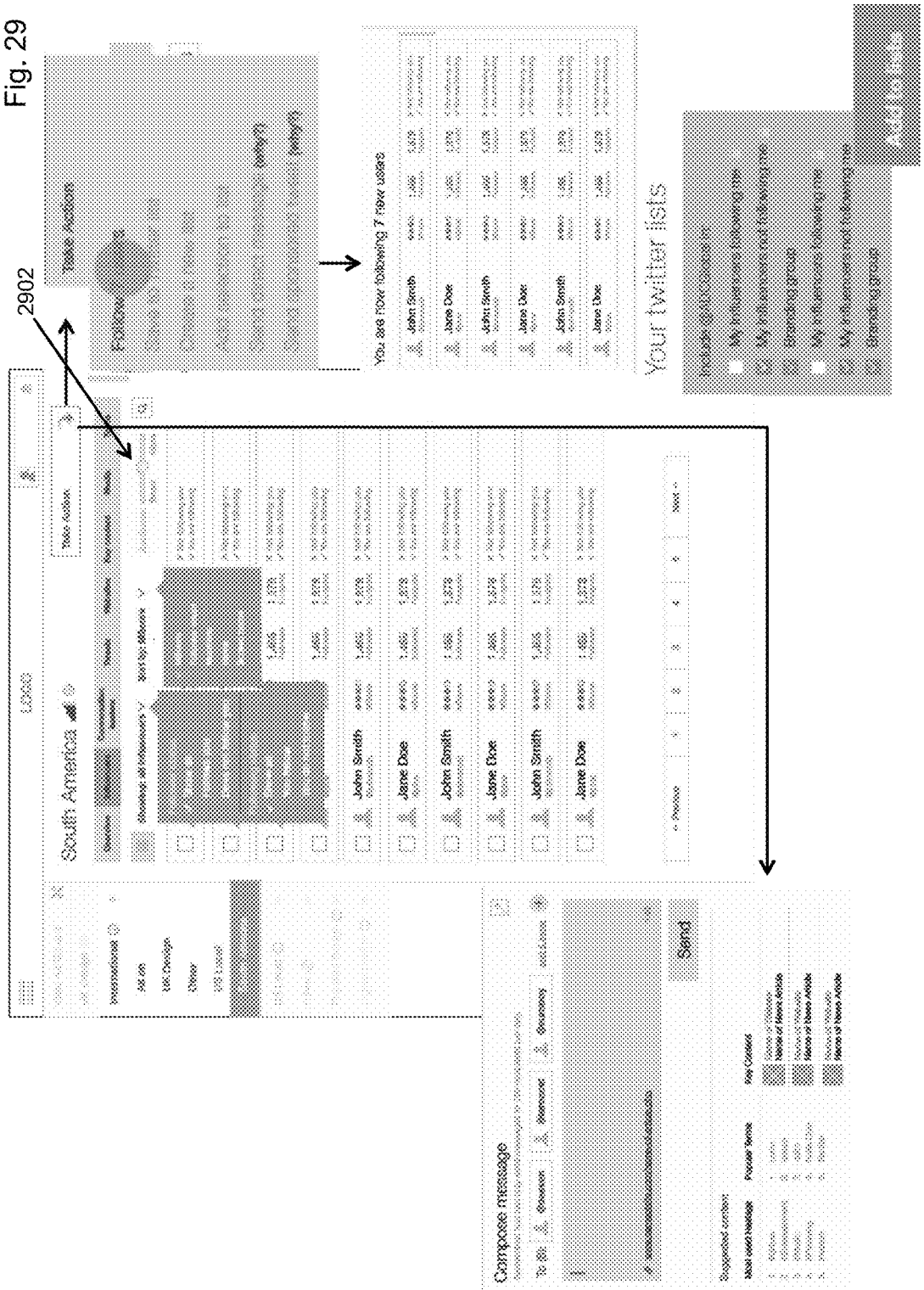
FIG. 29 depicts an influencers page for a social media map platform.
Figure 30:
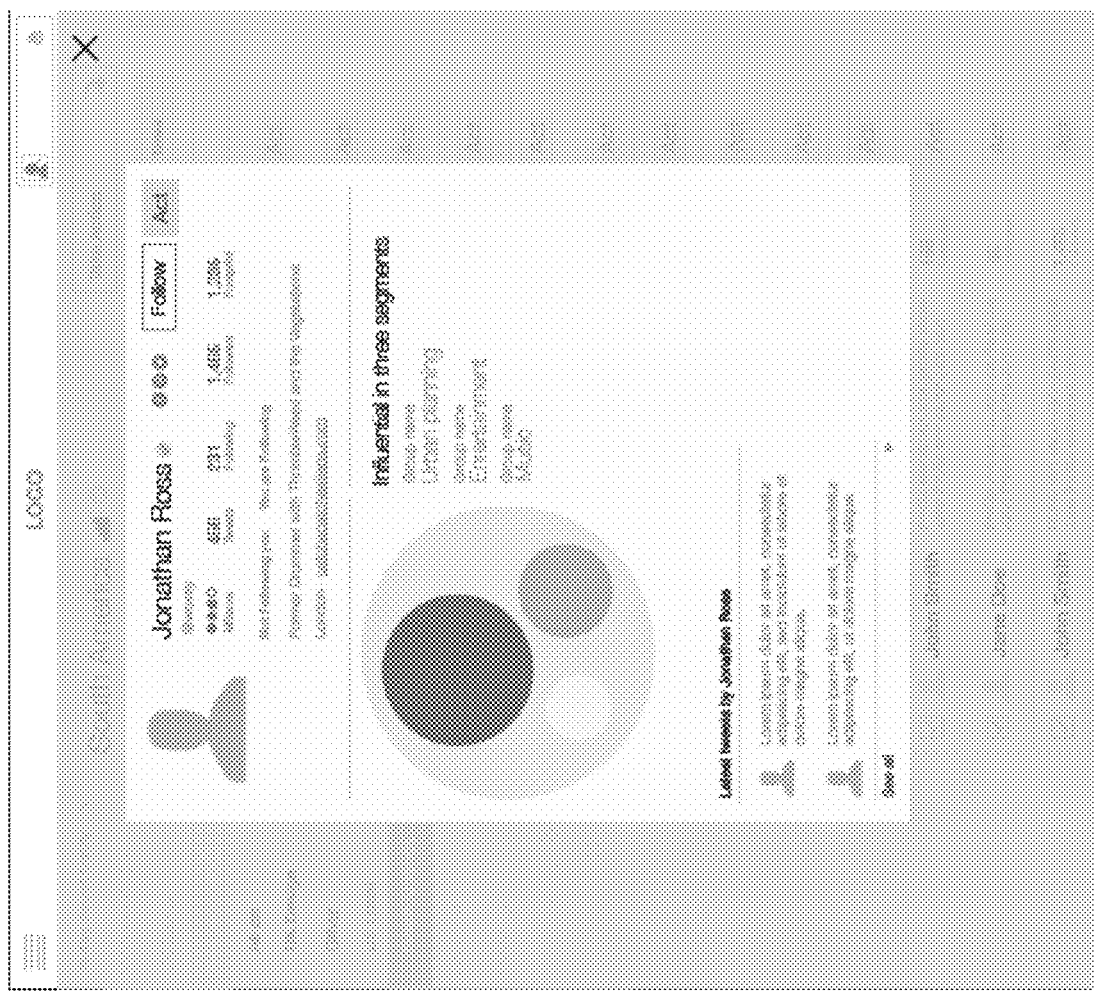
FIG. 30 depicts an influencer detail for a social media map platform.

Referring now to FIG. 29, the "influencers" tab has been invoked. Various ways to filter the influencers are provided such as by follower status (all followers, follows the user, does not follow the user) or by following status (show all, the user follows, the user does not follow). Another way to filter influencers may be by M score, follower count, mentions, name, screen name, and the like. One way to filter by M score is by use of a slider 2902 to obtain more niche or broader individuals/entities as described elsewhere herein. Another way to filter individuals/entities may be by their exposure to particular content. By utilizing this filter, the user may target individuals/entities who have not already been exposed to the content. Users may take action from this page such as to follow selected individuals/entities, save individuals/entities to a Twitter list, create a new list, add a selection to a list, send a direct message, send a sponsored tweet, and the like. When saving individuals/entities to a Twitter list, a dialog box may appear with list choices for the user, such as a list for my influencers following me, a list for my influencers and not following me, a branding group, and the like. In this example, one action being taken is to follow seven new users. By following individuals/entities and engaging in behaviors that might cause them to be aware of the user, the users network may potentially expand to include the newly followed individuals/entities. Another action that is taken is to compose a message. The compose message screen may include suggested content such as most used hashtags or other media based on a CFI, popular terms, key content such as high M score media, and the like. Influencer information may be leveraged in determining whom to message. The suggested content may be filtered by the exposure of target individuals/entities to the content. Data related to the content such as its peakedness, first appearance, and the like may be exposed to the user so that the user can decide whether it makes sense to share the content with other individuals/entities. Referring to FIG. 30, users may be able to drill down to the individual influencer level to see in what other segments/clusters the individual is influential, their latest tweets, M score, number of tweets, number of followers, number following, footprint, following/follower status with respect to the user, demographic information, URL, and the like. Icons may be available to follow, act (i.e., add the person to a list, re-tweet their latest tweet, send a direct message, etc.), view a social media profile, and the like.

Figure 31:
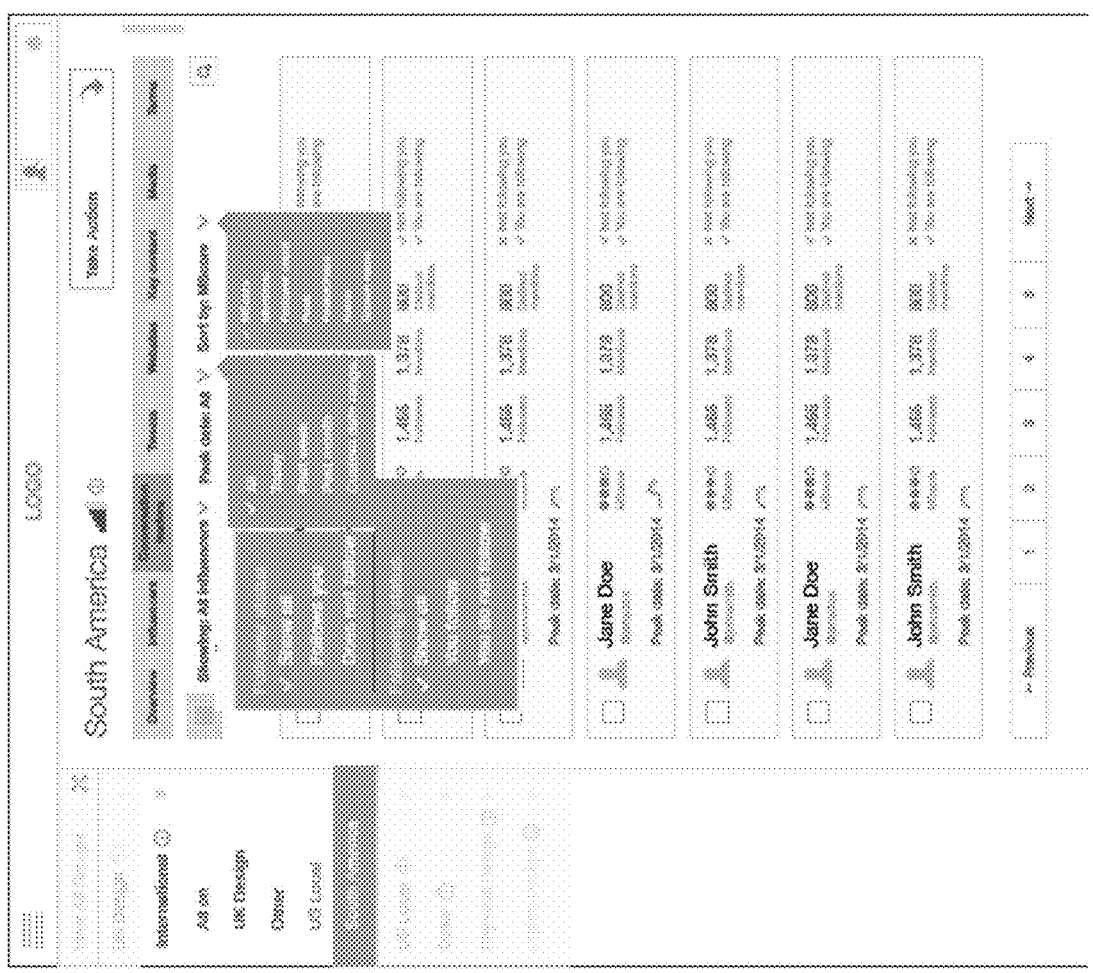
FIG. 31 depicts a conversation leaders page for a social media map platform.

Referring now to FIG. 31, a tab for conversation leaders is displayed. Various ways to filter the conversation leaders are provided such as by follower status (all followers, follows the user, does not follow the user) or by following status (show all, the user follows, the user does not follow). Another way to filter conversation leaders is by peak date such as all, today, past week, past month, custom date range, and the like. Another way to filter conversation leaders may be by M score, follower count, mentions, peak, peakedness, name, screen name, and the like. Another way to filter conversation leaders may be by their exposure to particular content. By utilizing this filter, the user may target individuals/entities who have not already been exposed to the content. Users may take action from this page such as to follow selected individuals/entities, save individuals/entities to a Twitter list, create a new list, add a selection to a list, send a direct message, send a sponsored tweet, and the like.

Figure 32:
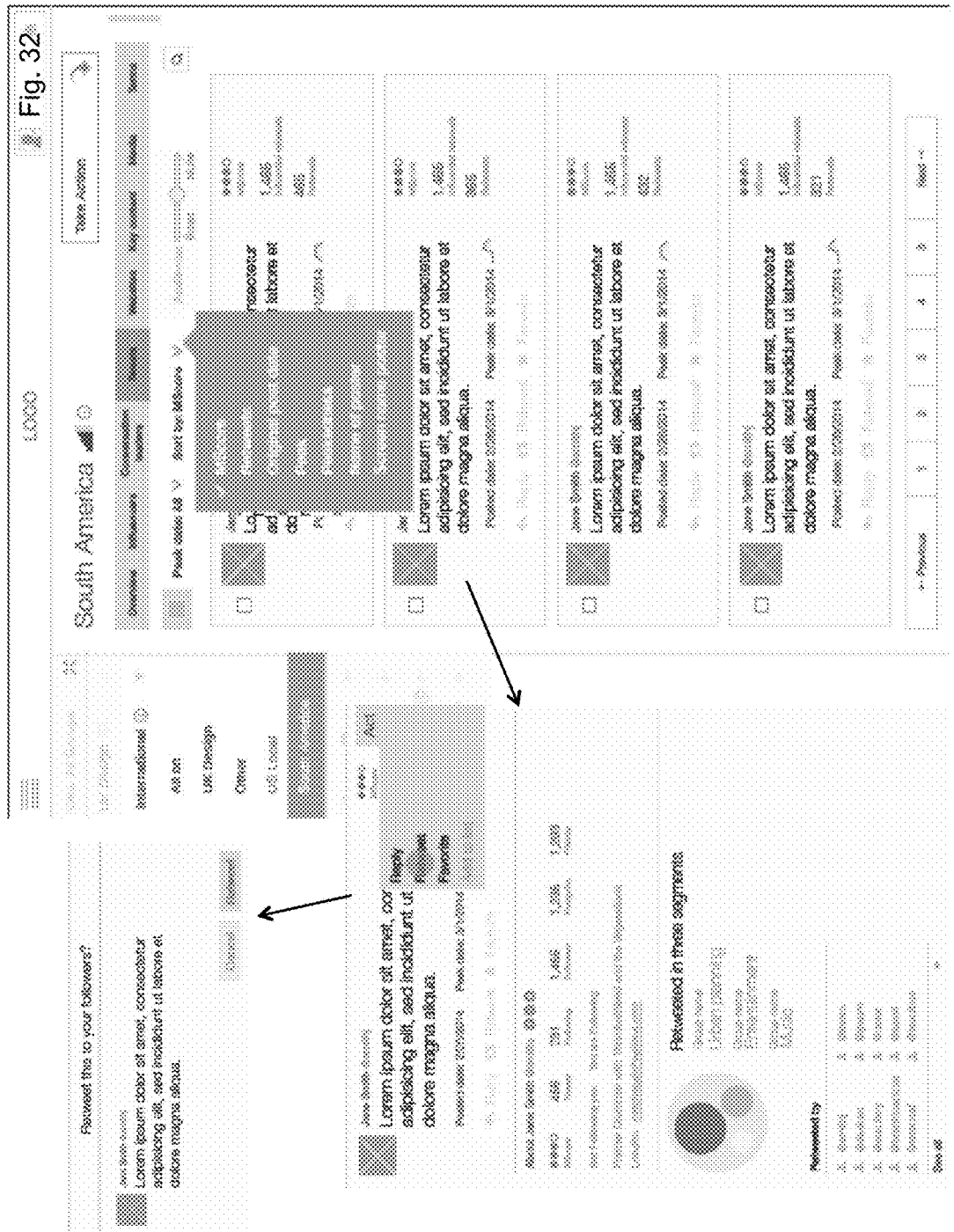
FIG. 32 depicts a tweets page for a social media map platform.

Referring now to FIG. 32, a tweets tab is displayed. The tweets may be filtered by peak date such as all, today, past week, past month, custom date range, and the like. The tweets may be filtered by M score, re-tweets, original post date, peak, peakedness, name of poster, screen name of poster, and the like. One way to filter by M score is by use of a slider to obtain an audience that is more niche or broader, as described elsewhere herein. Data regarding each displayed may include an M score the number of influential re-tweets, the number of re-tweet, the posted date, the peak date, a graphic of the peak pattern, icons with which to take action such as reply/re-tweet/favorite, name, screen name, and the like. Selecting one of the tweets may cause a drill down box to appear with additional information about the individual/entity who made the tweet, such as M score, number of tweets, number of followers, number following, footprint, number of friends, follower/following status, demographic data, URL, which segments the individual/ entity is re-tweeting in, who have they been re-tweeted by, icons to social media profiles, icons with which to take actions such as reply/re-tweet/favorite/add to list, and the like.

Figure 33:
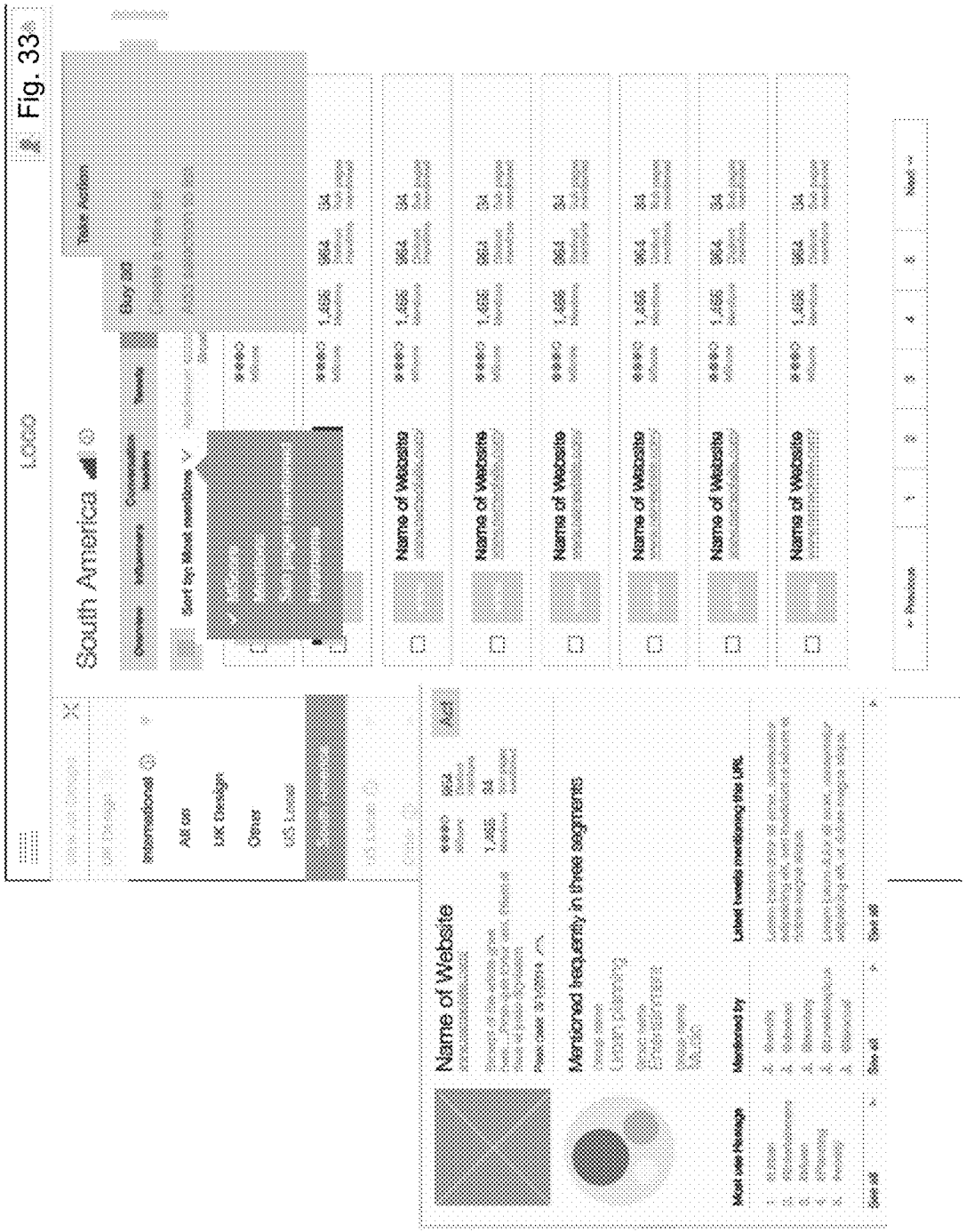
FIG. 33 depicts a websites page for a social media map platform.

Referring now to FIG. 33, a websites tab is displayed. The websites can be sorted by mentions, M score, sub pages mentioned, hostname, and the like. One way to filter the websites by M score is by use of a slider to obtain an audience that is more niche or broader, as described elsewhere herein. Users may take action from this page such as to buy an ad, create a new list, add a selection to a list, and the like. Selecting a website reveals a drill down box for the website. Information about the website in the drill down box may include M score, distinct mentions, mentions, sub pages mentioned, excerpt, peak date, a graphic of the peak pattern, segments/clusters the website is mentioned in, who mentioned the website, latest tweets mentioning this URL, a button to take action, and the like.

Figure 34:
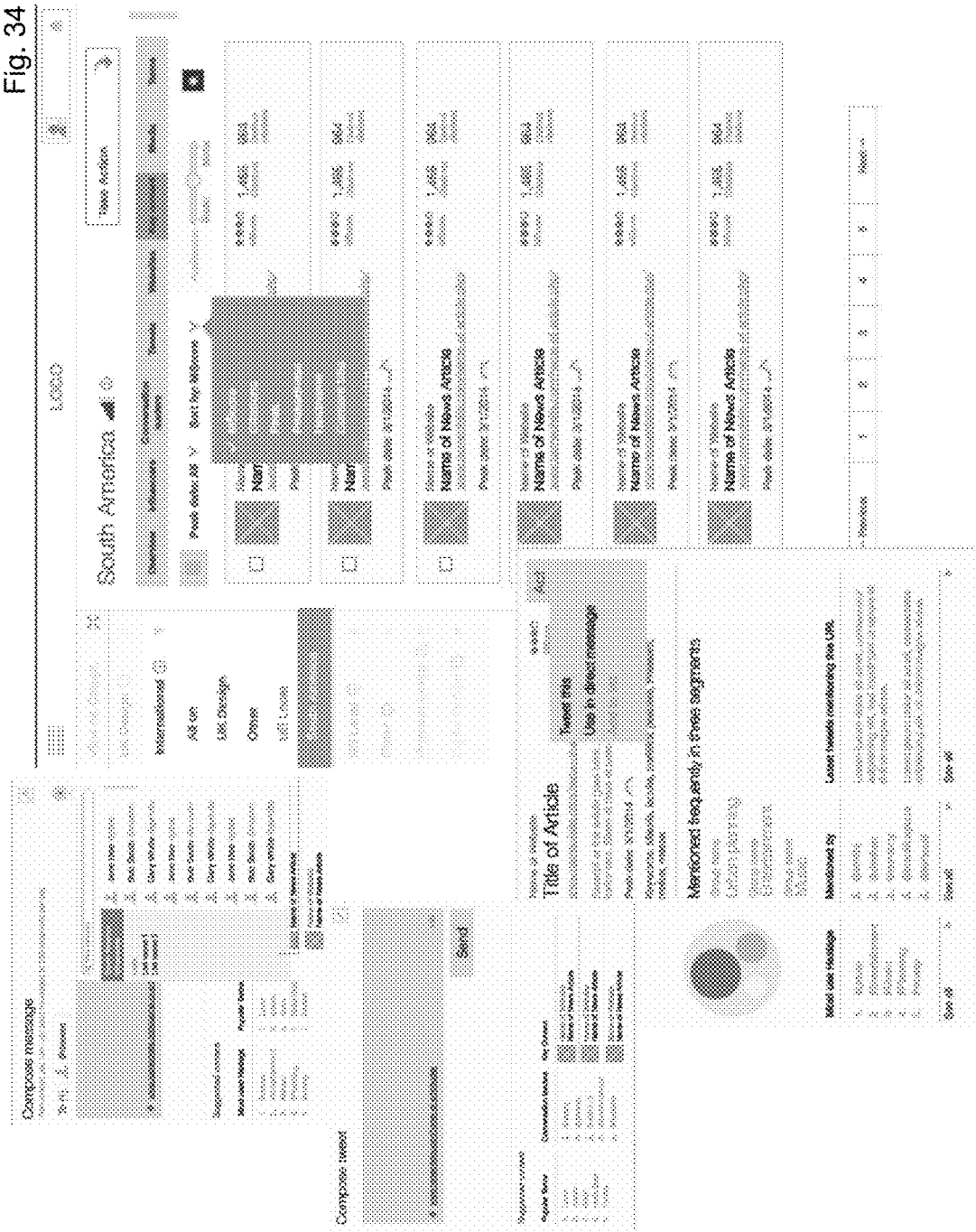
FIG. 34 depicts a key content page for a social media map platform.

Referring now to FIG. 34, a tab for key content may be displayed. Information about the key content included in this view includes the name of the website, name of an article, URL, peak date, a peak pattern, M score, citations, distinct citations, and the like. The key content may be sorted by M score, citations, peak, peakedness, host name, content title and the like. One way to filter by M score is by use of a slider to obtain an audience that is more niche or broader, as described elsewhere herein. The key content may be filtered by peak date such as all, today, past week, past month, custom date range, and the like. Users may take action from this page such as to compose a message, compose a tweet, view a drill down box for the key content, and the like. In the compose message or compose Tweet view, users may be able to select one or more individuals/entities or and influencers/conversation leaders to message with suggested content (most used hashtags, popular terms, key content, etc.). In one embodiment, the individuals/entities may be part of a list such that either certain members of the list or the entire list may be easily included as recipients of the message. Selecting a key content reveals a drill down box for the content. Information about the content in the drill down box may include name of website, title of article, M score, distinct mentions, mentions, sub pages mentioned, excerpt, peak date, a graphic of the peak pattern, segments/clusters the content is mentioned in, who mentioned the content, latest tweets mentioning this URL, most used hashtags, a button to take action (tweet this, use in direct message, add list, etc.), and the like.

Figure 35:
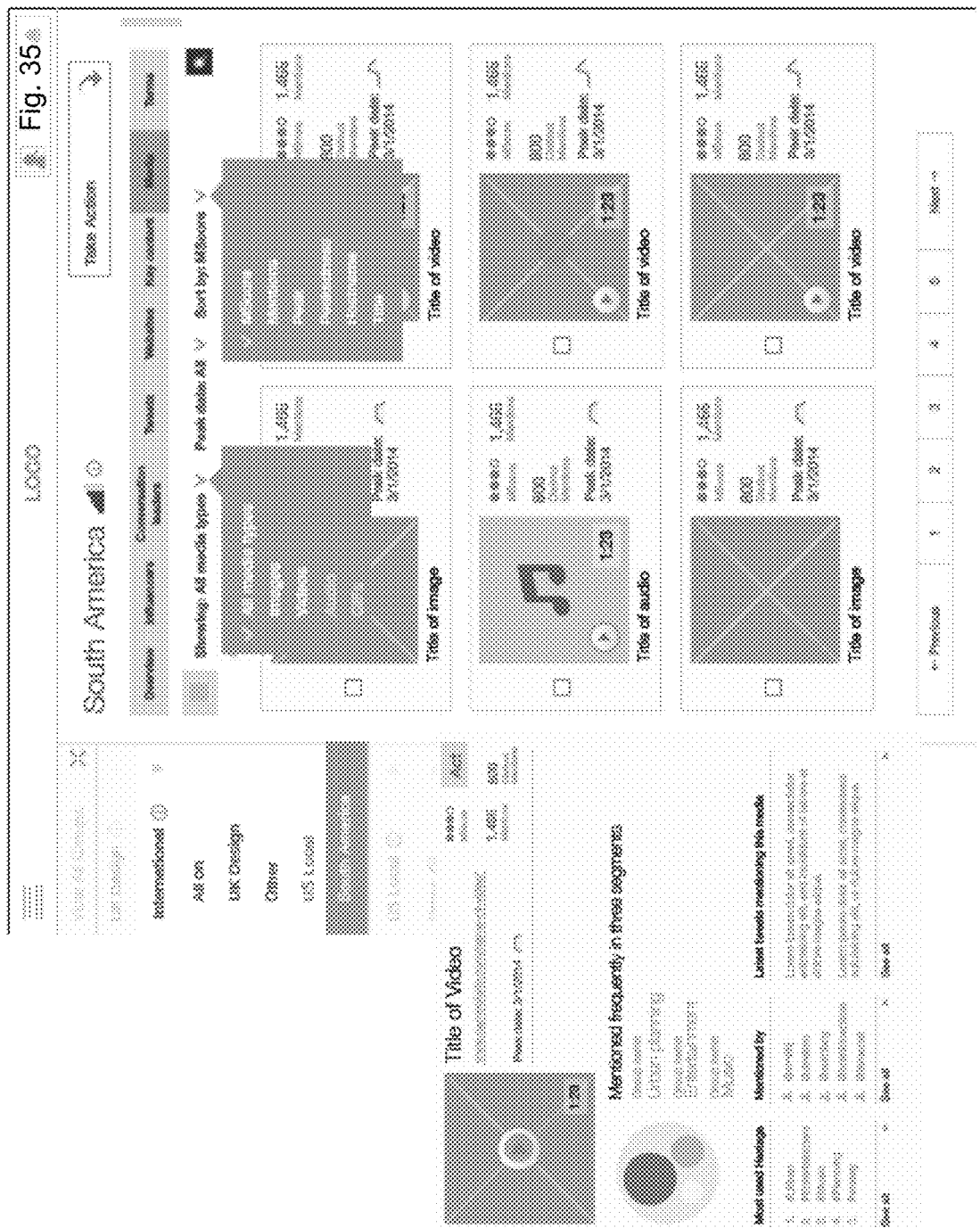
FIG. 35 depicts a media page for a social media map platform.

Referring now to FIG. 35, a media tab is displayed. Media may be filtered by images, videos, audio, GIFs, and the like. The media may be filtered by peak date such as all, today, past week, past month, custom date range, and the like. The media may be sorted by M score, citations, peak, peakedness, host name, content title and the like. Information about the media in this view may include title, duration, media type, M score, mentions, distinct mentions, peak date, peak pattern, and the like. By selecting one of the media items, a drill down box may appear. Information in the drill down box may include title of media, URL, M score, mentions, distinct mentions, peak date, peak pattern, media type, duration, what segments/clusters the media is mentioned in, most used hashtags, who has mentioned the media, latest tweets mentioning this media, an icon to take action with, and the like.

Referring to FIG. 36, a tab for terms is displayed. The terms may be filtered by hash tags, one word, 2 words, 3 words, and the like. The terms may be filtered by peak date such as all, today, past week, past month, custom date range, and the like. The terms may be sorted by M score, citations, peak, peakedness, host name, content title and the like. Information about terms in the list may include the term, peak date, peak pattern, M score, mentions, distinct mentions, and the like. Selecting a term may reveal a drill down box where additional information about the term may be displayed including which segments/clusters the term has been mentioned in frequently, what other terms have been mentioned with the selected term, who has mentioned the term, latest tweets mentioning this term, an icon to take action with, and the like.

Referring now to FIG. 37, a list page of a social media map platform is displayed. In this view, information may be provided in the form of lists, such as lists of influencers, conversation leaders, key content, terms, and the like. Information about each list member may include name, screen name, M score, followers, mentions, follower/following status, and the like. Lists may be sorted/filtered by any of the techniques mentioned herein including by influence, M score (such as with a slider or other user input), and the like. Users may take action from the list view.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like. Methods described herein may be completed in a time span selected from the group consisting of: less than about 1 minute, less than about 30 seconds, less than about 10 seconds, less than about 5 seconds, less than about 1 second, or substantially instantaneously.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A computerized search method, the method comprising:
presenting, to a user, a computer interface for specifying one or more search terms for a search query;
presenting at least one selectable item through the computer interface corresponding to at least one of an M score and a cluster focus index score (CFI) for the search query, wherein the CFI represents a degree to which a particular target is disproportionately cited in a particular cluster;
generating an amended search query based on a selected item; and
performing a search through the computer interface using the amended search query, wherein the M score is calculated using a formula of M score=count(alpha)+CFI(1-alpha), where the count is an overall number of members of the particular cluster that has engaged with the particular target, and values of alpha being between 0 and 1.

2. The method of claim 1, wherein the search is of the Internet.

3. The method of claim 1, wherein the search is of a CFI-filtered set of clusters within an online network.

4. The method of claim 1, wherein the search is of a set of nodes having the M score greater than a threshold.

5. The method of claim 1, wherein the search is of a document-corpus.

6. The method of claim 1, wherein the CFI further represents a degree to which an event, characteristic or behavior disproportionately occurs in the particular cluster, or a degree to which the particular cluster, relative to a network, preferentially manifests the event, characteristic or behavior.

7. The method of claim 1, wherein the computer interface is configured for the user to select content to search with the one or more search terms.

8. The method of claim 7, wherein the content is taken from an online creator network partitioned into at least one set of source nodes.

9. The method of claim 8, wherein the at least one set of source nodes is configured with a similar linking history to form an attentive cluster and at least one set of outlink targets with a similar citation profile to form an outlink bundle.

10. The method of claim 8, further comprising performing a search of the selected content using the search query.

11. The method of claim 1, further comprising:
generating a list of targets in a network, cluster, or segment; and
filtering the list by criteria to limit whom to a message in the network, cluster, or segment in order to maximize the impact of the message on the cluster or segment.

12. The method of claim 11, wherein the filtering the list by the criteria includes filtering by at least one of the CFI score, the M score, a number of followers, a following status, a follower status, a number of mentions or re-tweets, a number of distinct mentions, a status of exposure to content, and a frequency of tweets or publication.

13. The method of claim 12, wherein the generating of the list of targets in the network, cluster, or segment includes using at least one of the CFI score, the M score, the number of followers, the number of mentions or re-tweets, a number of distinct mentions, and a number of tweets.

14. The method of claim 13, wherein the M score is based on the CFI that further details a degree to which the particular target disproportionately occurs in the particular cluster, or a degree to which the particular cluster, relative to a network, preferentially engages with the particular target, wherein an overall number of members of the cluster or network that have engaged with the particular target is determined.

15. A method for automatically analyzing and determining whether an overall number of members have engaged with a target, the method comprising:
presenting, to a user, a computer interface hosted by a computing device, wherein the computer interface is configured to specify one or more search terms for a search query;
presenting on the computer interface at least one selectable item corresponding to at least one of an M score and a cluster focus index score (CFI) for the search query, wherein the CFI represents a degree to which a particular target is disproportionately cited in a particular cluster;
generating an amended search query with the computing device based the at least one selectable item; and
performing a search on the computer interface with the computing device using the amended search query, wherein the M score is calculated using a formula of M score=count(alpha)+CFI(1-alpha), where the count is an overall number of members of the particular cluster that has engaged with the particular target, and values of alpha being between 0 and 1.

16. The method of claim 15, wherein the search is of the Internet.

17. The method of claim 15, wherein the search is of a CFI-filtered set of clusters within an online network.

18. The method of claim 15, wherein the search is of a set of nodes having the M score greater than a threshold.

19. The method of claim 15, wherein the search is of a document-corpus.

20. The method of claim 15, wherein the CFI further represents a degree to which an event, characteristic or behavior disproportionately occurs in the particular cluster, or a degree to which the particular cluster, relative to a network, preferentially manifests the event, characteristic or behavior.

21. The method of claim 15, wherein the computer interface is configured for the user to select content to search with the one or more search terms, and wherein the content is taken from an online creator network partitioned into at least one set of source nodes.

22. The method of claim 21, wherein the at least one set of source nodes is configured with a similar linking history to form an attentive cluster and at least one set of outlink targets with a similar citation profile to form an outlink bundle.

\* \* \* \* \*